United States Patent [19]
Masséet al.

[11] Patent Number: 5,863,434
[45] Date of Patent: Jan. 26, 1999

[54] PSYCHROPHILIC ANAEROBIC TREATMENT OF WASTE IN A SEQUENCING SEMIBATCH/BATCH BIOREACTOR

[75] Inventors: Daniel I. Massé, Lennoxville; Ronald L. Droste, Ottawa, both of Canada

[73] Assignees: University of Ottawa/Universite D'Ottawa, Ontario; Her Majesty in Right of Canada as Represented by the Minister of Agriculture and Agri-Food, Quebec, both of Canada

[21] Appl. No.: 720,054

[22] Filed: Sep. 27, 1996

Related U.S. Application Data

[63] Continuation-in-part of Ser. No. 358,616, Dec. 14, 1994, abandoned.

[51] Int. Cl.⁶ .................................................. C02F 3/28
[52] U.S. Cl. ......................... 210/603; 210/612; 210/613; 210/903
[58] Field of Search .................................. 210/603, 612, 210/613, 903

[56] References Cited

U.S. PATENT DOCUMENTS

| | | | |
|---|---|---|---|
| 4,157,958 | 6/1979 | Chow ....................................... | 210/603 |
| 4,503,154 | 3/1985 | Paton ....................................... | 210/603 |
| 4,623,464 | 11/1986 | Ying et al. ............................... | 210/616 |
| 4,676,906 | 6/1987 | Crawford et al. ....................... | 210/673 |
| 5,143,835 | 9/1992 | Nakatsugawa et al. ................. | 210/603 |
| 5,185,079 | 2/1993 | Dague ..................................... | 210/603 |

OTHER PUBLICATIONS

"Treatment of Swine Wastes By The Anaerobic Sequencing Batch Reactor System", R. H. Zhang et al., pp. 301–308.
"Psychrophilic Anaerobic Treatment of Swine Manure in Intermittently Fed Sequencing Batch Reactors", D. I. Masse, et al., Presentation at 1993 ASAE International Winter Meeting.
"Anaerobic Sequencing Batch Reactor Treatment of Swine Wastes", Dague, et al., 46th Purdue Industrial Waste Conference Proceedings, 1992.
"A Sequencing Batch Anaerobic Reactor for Treating Piggery Wastewater", Wun–Jern, *Biological Wastes*28, 1989, pp. 39—51.
"Biogas Production from Anaerobic Lagoons", L.M. Safley, et al., *Biological Wastes*, 23, 1988, pp. 181—193.
"Ambient Temperature Methanogenesis from Pig Manure Waste Lagoons:Thermal Gradient Incubator Studies", Cullimore et al., *Agriculture Wastes*, 12, 1985, pp. 147—157.
"Psychrophilic Methane Generation from Pig Manure", Wellinger et al., *Process Biochemistry*, Sep./Oct. 1982, pp. 26—30.

(List continued on next page.)

*Primary Examiner*—Christopher Upton
*Attorney, Agent, or Firm*—Oliff & Berridge, PLC

[57] ABSTRACT

A process to stabilize, deodorize, recover energy, reduce pollution potential, and add value to organic waste such as animal manure is described. The process involves the anaerobic digestion of animal manure at low temperatures in intermittently fed sequencing batch reactors. The process of the present application offers several advantages over the prior art processes including (1) the process works very well at low temperatures and therefore does not require preheating of the animal manure; (2) the process does not require continuous or daily feeding nor does it require continuous mixing; (3) the process makes use of existing handling and storage equipment at the farm and requires minimal supervision and skill by the operator; (4) the process is very efficient in retaining the slow growing microorganisms in the system and (5) the system is not affected by high concentrations of volatile acids and ammonia or nitrogen. Consequently, the process is low cost and does not interfere with regular farm operations.

20 Claims, 67 Drawing Sheets

OTHER PUBLICATIONS

"Psychrophilic Digestion of Dairy Cattle and Pig Manure: Start–up Procedures of Batch, Fed–Batch and CSTR–type Digesters", Zeeman, et al., *Biological Wastes*, 26, 1988, pp. 15—31.

"Anaerobic Lagoon Biogas Recovery Systems", L. M. Safley, et al., *Biological Wastes*, 27, 1989, pp. 43—62.

"An Assesment of Agriculture Canada's Anaerobic Digestion Program", P. Van Die, *Engineering and Statistical Research Center*, Contribution No. I–933, Agriculture and Agri–Food, Canada, Ottawa, On.

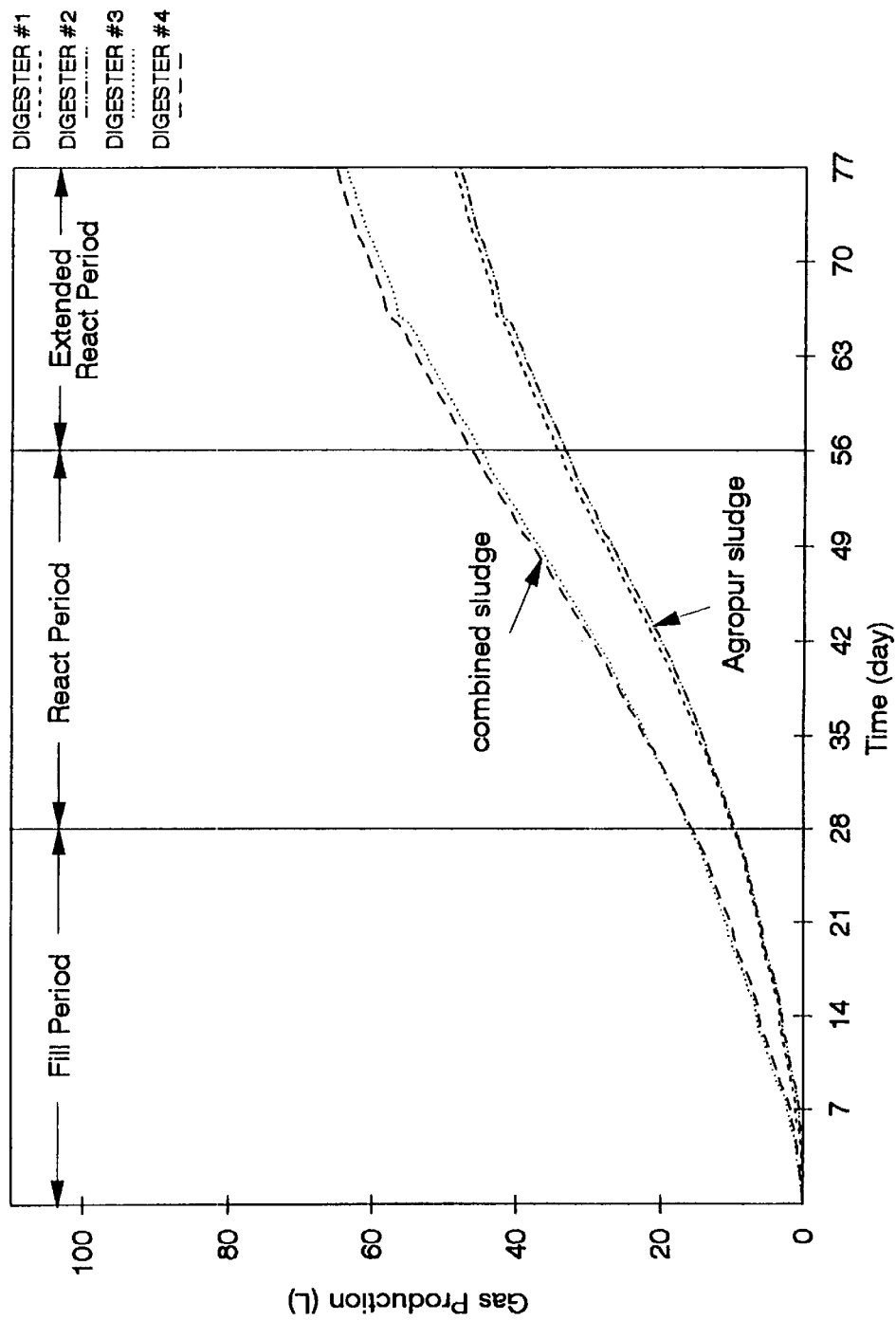
FIG. 2 Cumulative biogas production as a function of time for digesters with an organic loading rate of 0.72g COD/L-d.

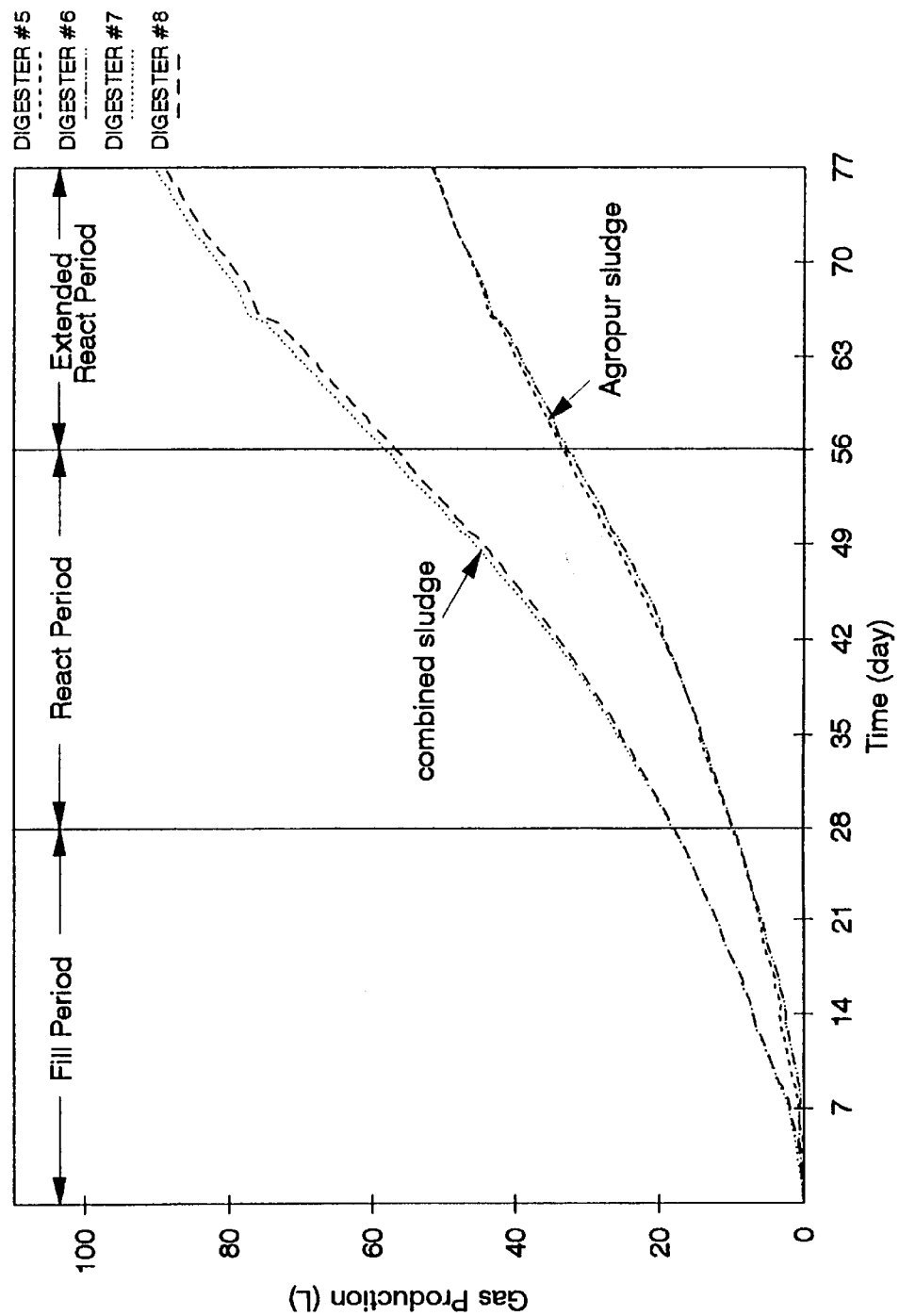
FIG. 3 Cumulative biogas production as a function of time for digesters with an organic loading rate of 1.20g COD/L-d.

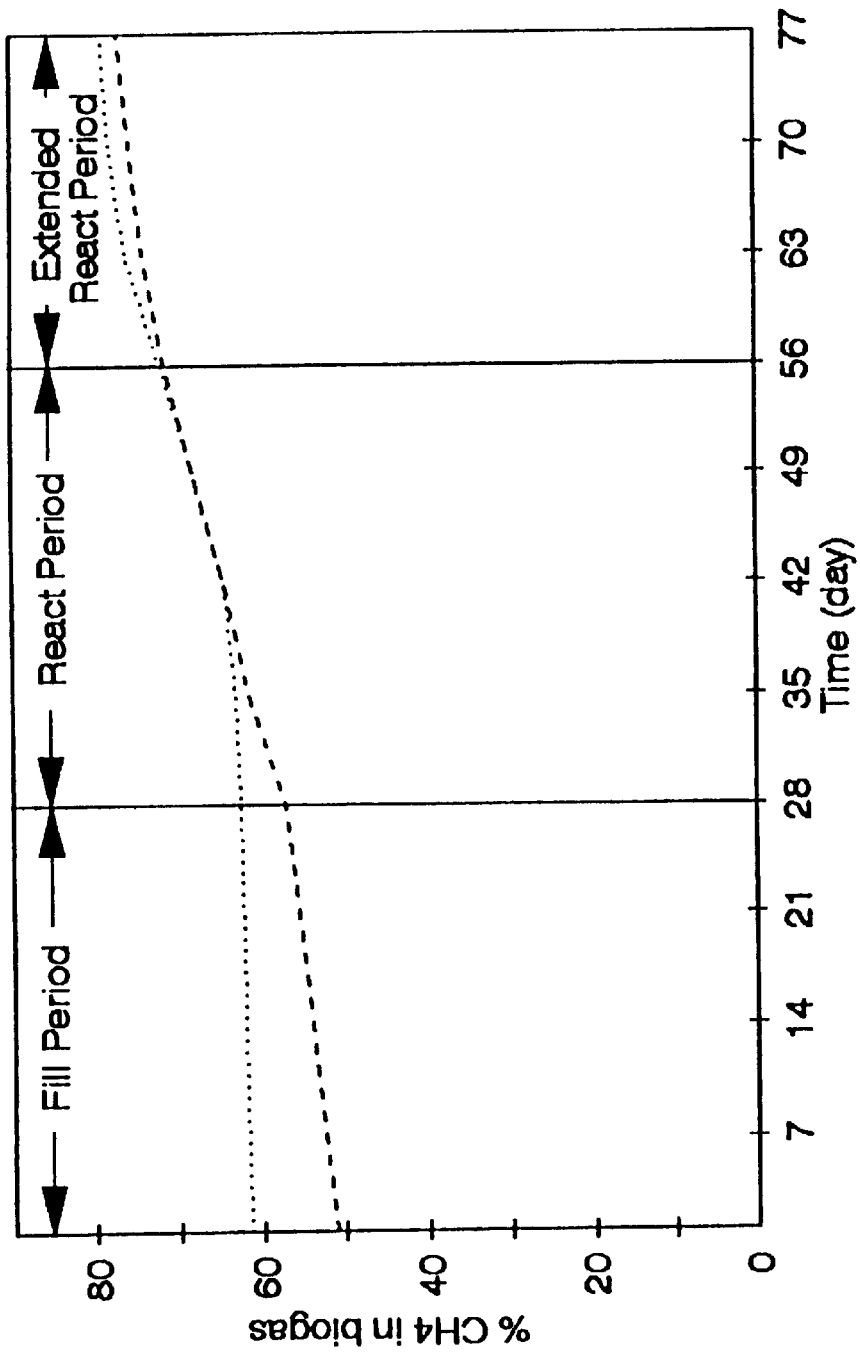
Fig. 4 Methane content in biogas as a function of time for SBRs with a loading rate of 0.72g COD/L-d, ---- average of SBRs 1 - 2, ....... average of SBRs 3 - 4.

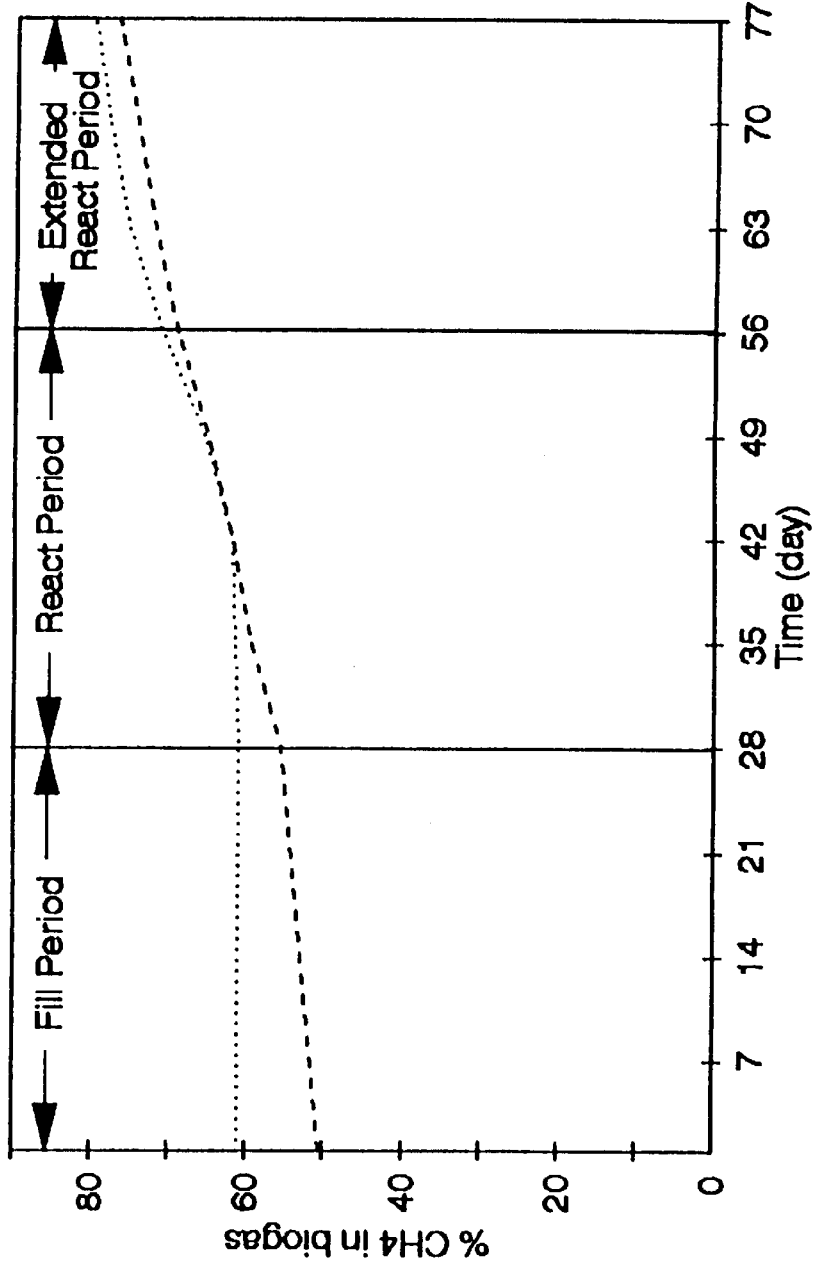
Fig. 5 Methane content in biogas as a function of time for SBRs with a loading rate of 1.2g COD/L-d, - - - . average of SBRs 5 - 6, ...... average of SBRs 7 - 8.

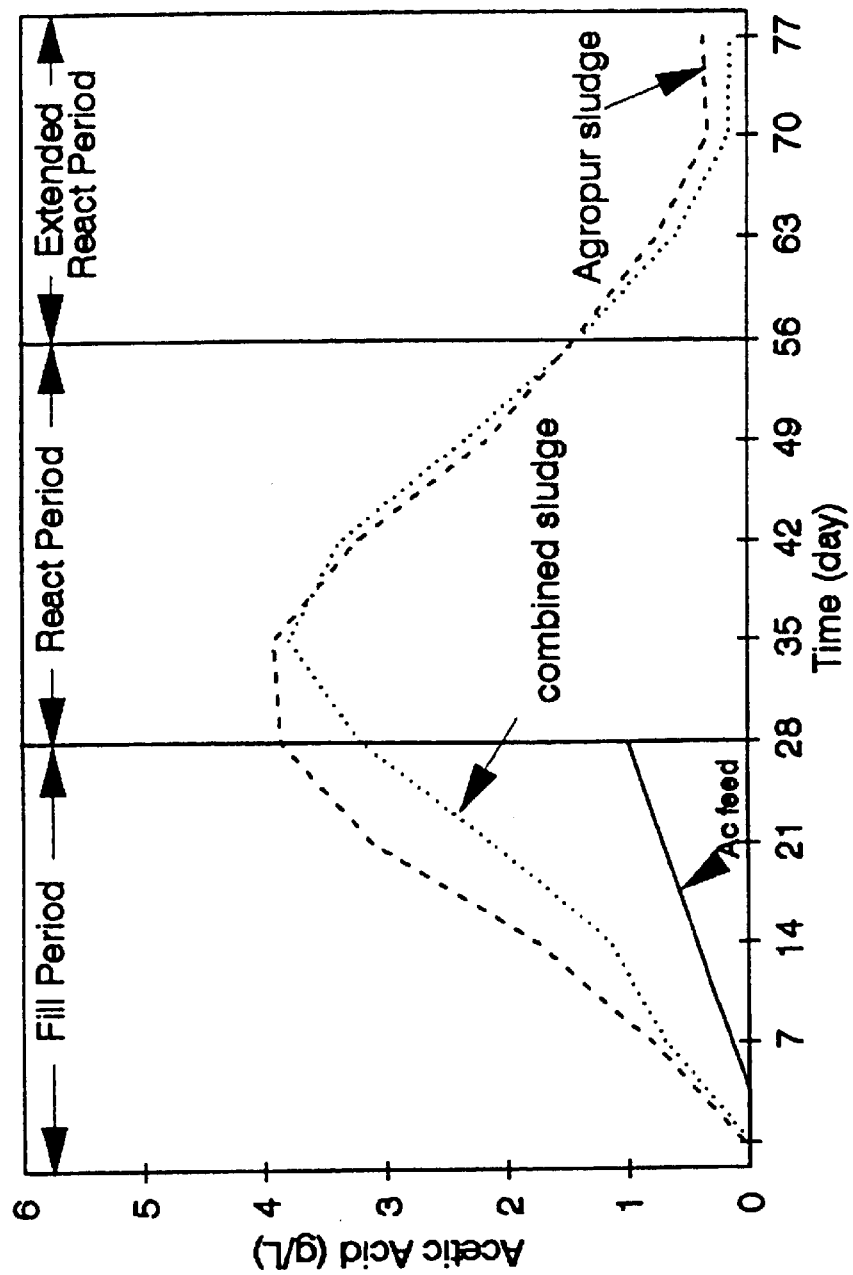
Fig. 6 Average acetic acid concentration as a function of time for SBRs with a loading rate of 0.7 g COD/L-d. -- average of SBRs 1 - 2, ······ average of SBRs 3 - 4.

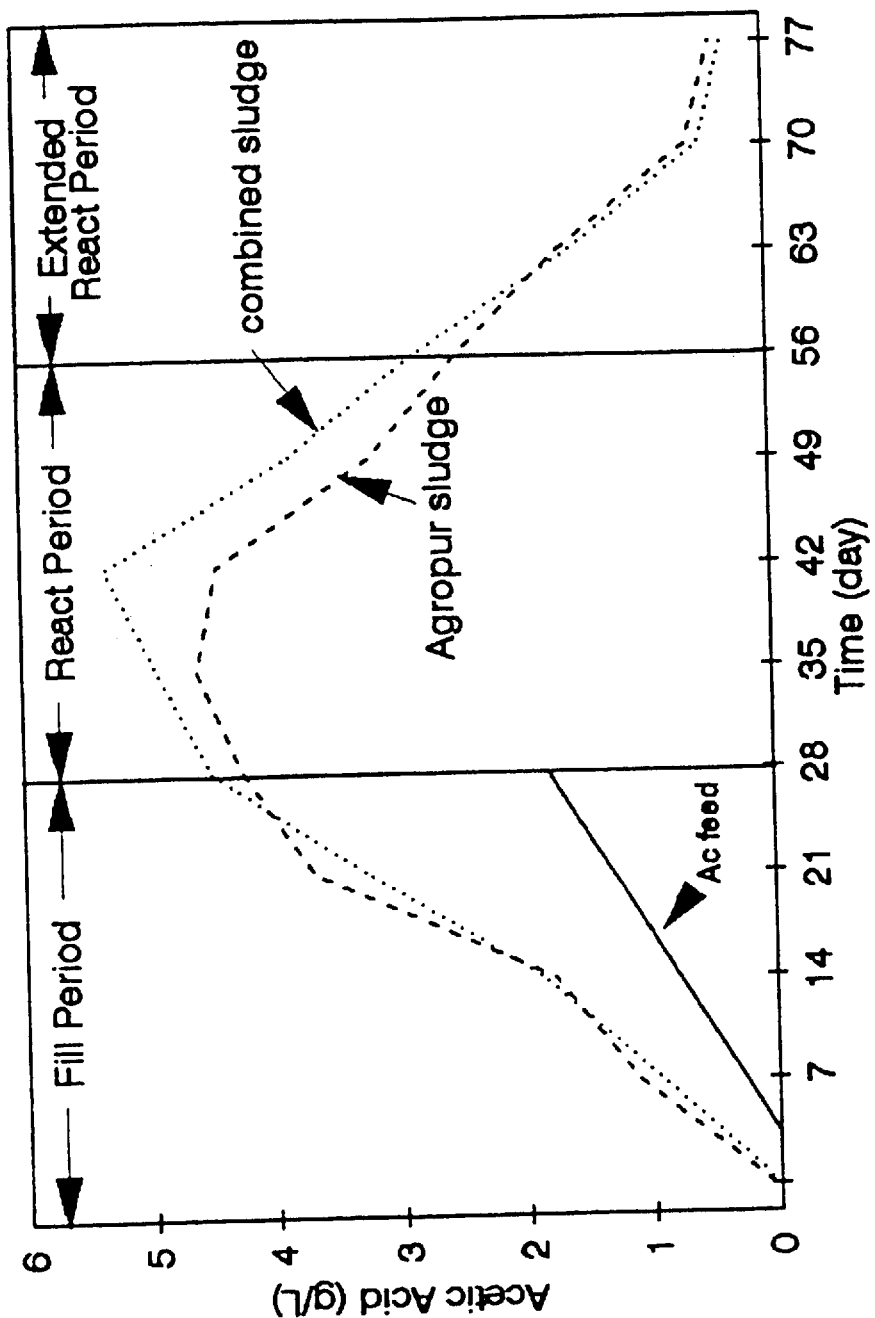
Fig. 7 Average acetic acid concentration as a function of time for SBRs with a loading rate of 1.2 g COD/L·d. -- average of SBRs 5 - 6, ...... average of SBRs 7 - 8.

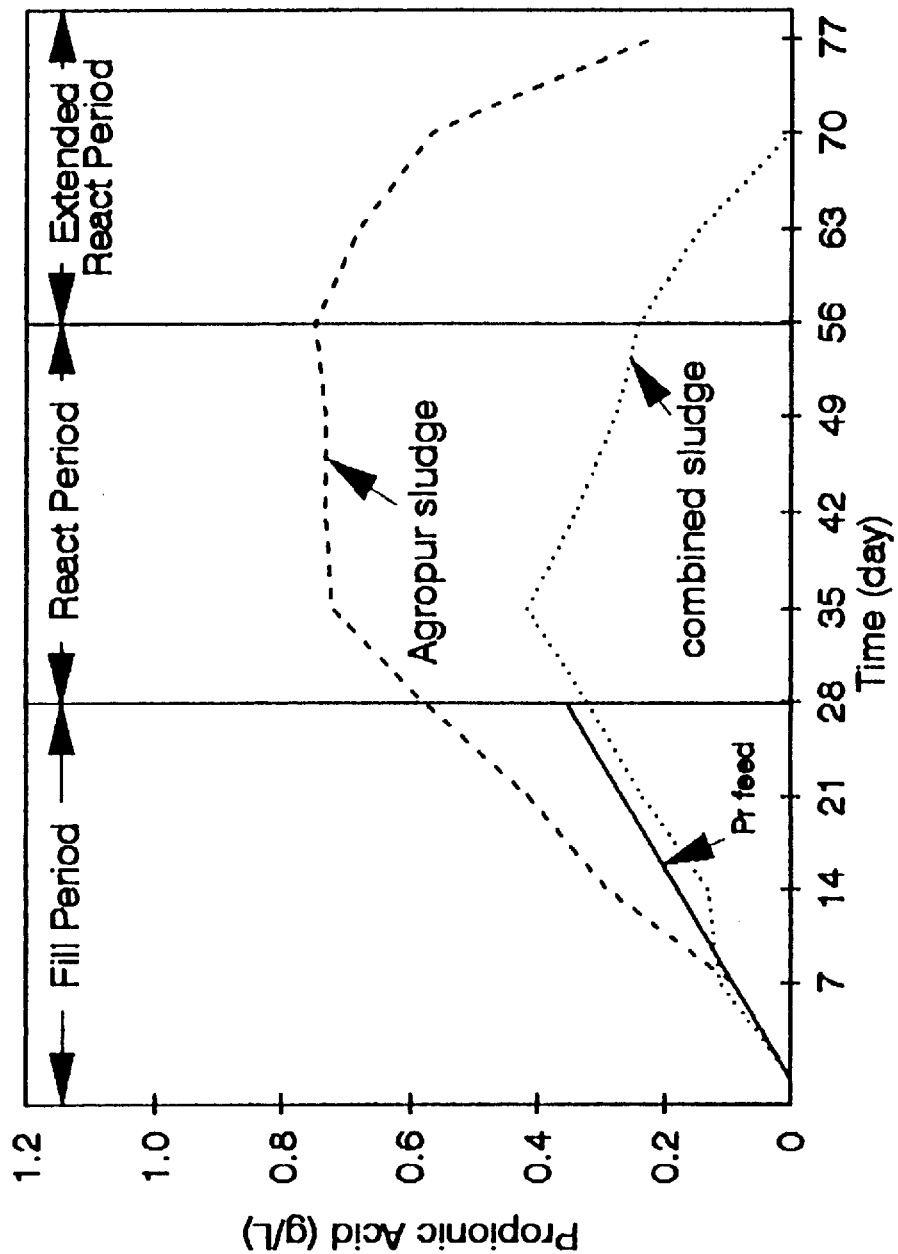
Fig. 8 Average propionic acid concentration as a function of time for SBR with a loading rate of 0.7 g COD/L-d. --- average of SBRs 1 - 2, ....... average of SBRs 3 - 4.

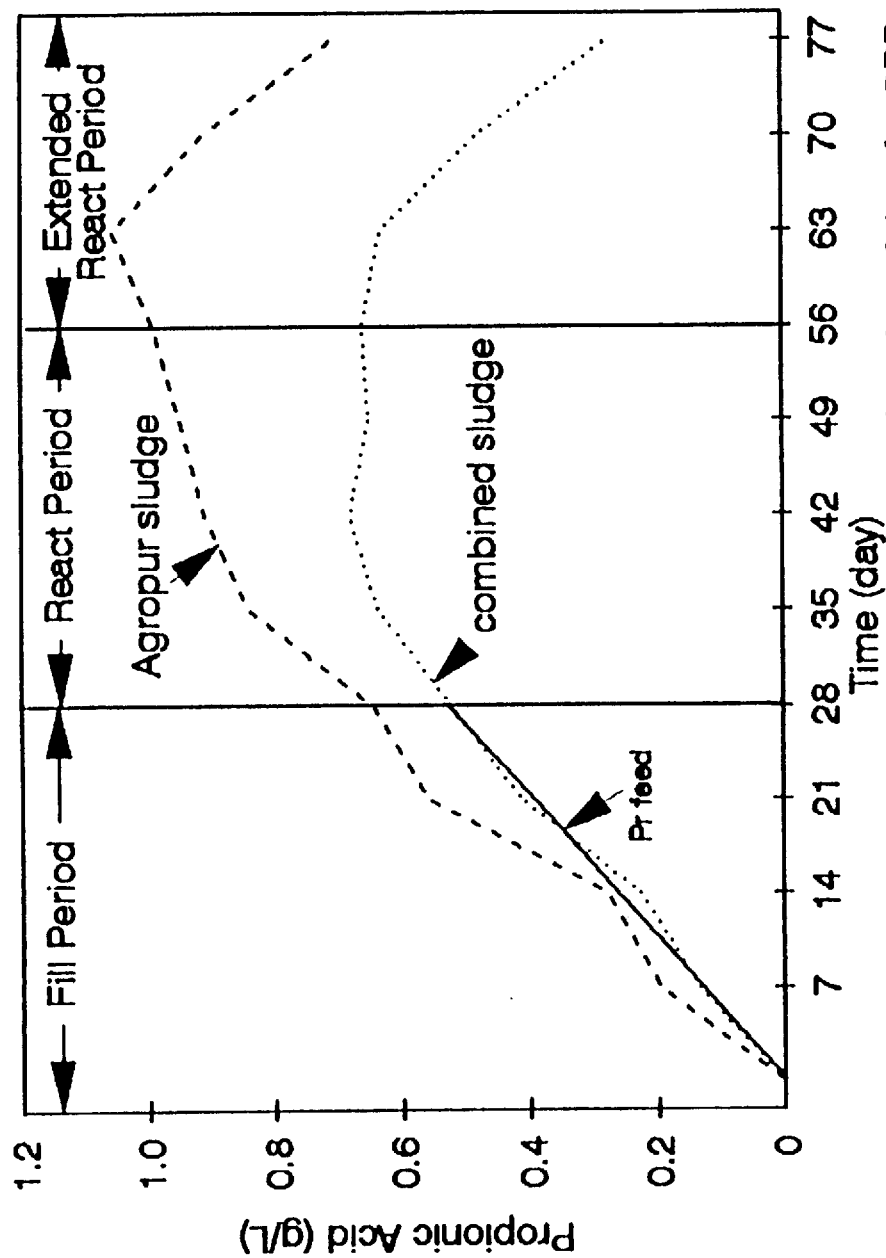
Fig. 9 Average propionic acid concentration as a function of time for SBRs with a loading rate of 1.2 g COD/L-d. ---- average of SBRs 5 - 6, ······ average of SBRs 7 - 8.

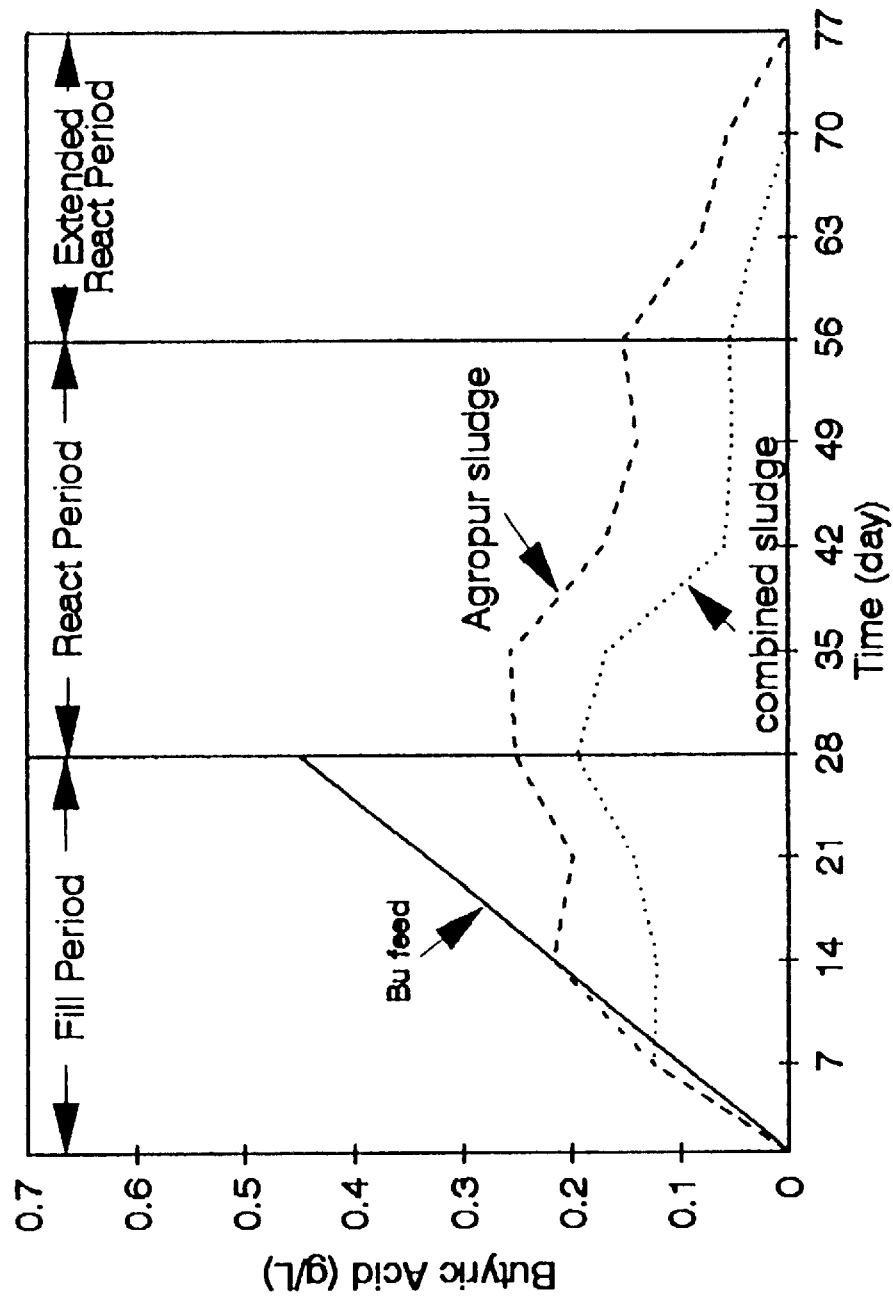
Fig. 10 Average butyric acid concentration as a function of time for SBRs with a loading rate of 0.7g COD/L-d, - - - average of SBRs 1 - 2, ······ average of SBRs 3 - 4.

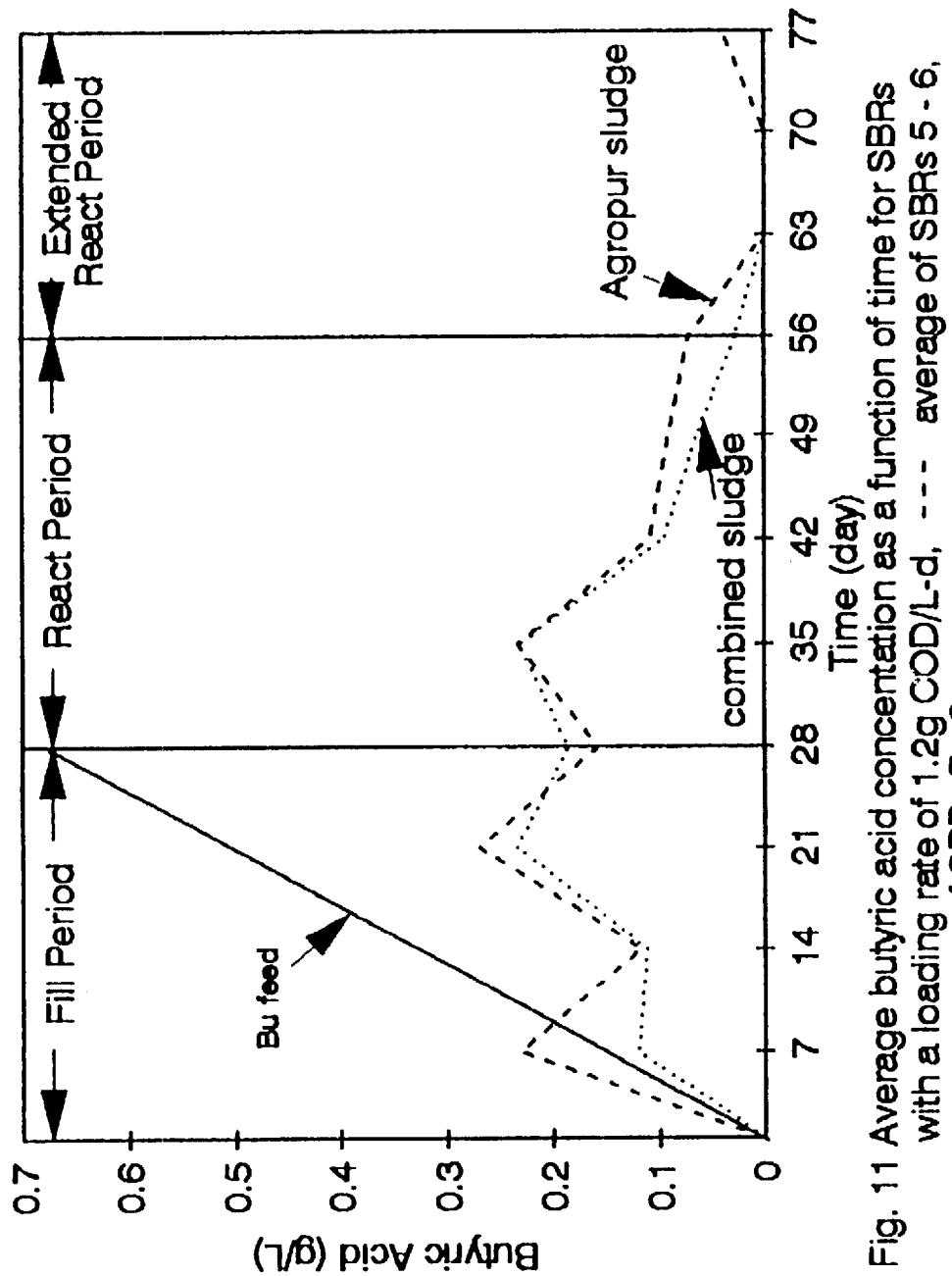
Fig. 11 Average butyric acid concentration as a function of time for SBRs with a loading rate of 1.2g COD/L-d, - - - average of SBRs 5 - 6, ······ average of SBRs 7 - 8.

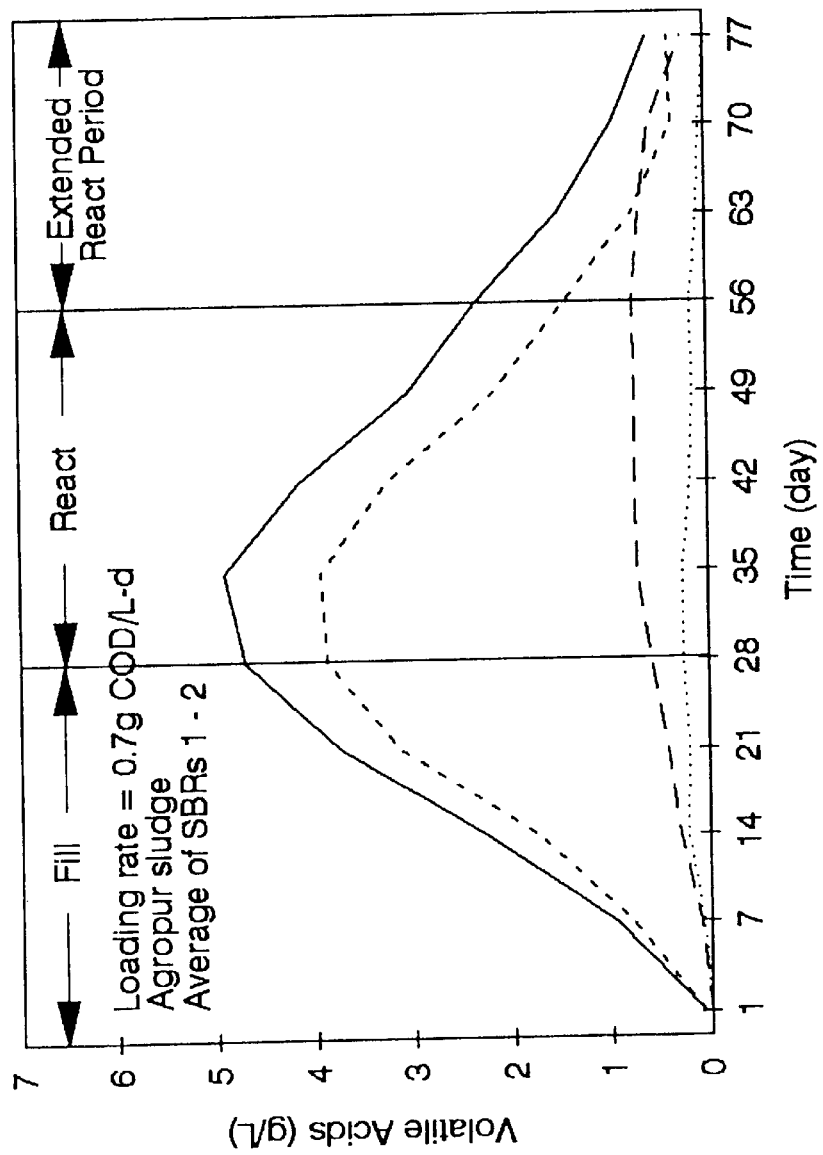
Fig 12A Total and individual volatile acids concentration as a function of time
(——— total volatile acids, – – – acetic acids, ······ butyric acids, — — propionic acid).

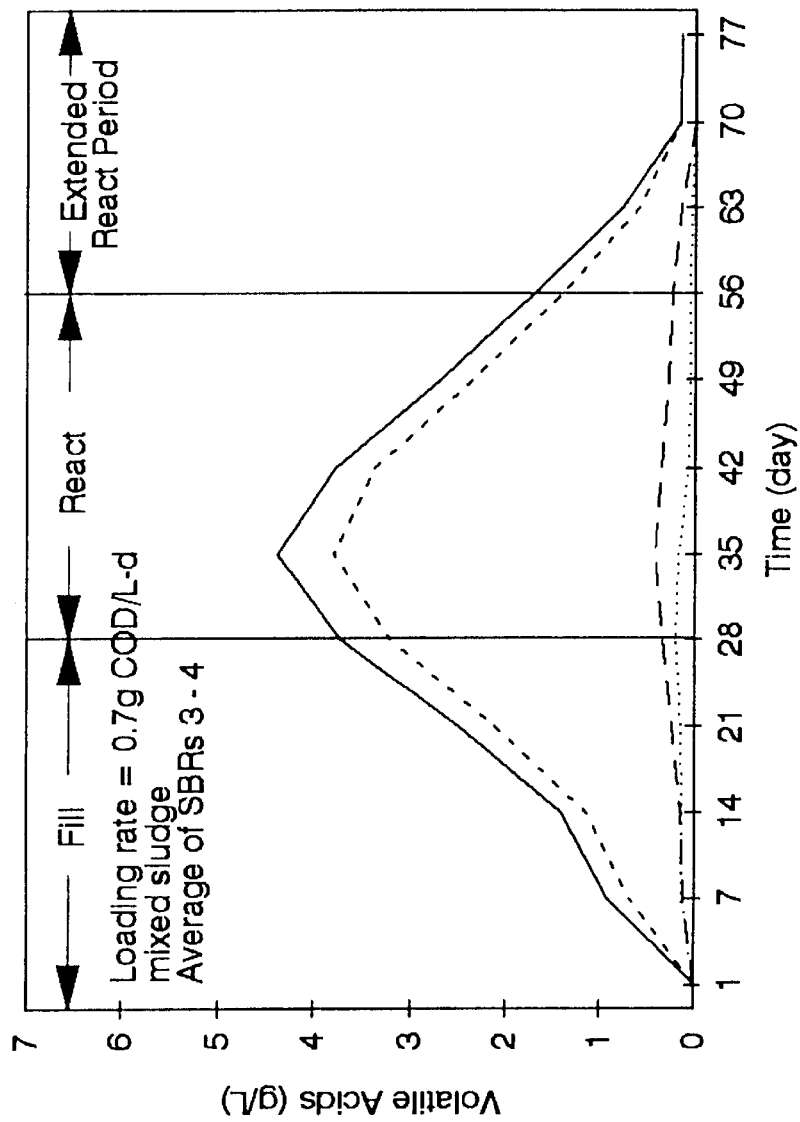
Fig 12B Total and individual volatile acids concentration as a function of time
(——— total volatile acids, – – – acetic acids, ······ butyric acids, – · – propionic acid).

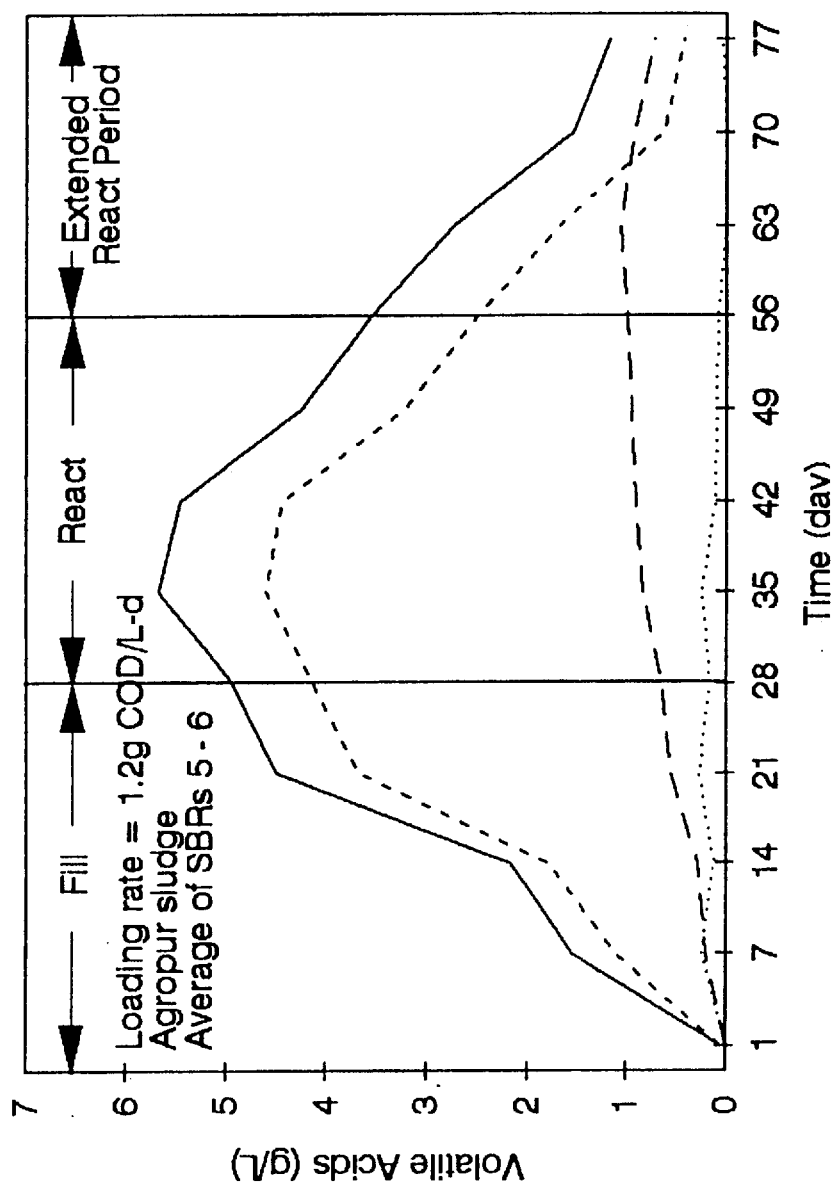
Fig 12C Total and individual volatile acids concentration as a function of time
(—— total volatile acids, - - - acetic acids, ····· butyric acids, – – propionic acid).

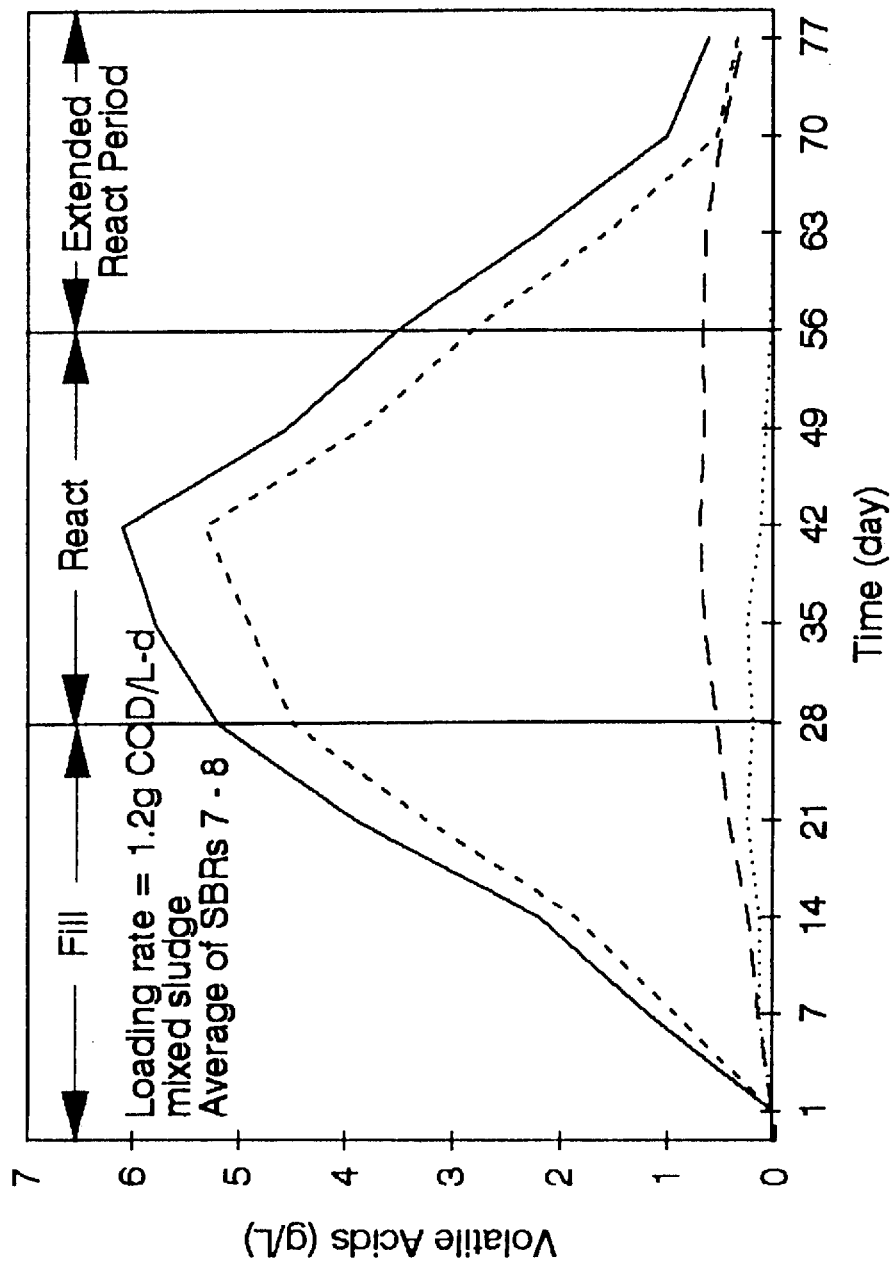
Fig 12D Total and individual volatile acids concentration as a function of time (——— total volatile acids, - - - acetic acids, ····· butyric acids, — — propionic acid).

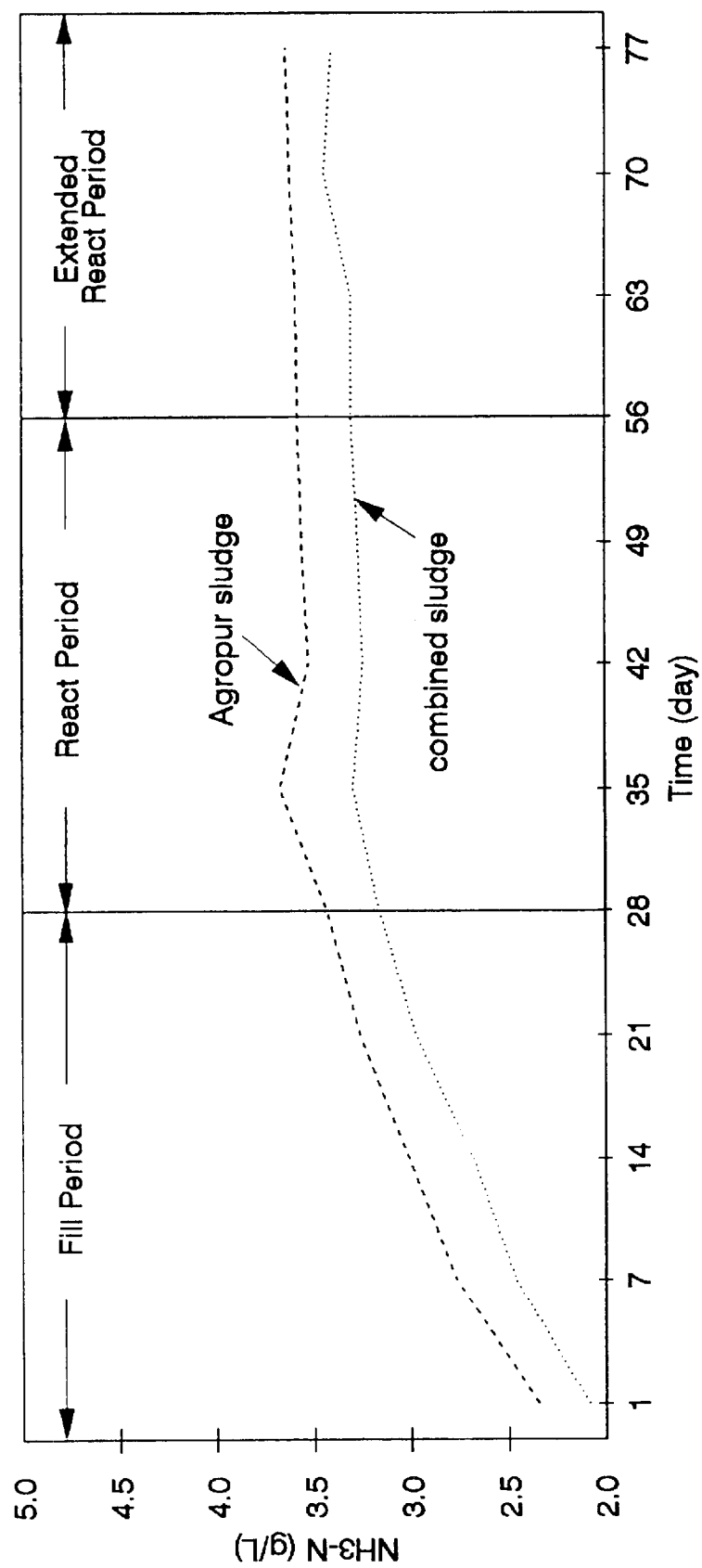
Fig 13A PH, alkalinity (g CaCO3/L) and NH3-N concentration as a function of time for SBRs with a loading rate of 1.2 g COD/L-d, ----- average of SBRs 5 - 6, ······ average of SBRs 7 - 8

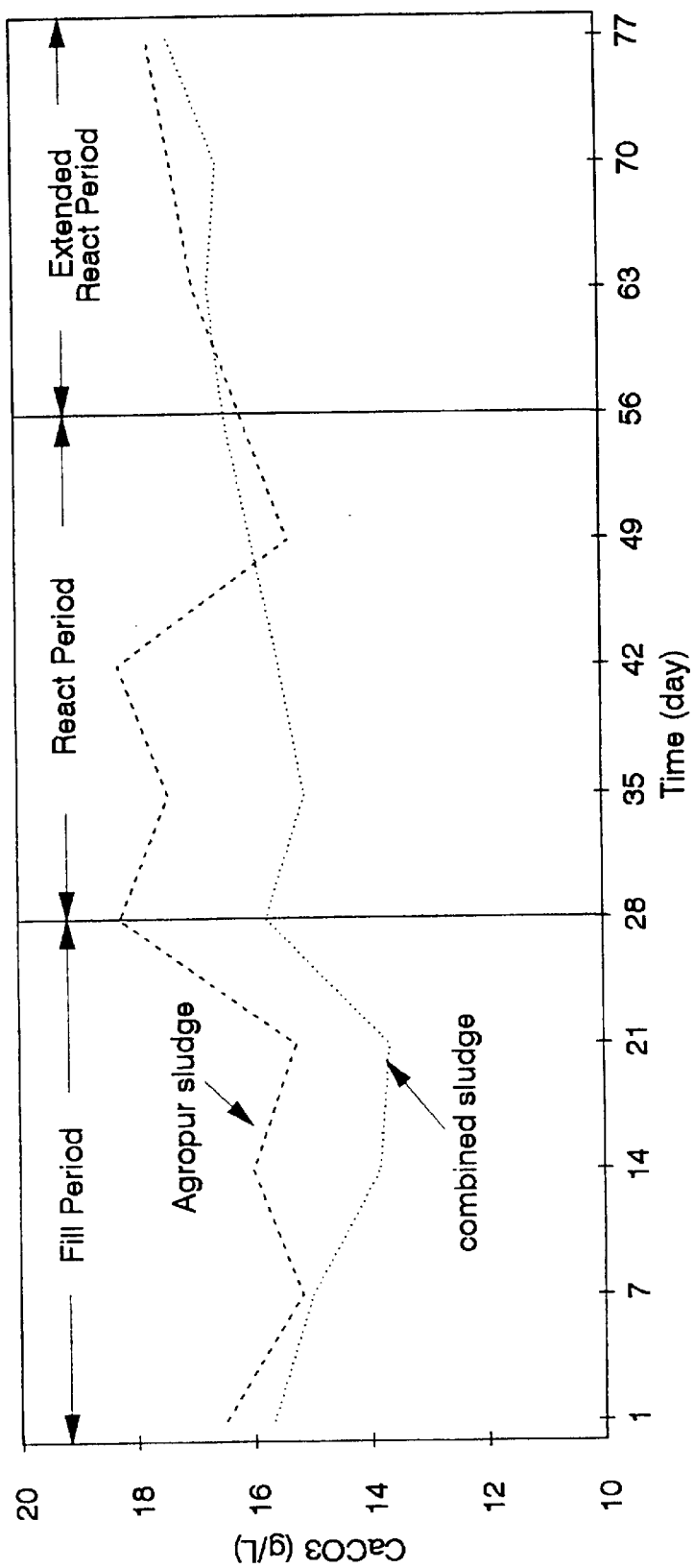
Fig 13B PH, alkalinity (g CaCO3/L) and NH3-N concentration as a function of time for SBRs with a loading rate of 1.2 g COD/L-d, —— average of SBRs 5 - 6, ······ average of SBRs 7 - 8

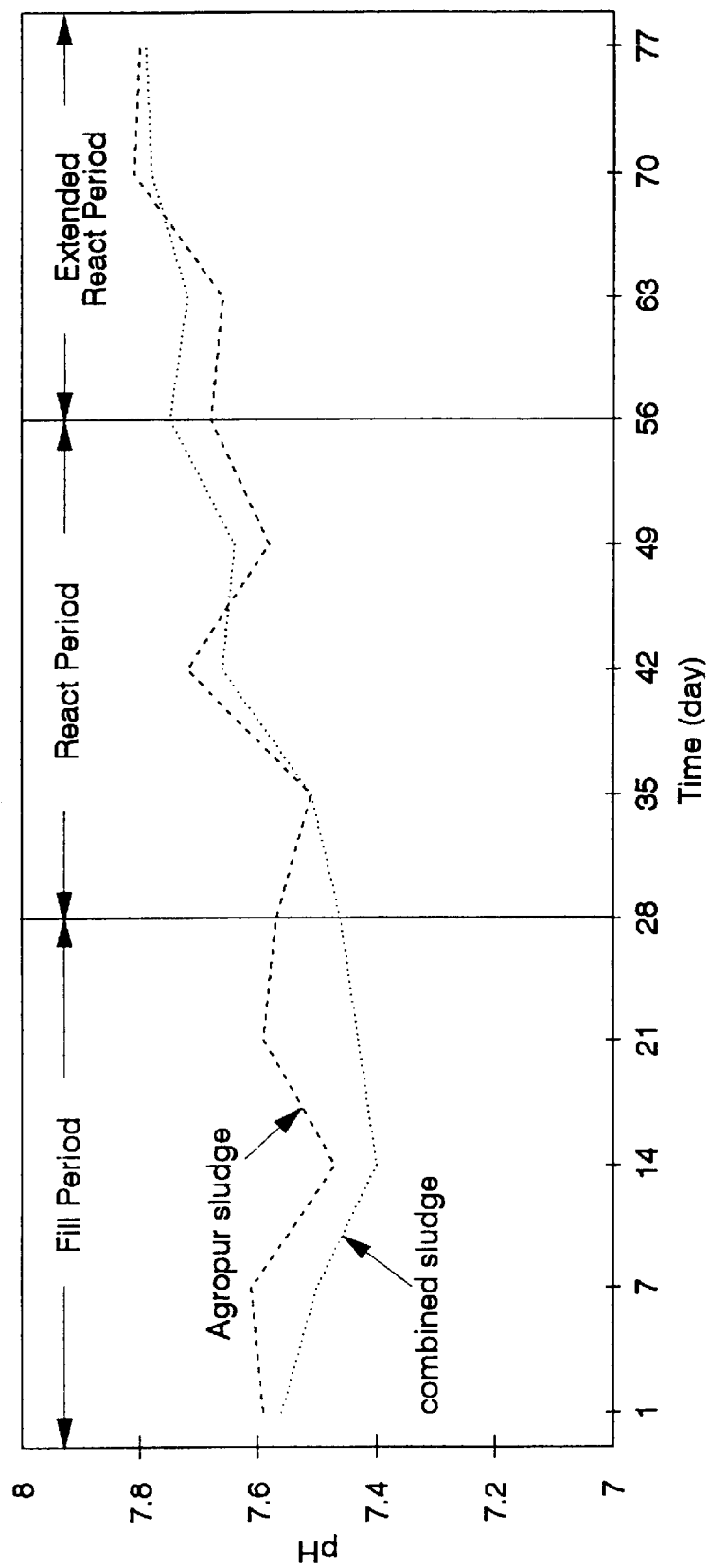
Fig 13C PH, alkalinity (g CaCO3/L) and NH3-N concentration as a function of time for SBRs with a loading rate of 1.2 g COD/L-d, --- average of SBRs 5 - 6, ······ average of SBRs 7 - 8

Comparison of SBRs operating performance in test run number 1, for different organic loading rates (OLR).
- - - SBRs 3 - 4, OLR = 0.81g COD/L-d
· · · · · SBRs 7 - 8, OLR = 1.22g COD/L-d
——— SBRs 11 - 12, OLR = 1.63g COD/L-d

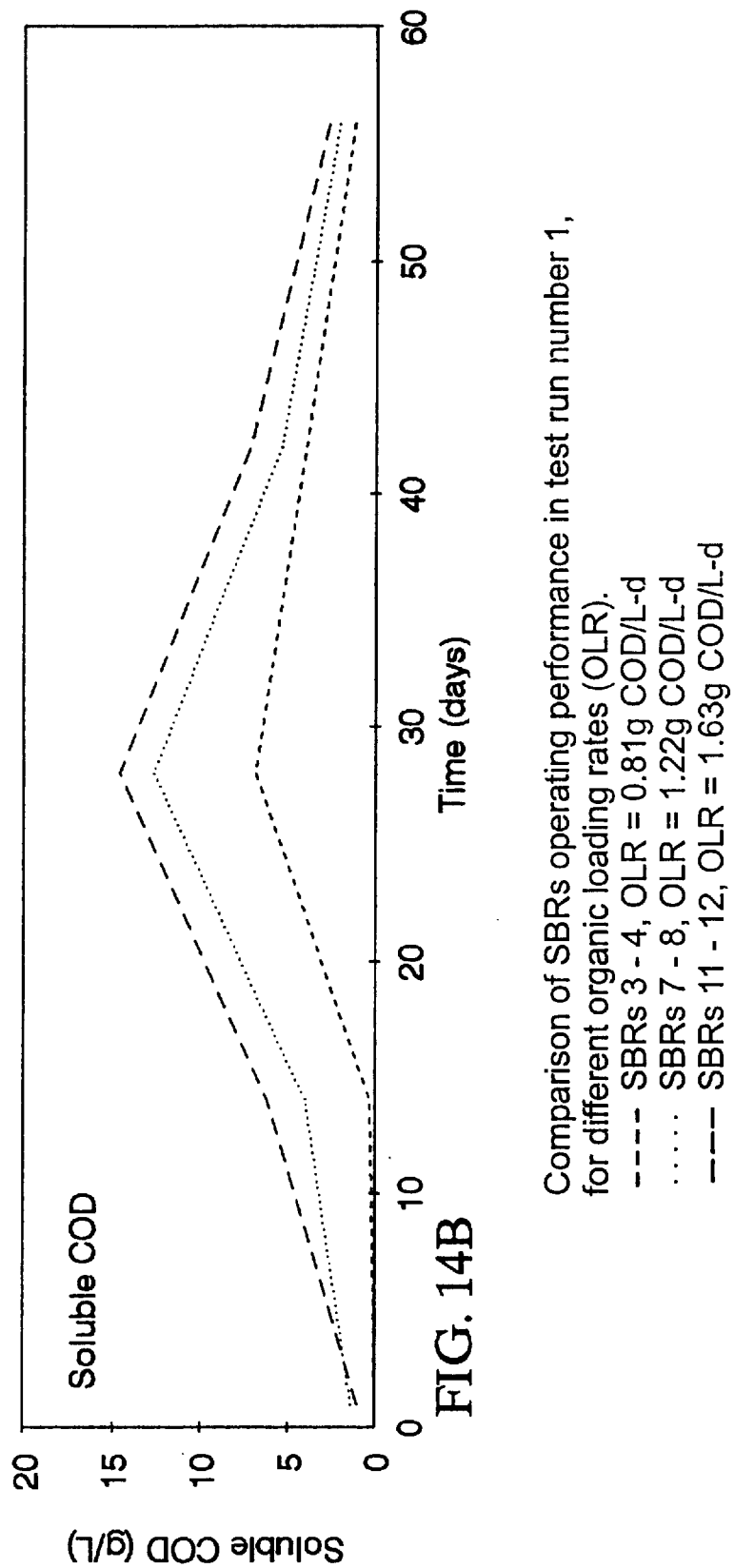

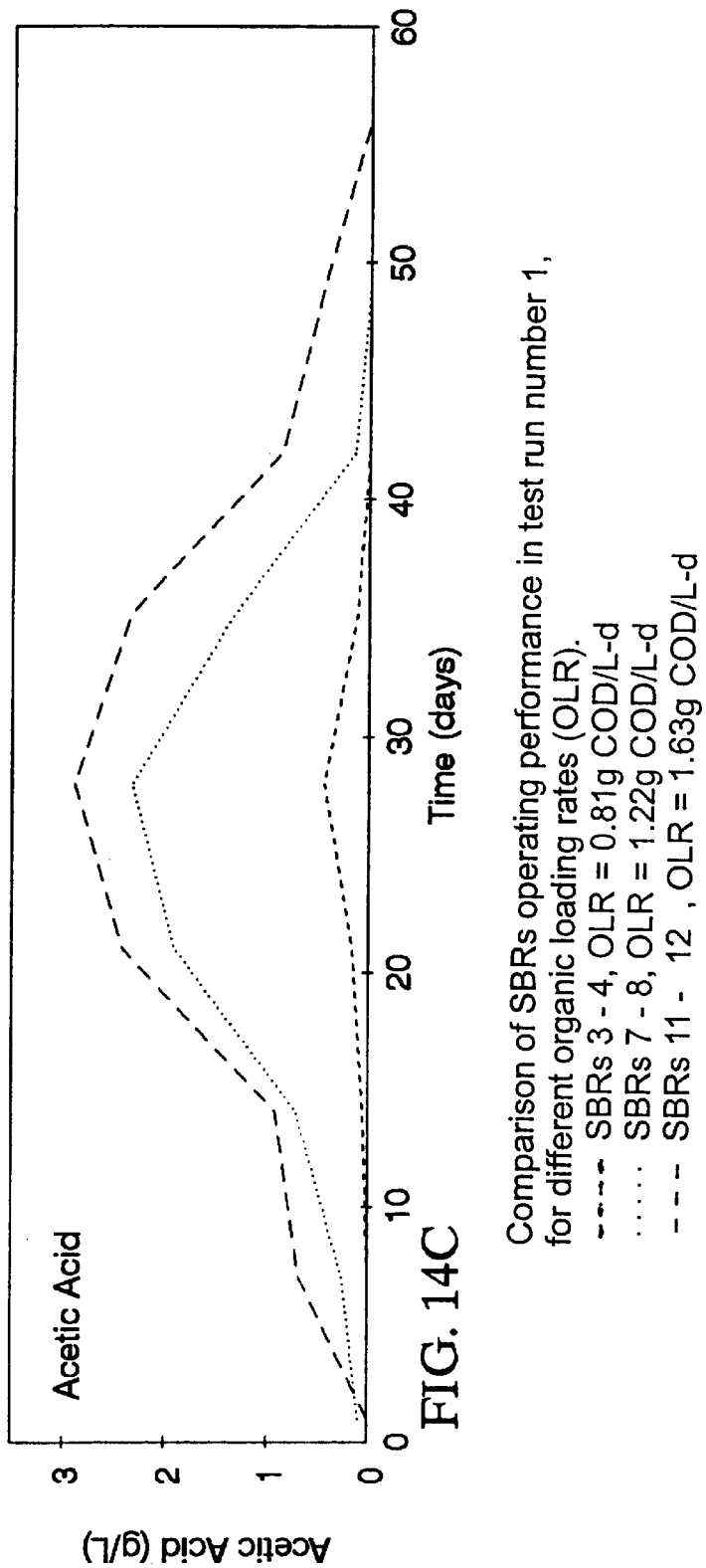

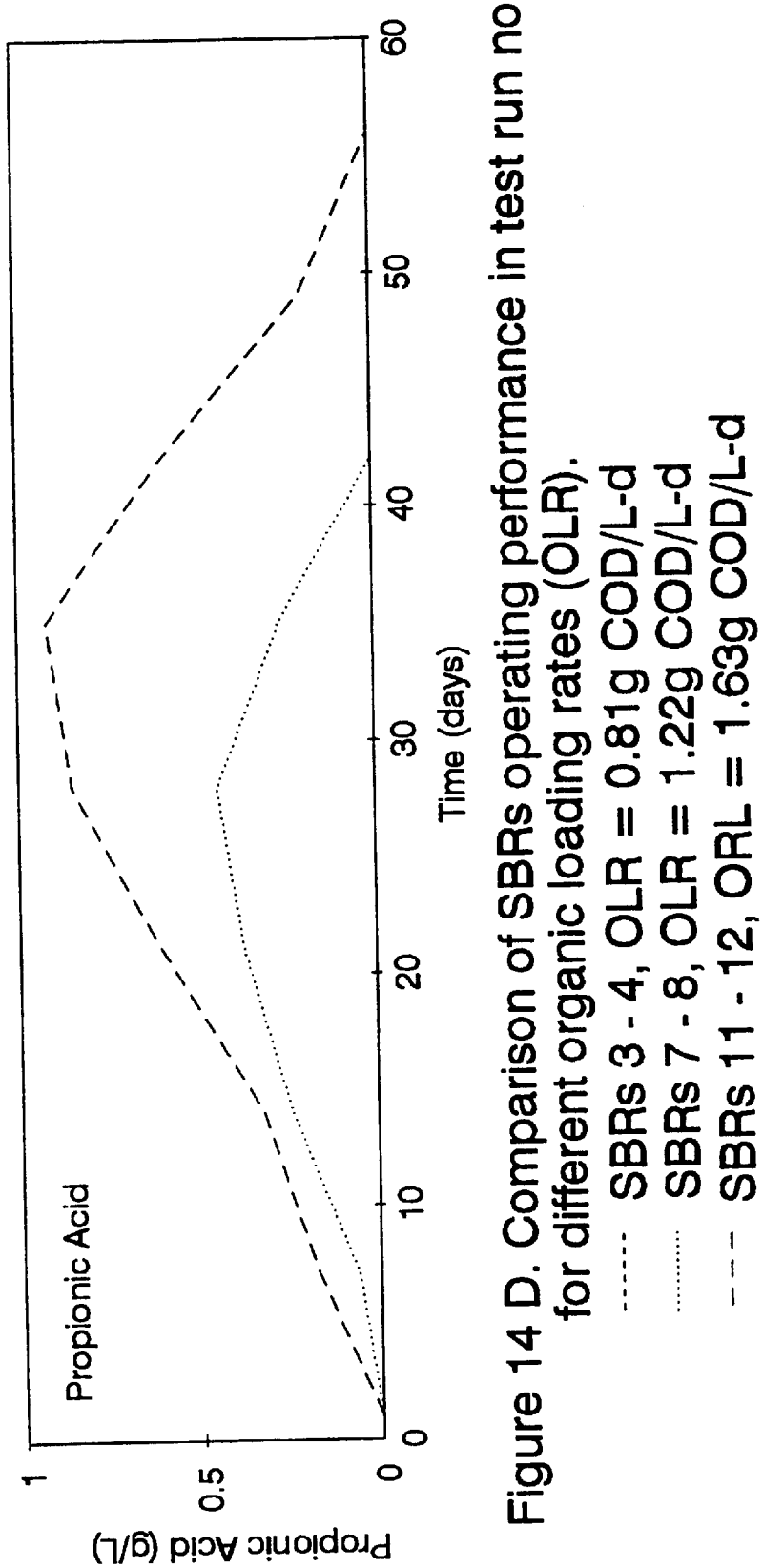
Figure 14 D. Comparison of SBRs operating performance in test run no. 1, for different organic loading rates (OLR).

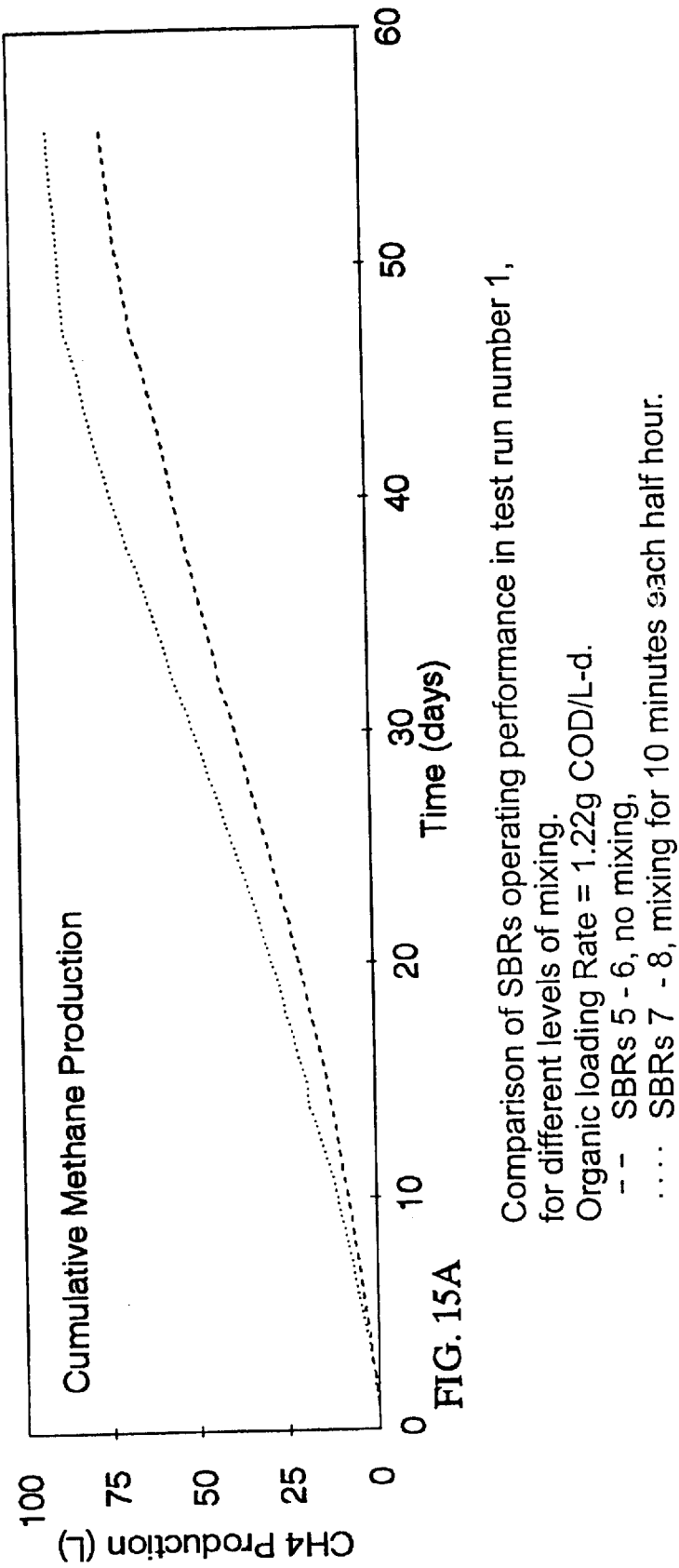

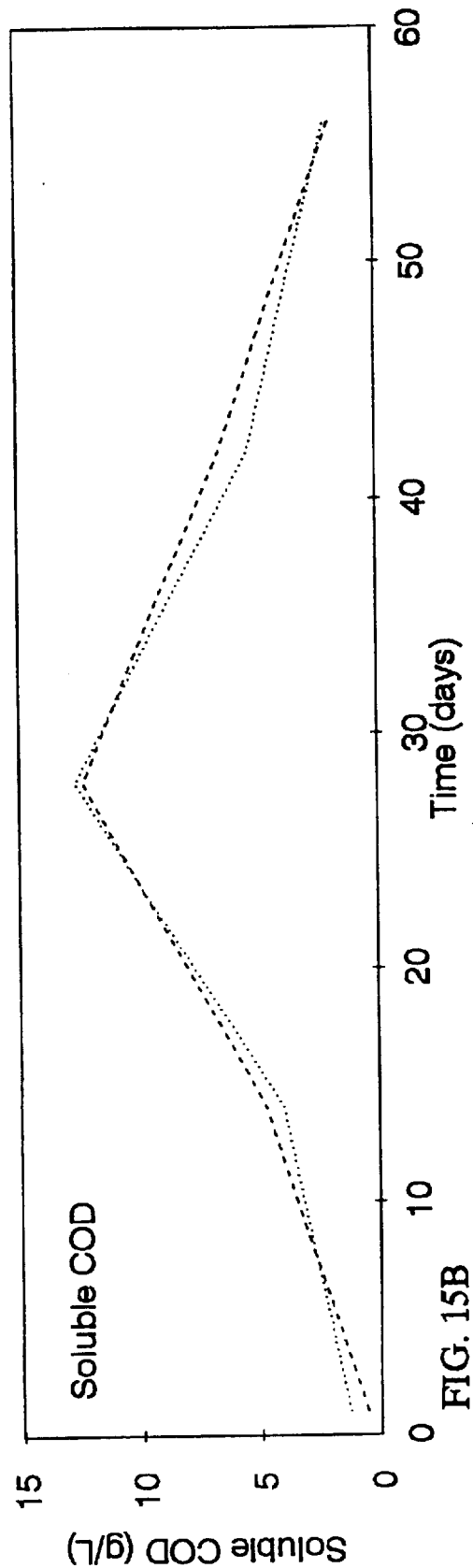

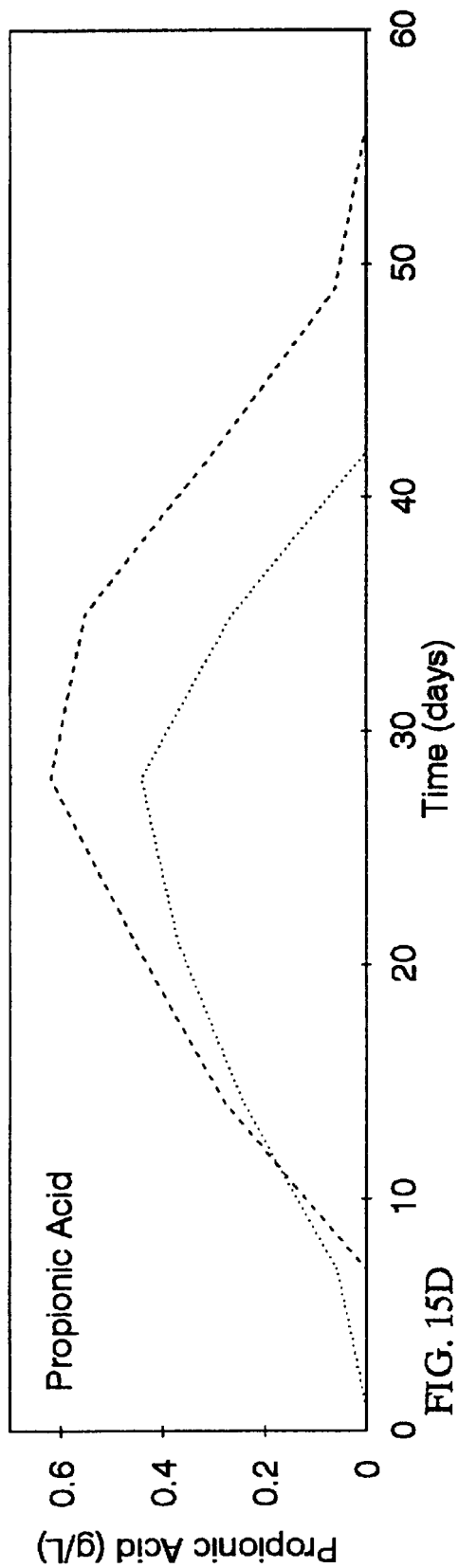

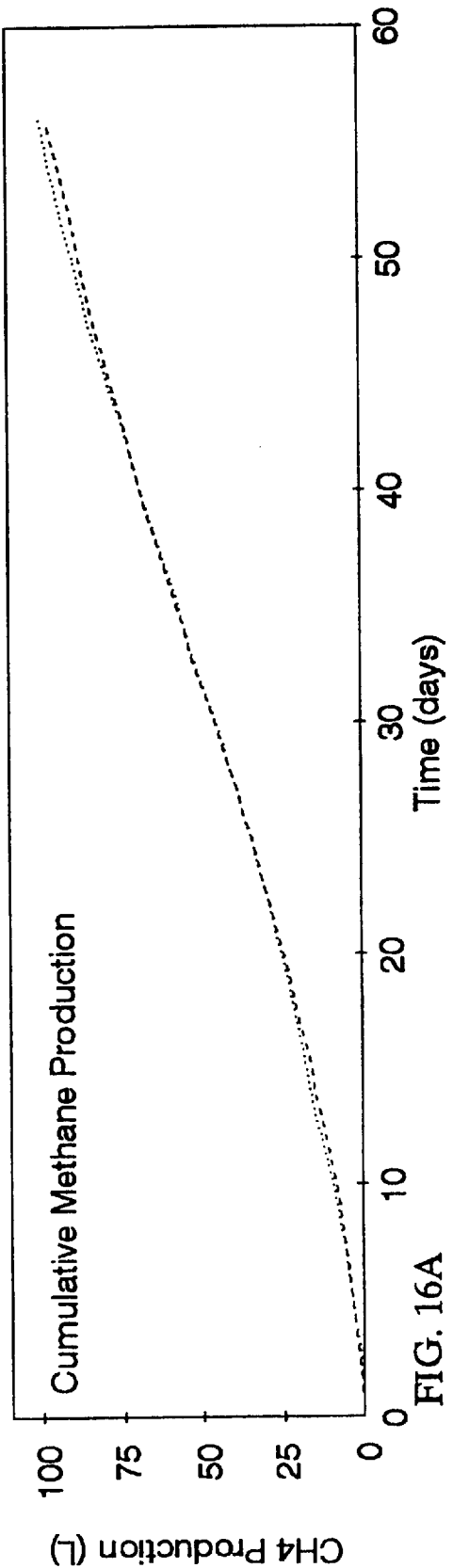

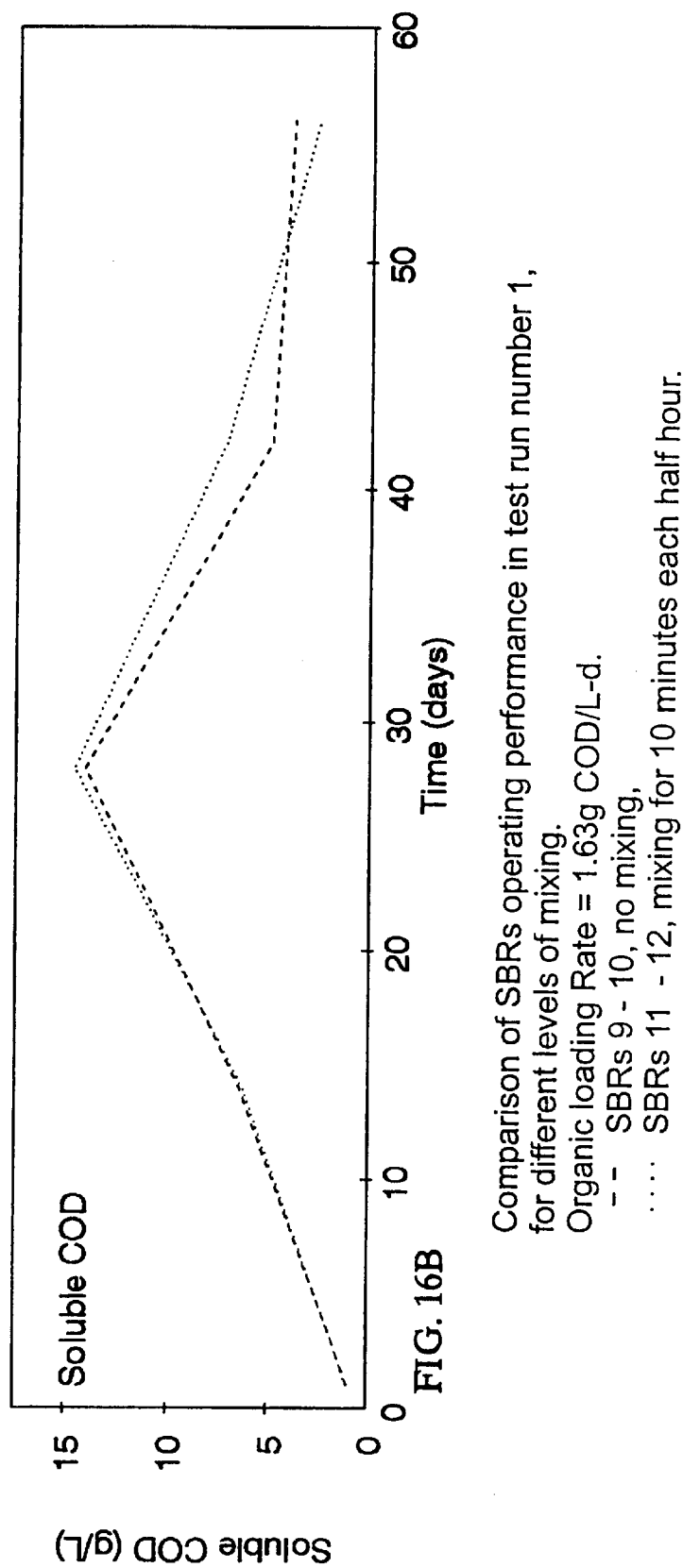

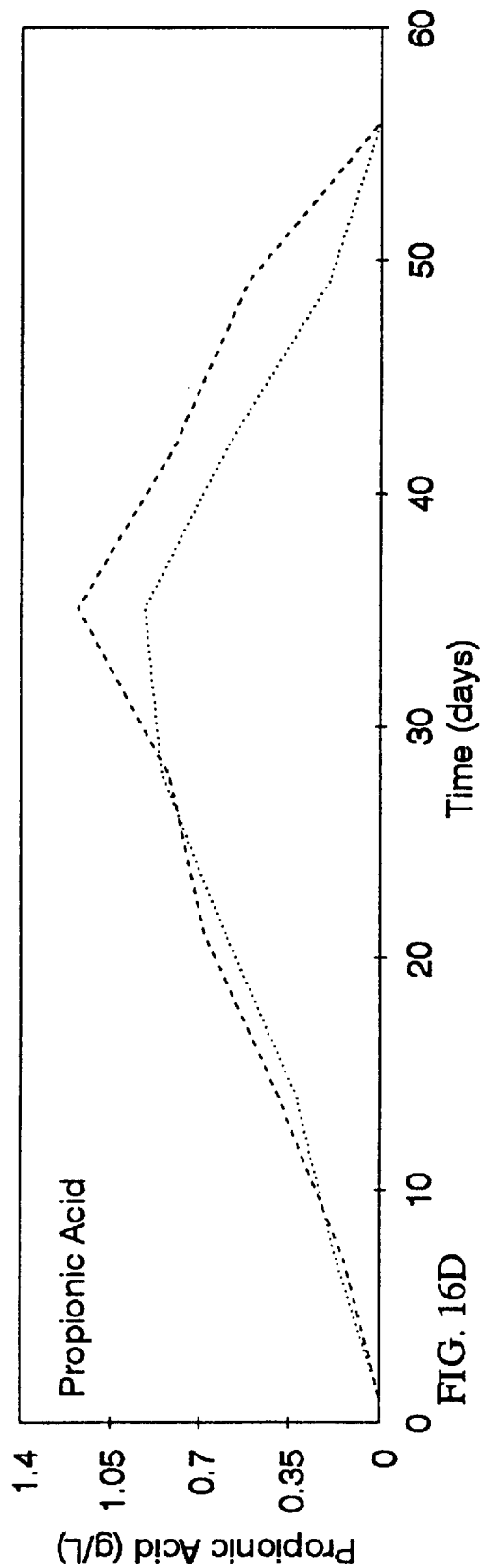
FIG. 16D Comparison of SBRs operating performance in test run no. 1, for different levels of mixing. Organic Load Rate = 1.63g COD/L-d.

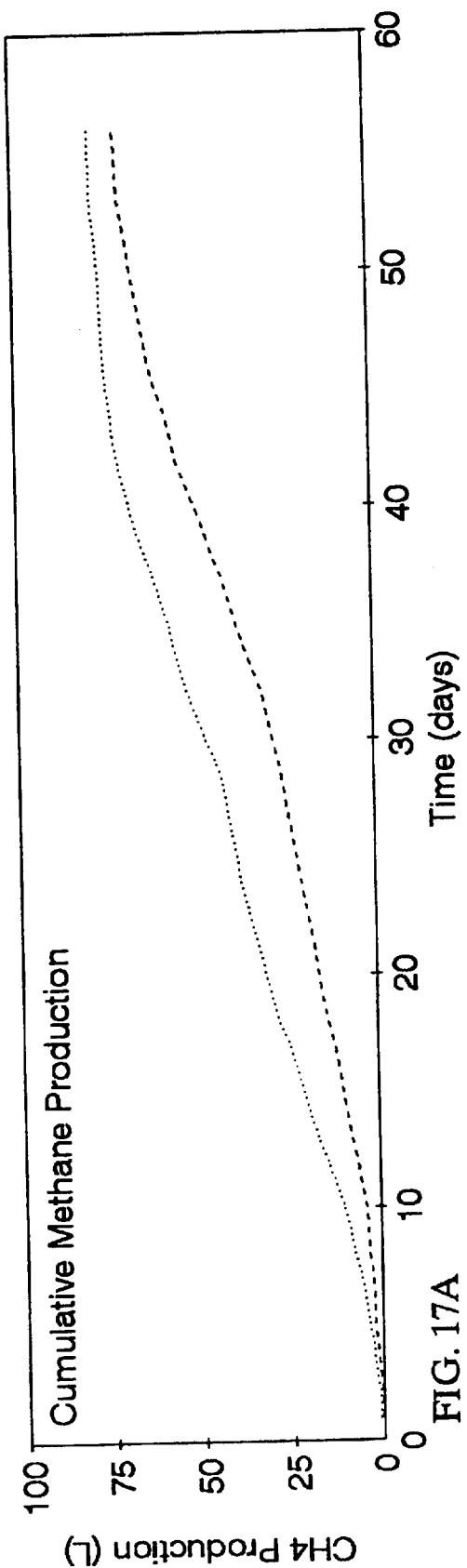

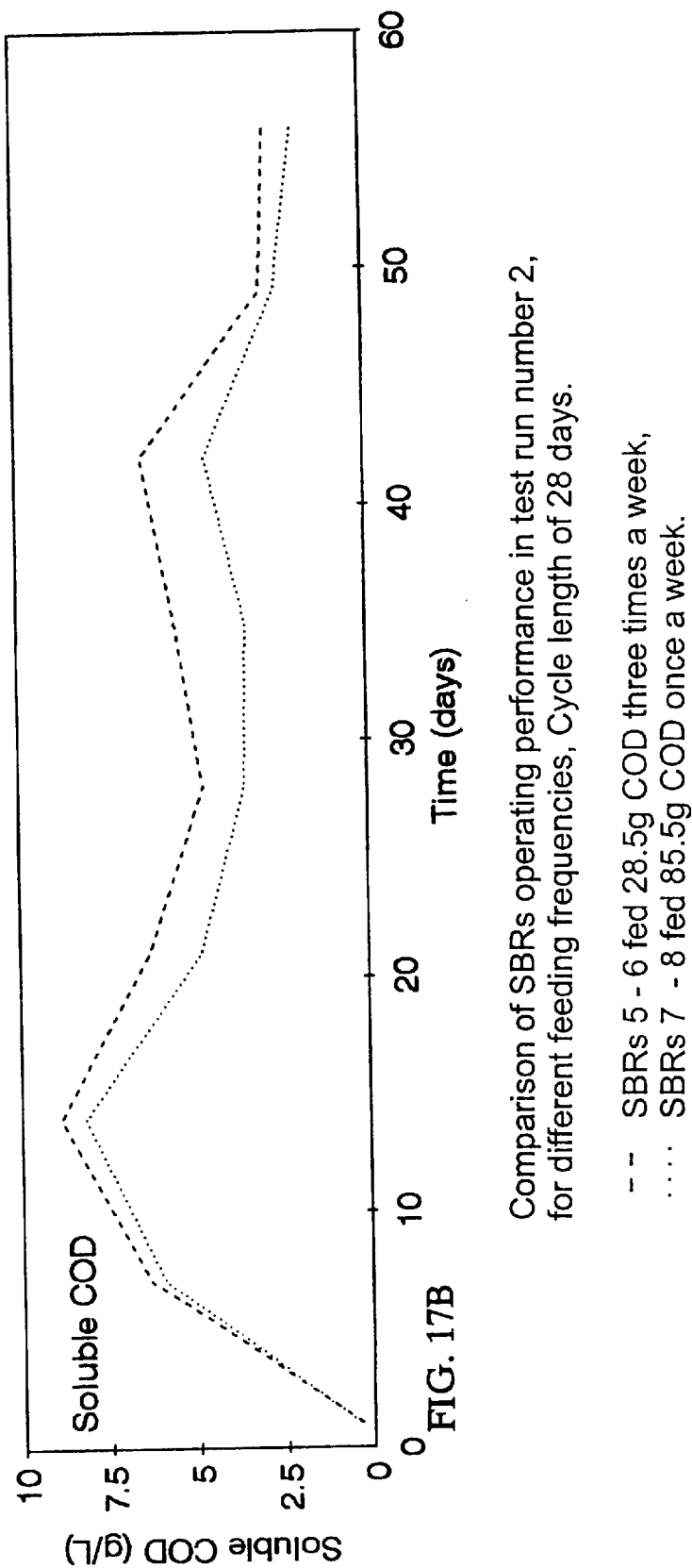

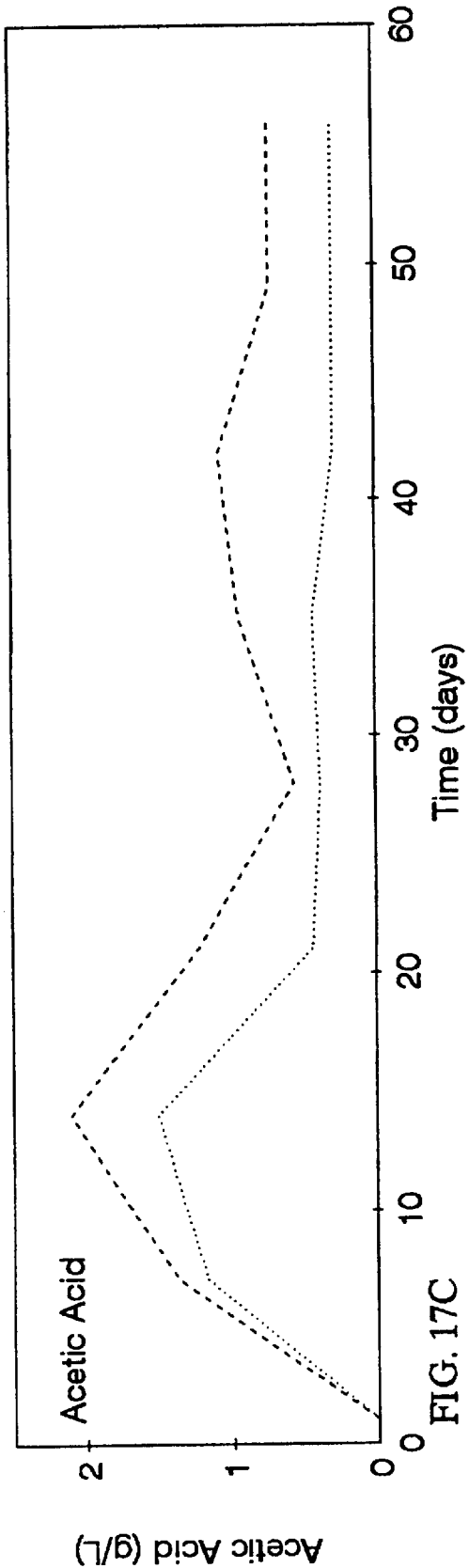

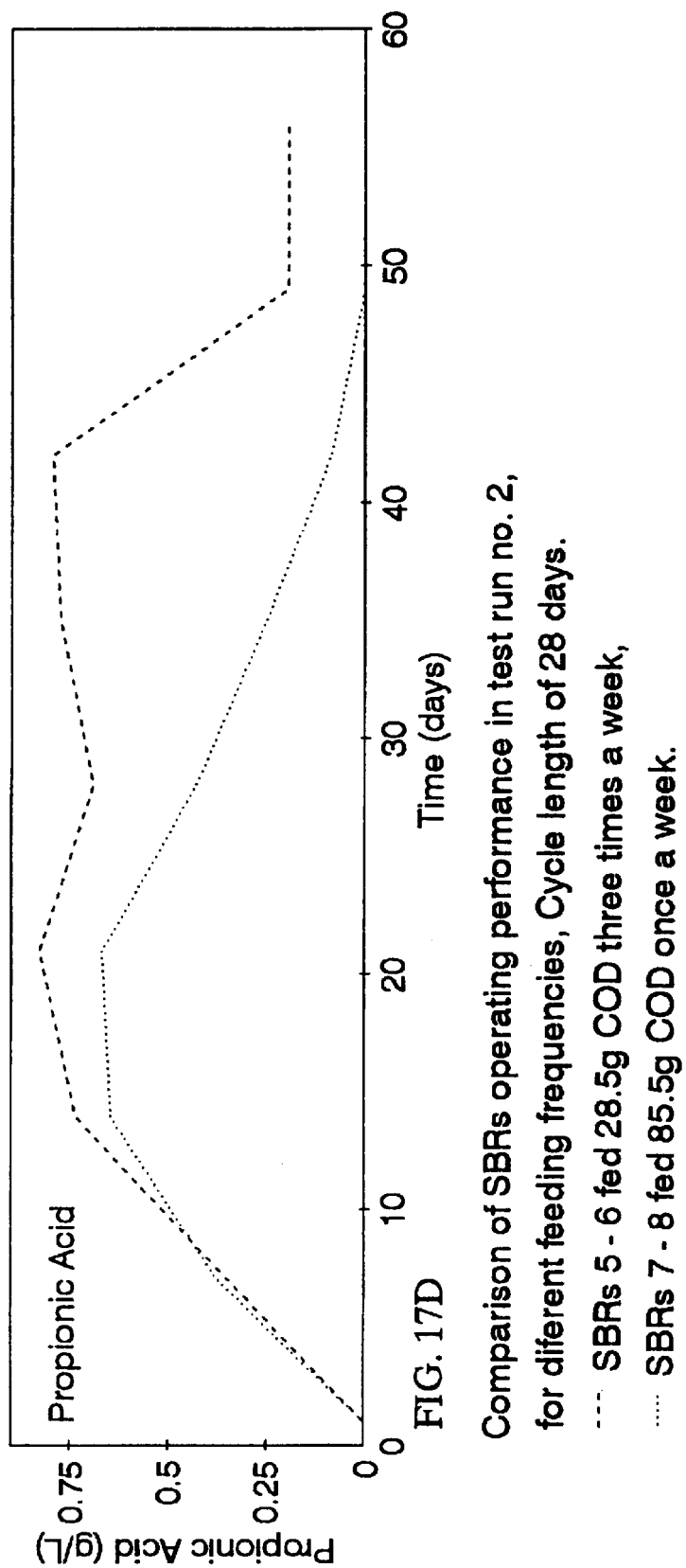

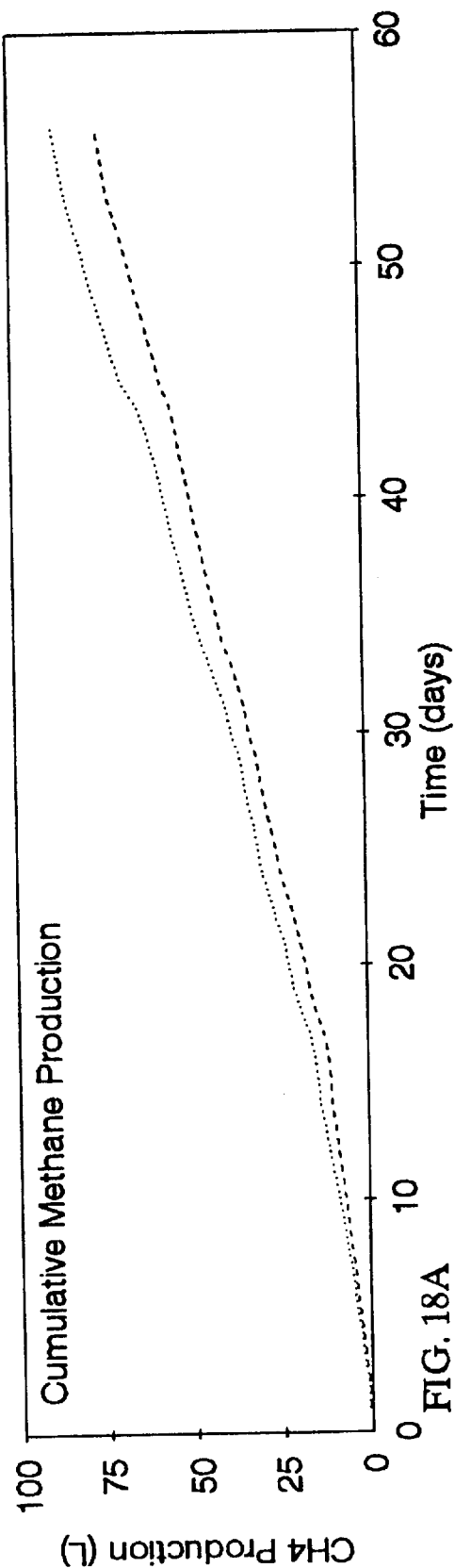

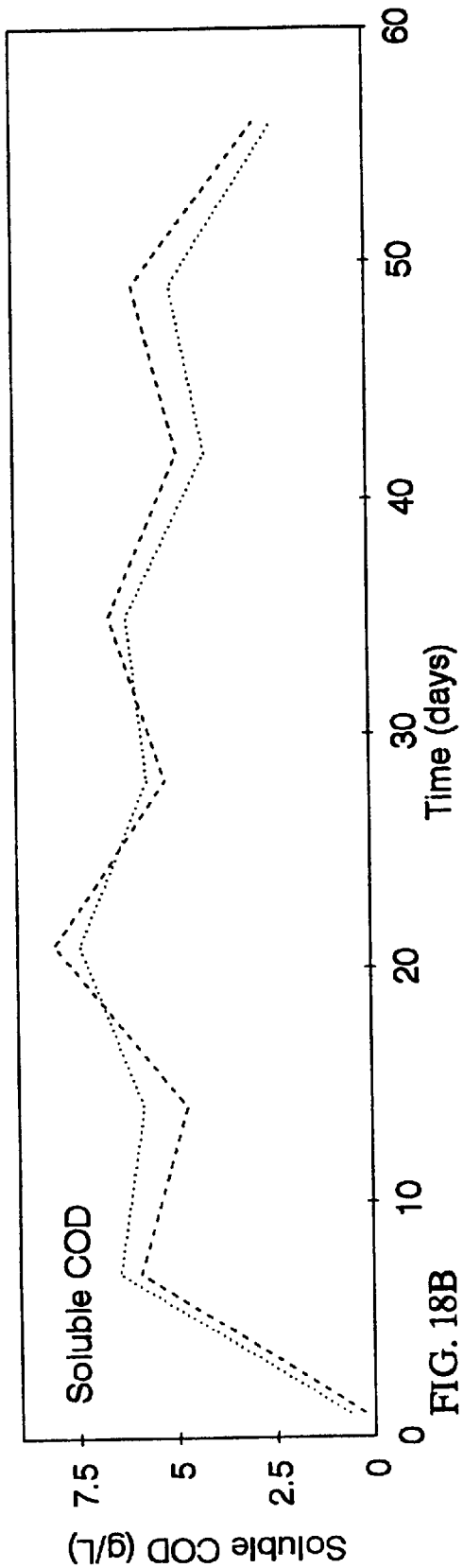

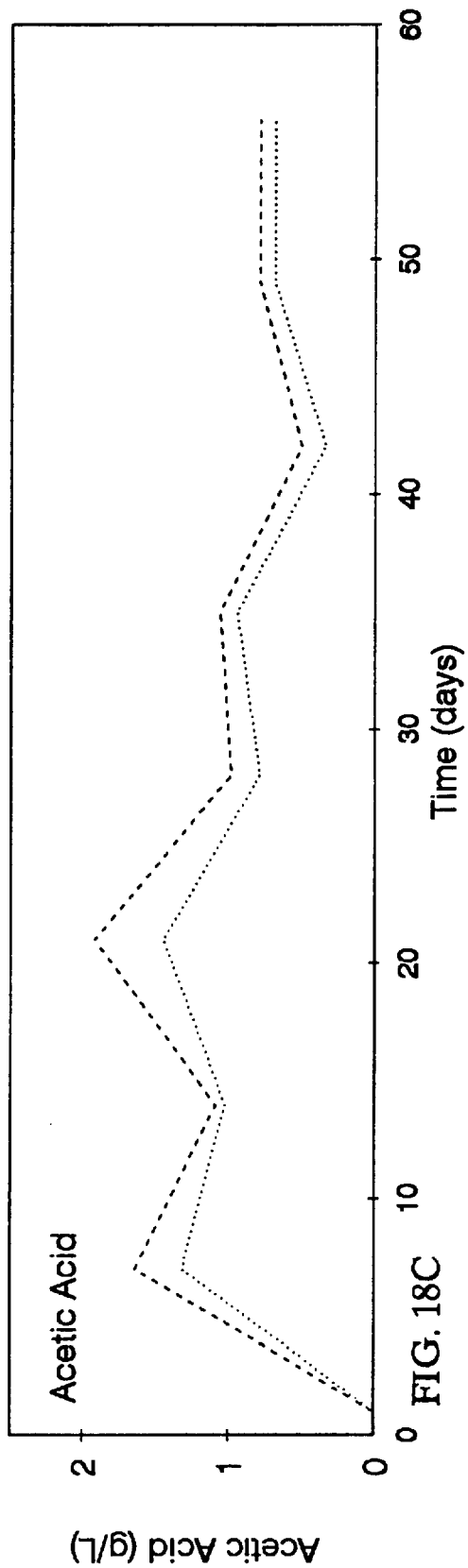

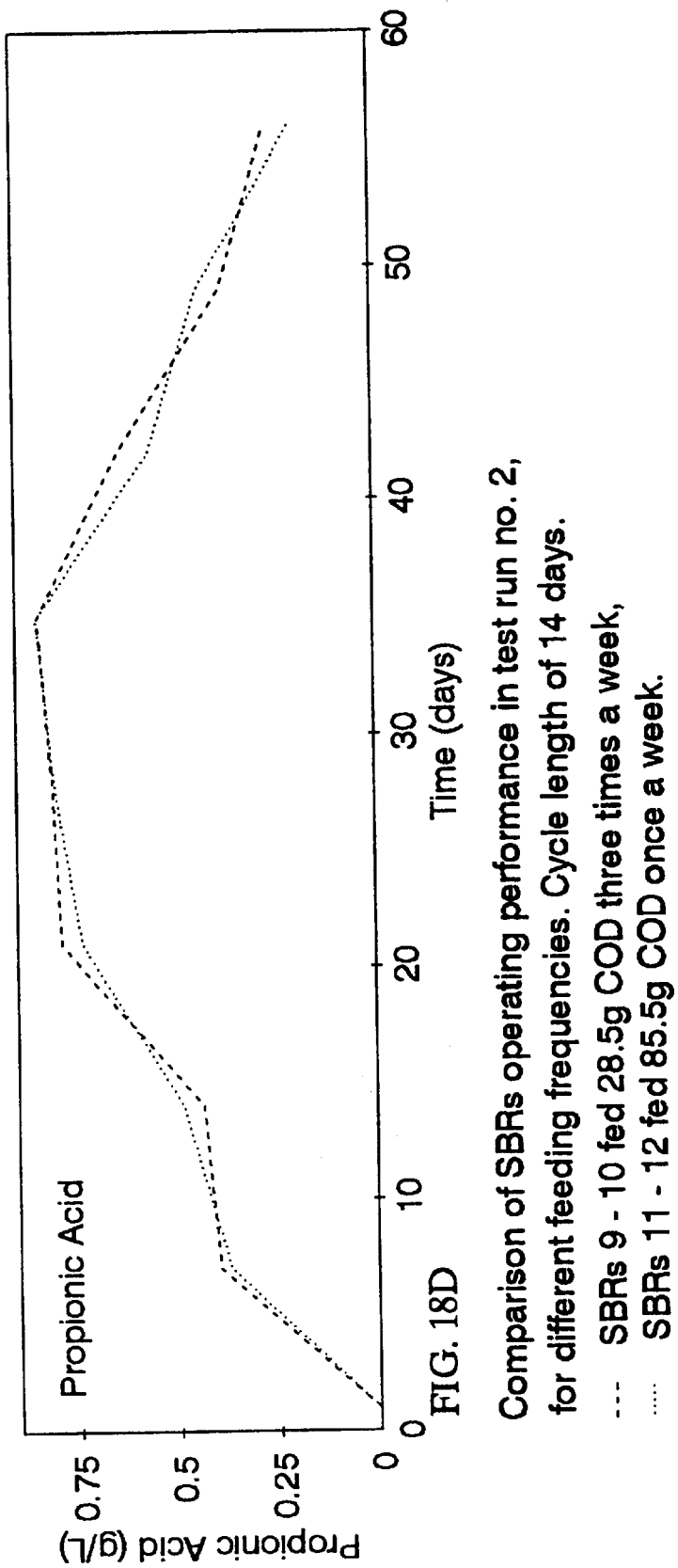
FIG. 18D Comparison of SBRs operating performance in test run no. 2, for different feeding frequencies. Cycle length of 14 days.
--- SBRs 9 - 10 fed 28.5g COD three times a week,
···· SBRs 11 - 12 fed 85.5g COD once a week.

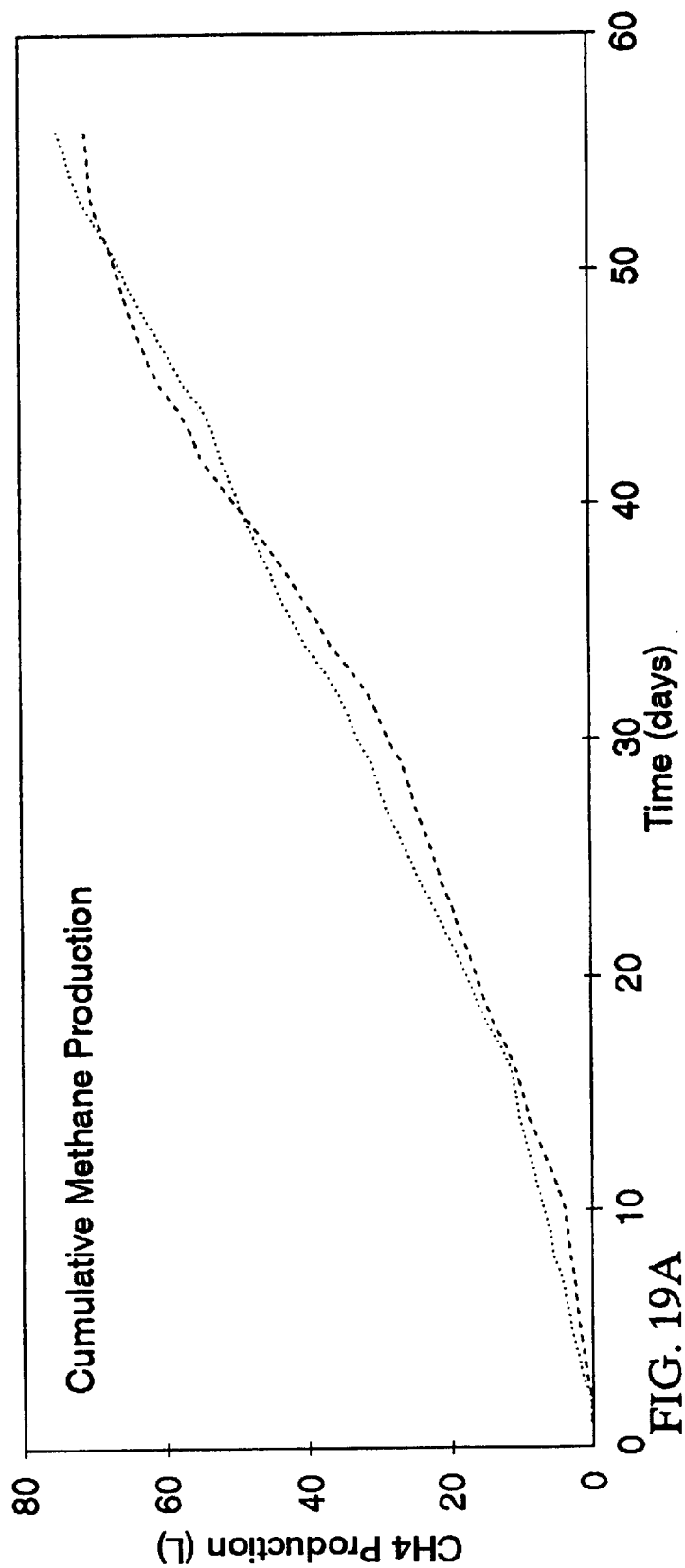

Comparison of SBRs operating performance in test run number 2, for different cycle lengths. SBRs were fed three times a week.
— — SBRs 5 - 6 were a 28 day cycle,
······ SBRs 9 - 10 were a 14 day cycle.

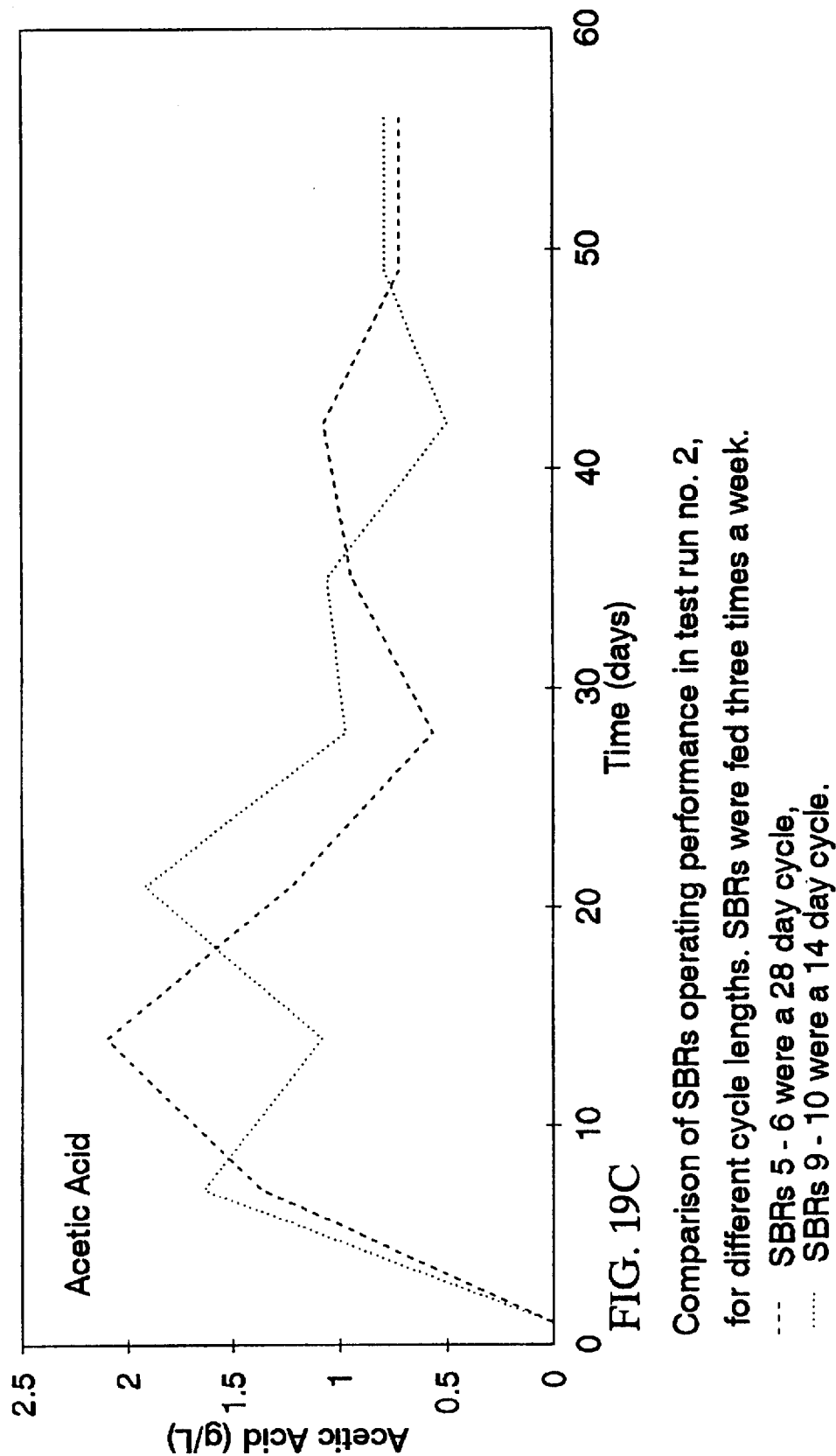

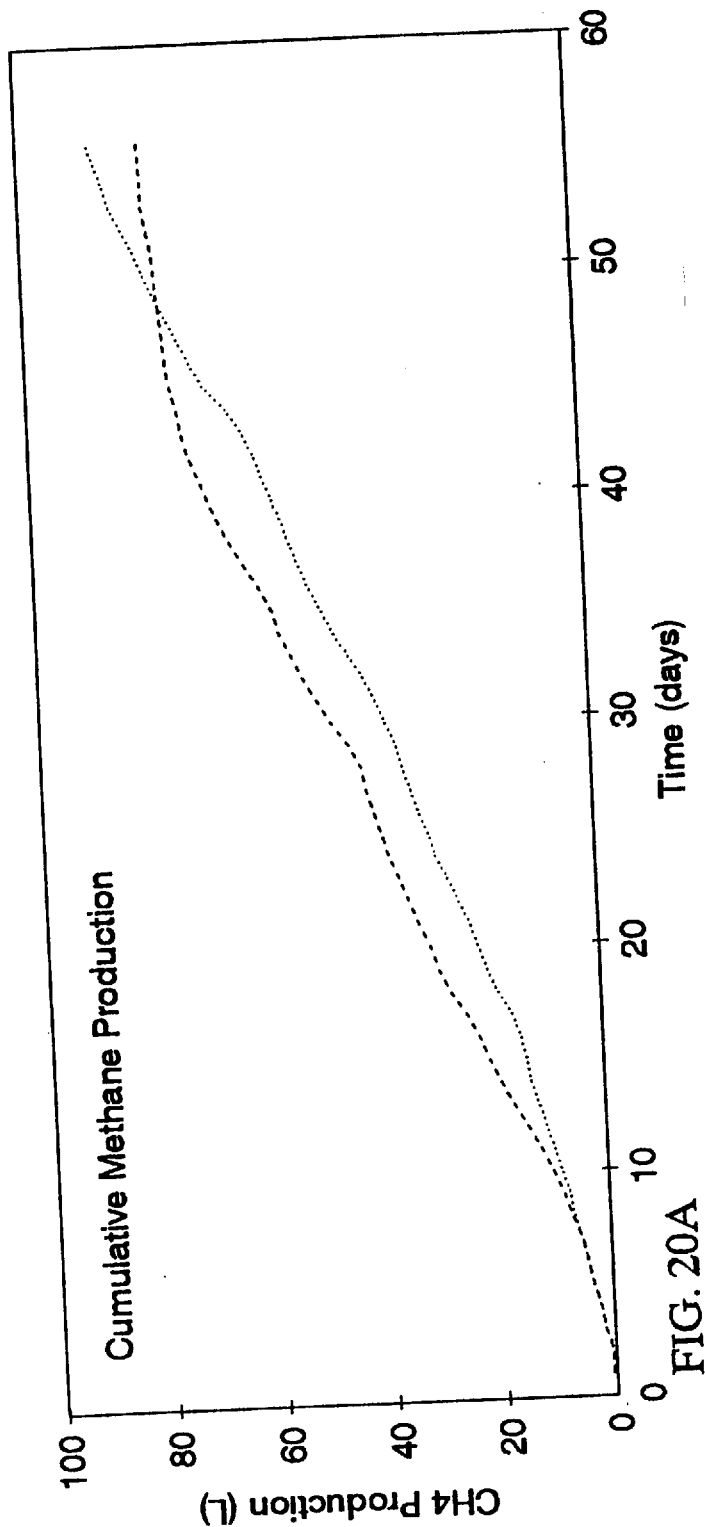

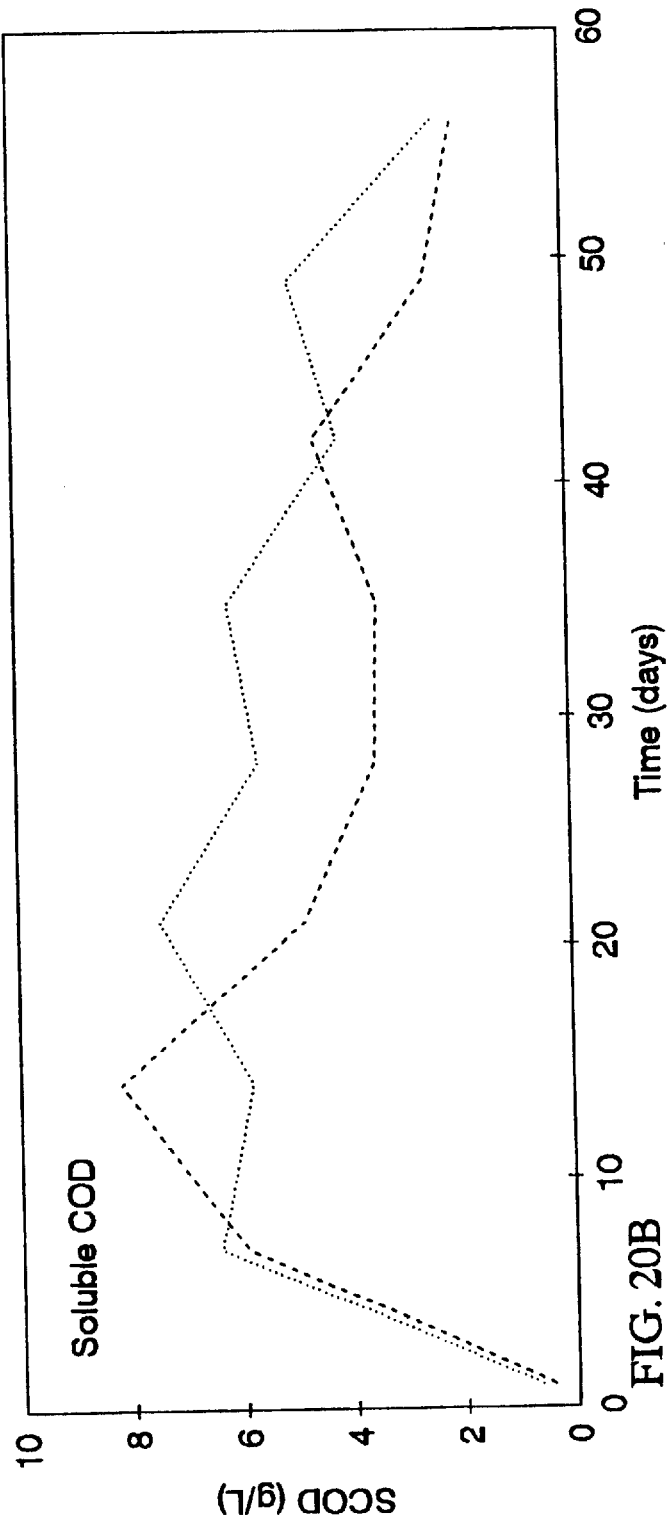

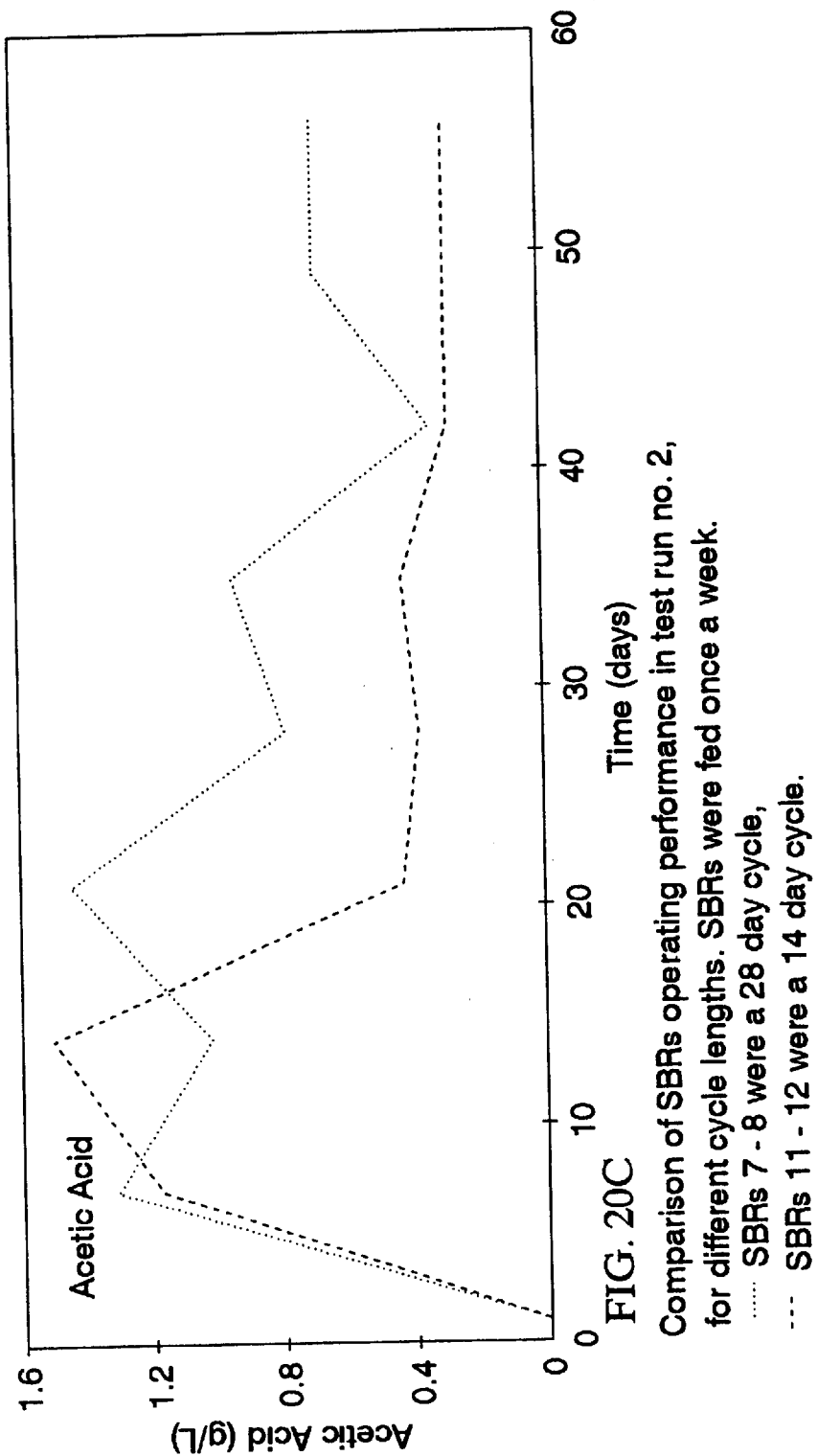

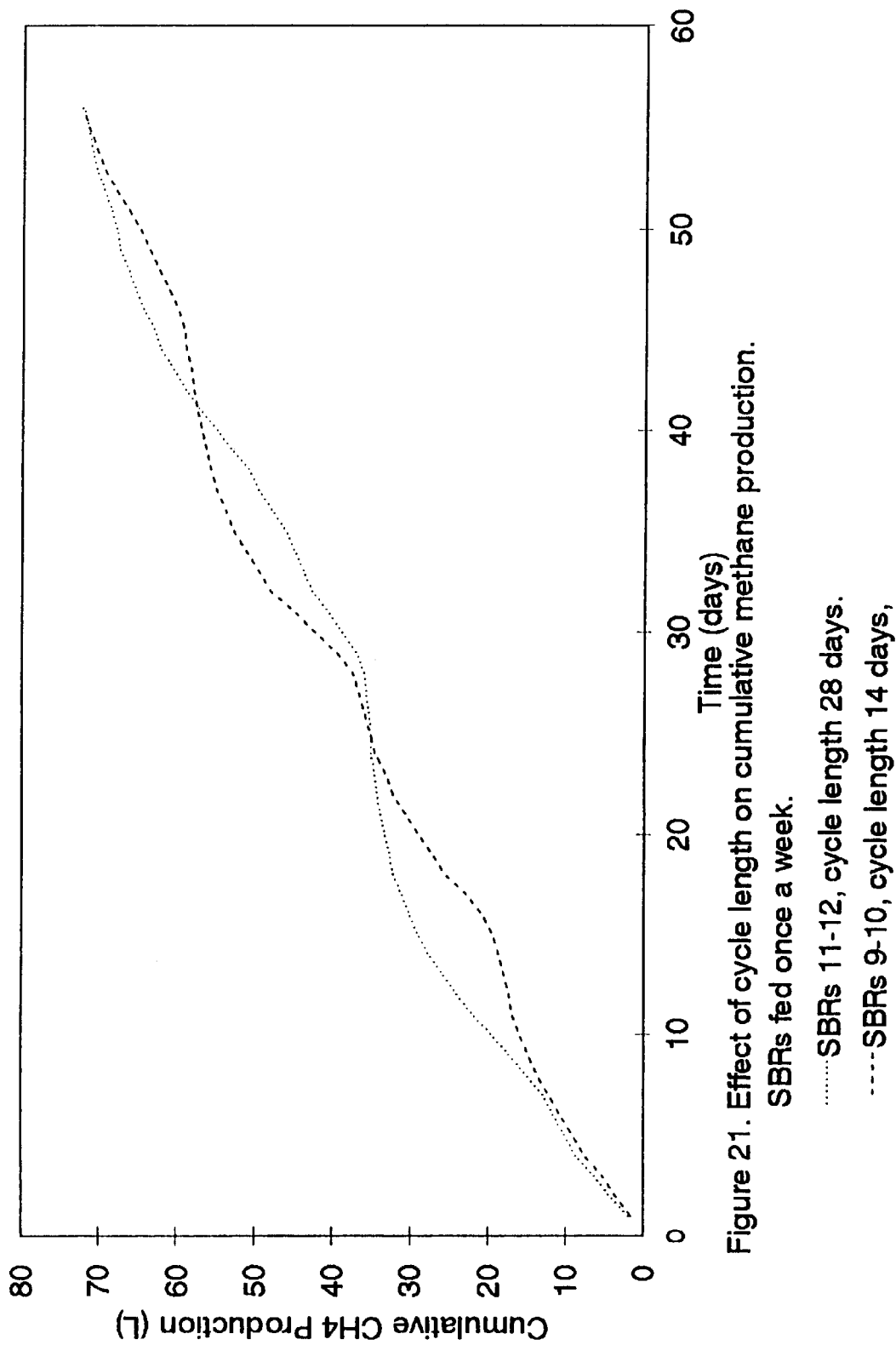
Figure 21. Effect of cycle length on cumulative methane production. SBRs fed once a week.
······ SBRs 11-12, cycle length 28 days.
---- SBRs 9-10, cycle length 14 days,

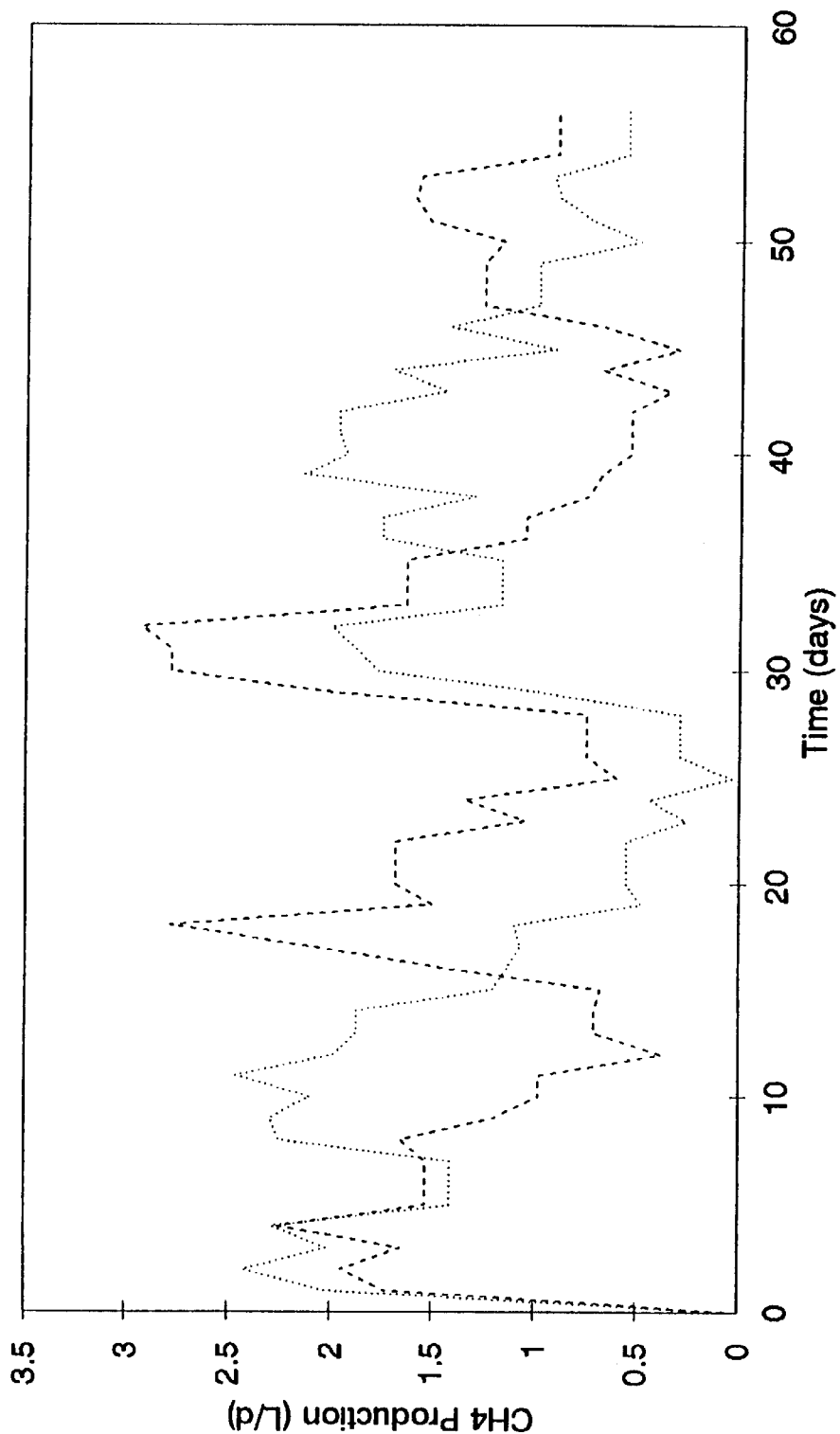
Figure 22. Effect of cycle length on daily methane production. SBRs fed once a week.
---- SBRs 9-10, cycle length 14 days,
······ SBRs 11-12, cycle length 28 days.

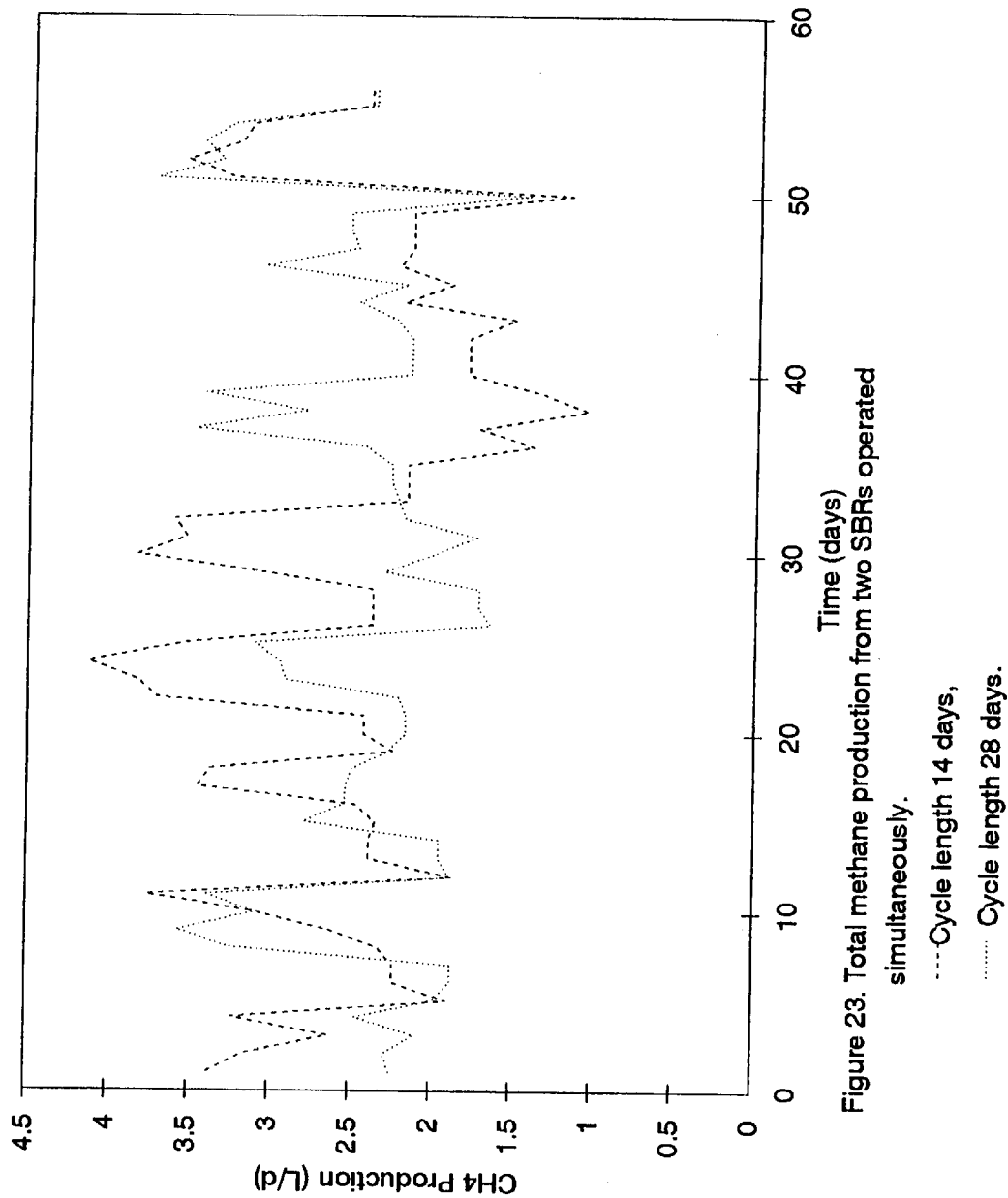
Figure 23. Total methane production from two SBRs operated simultaneously.
--- Cycle length 14 days,
...... Cycle length 28 days.

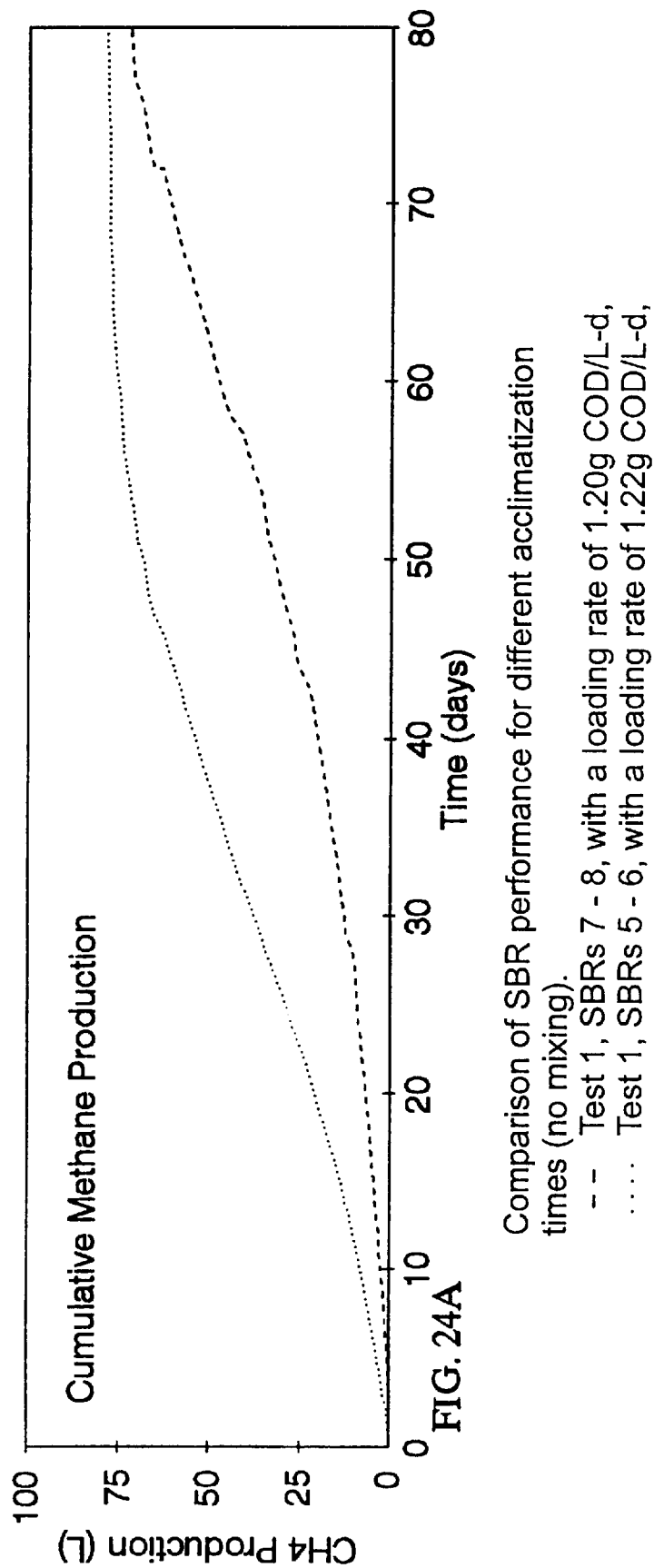

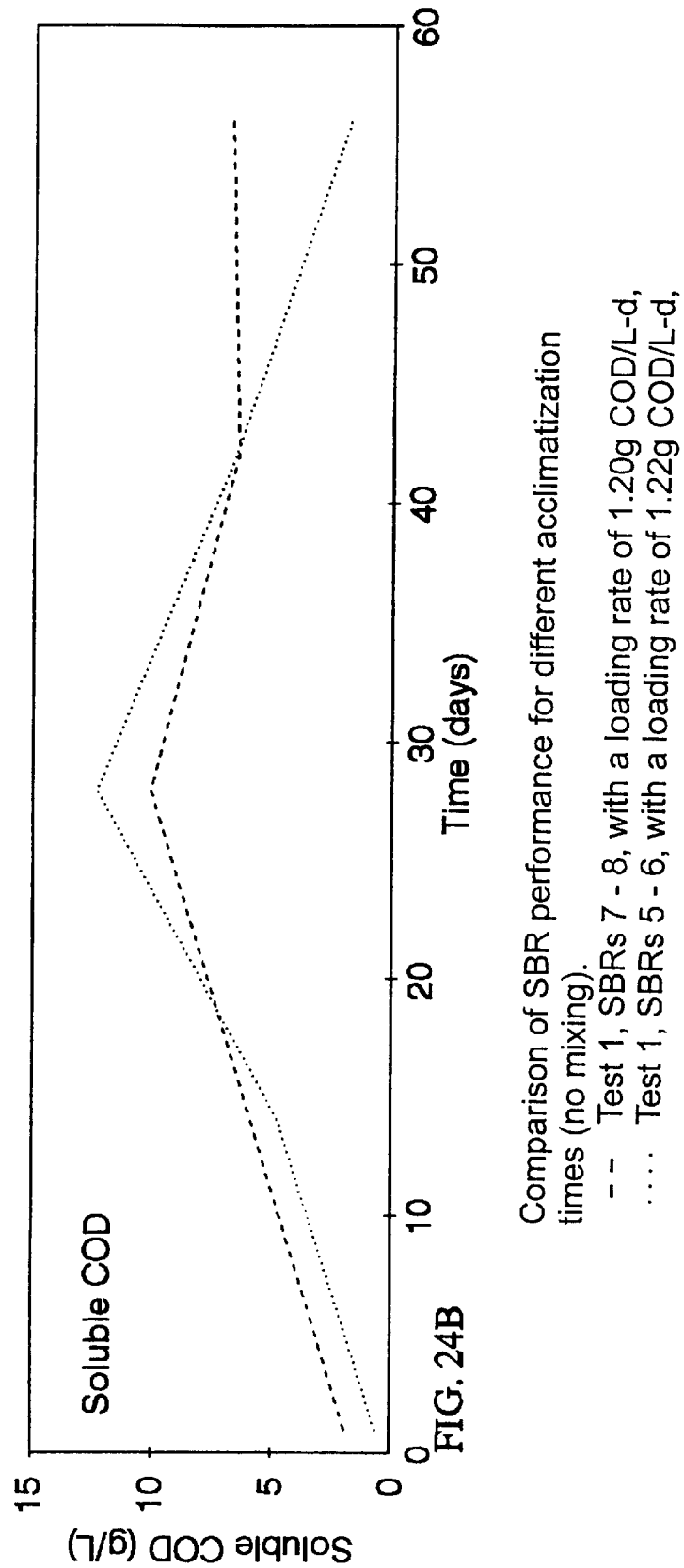

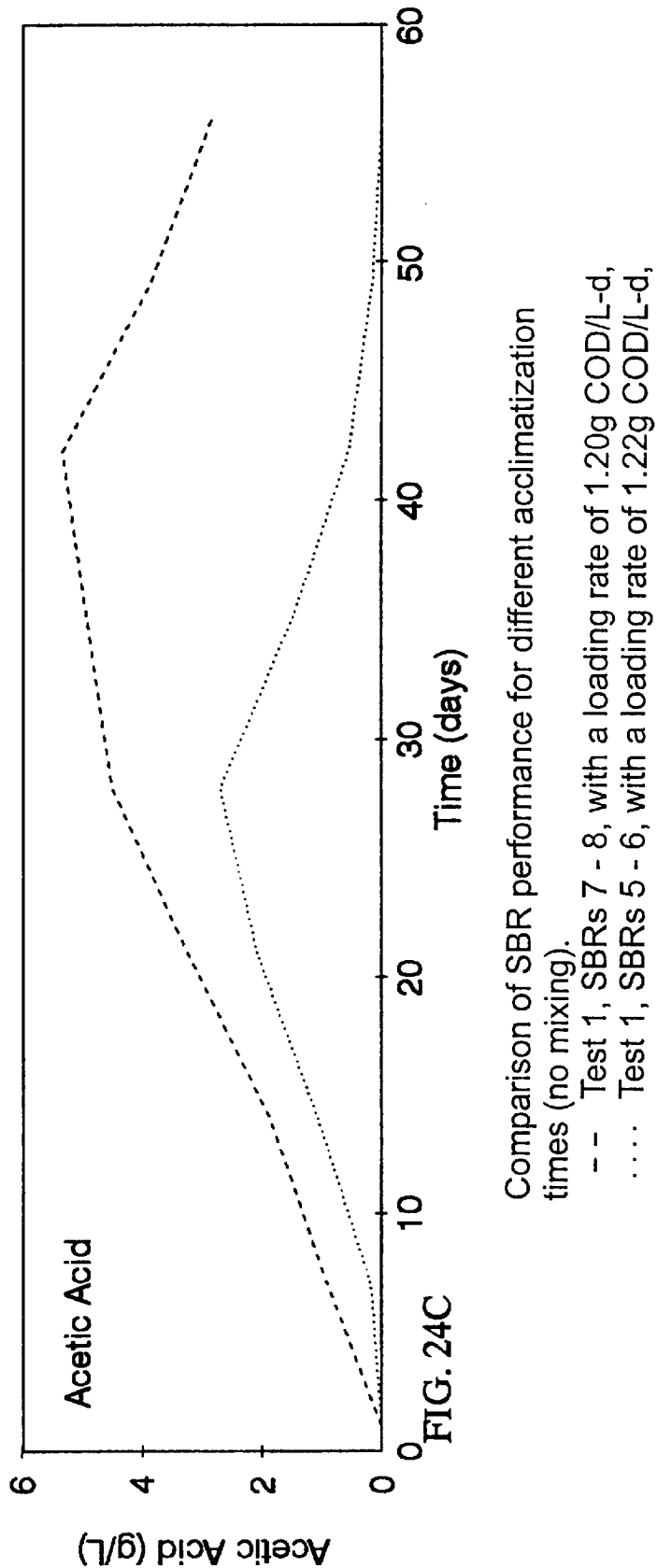

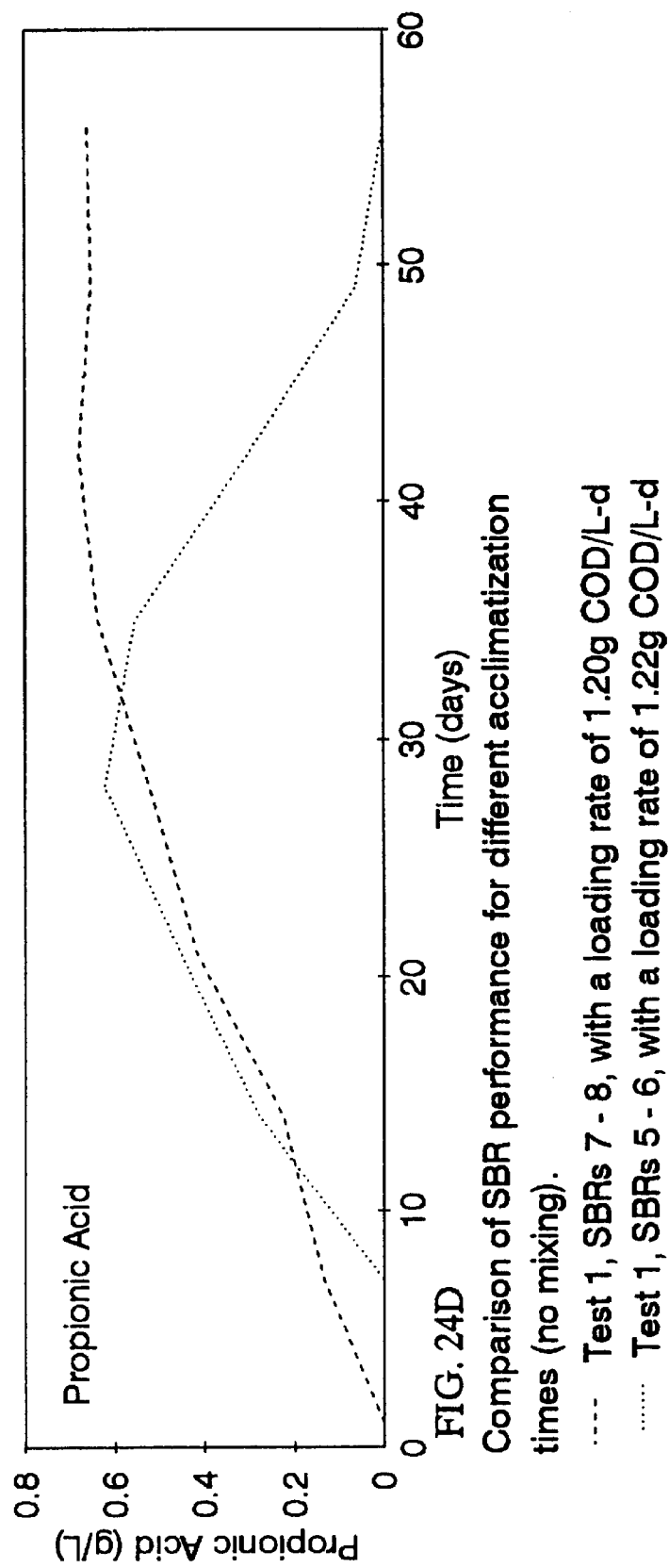

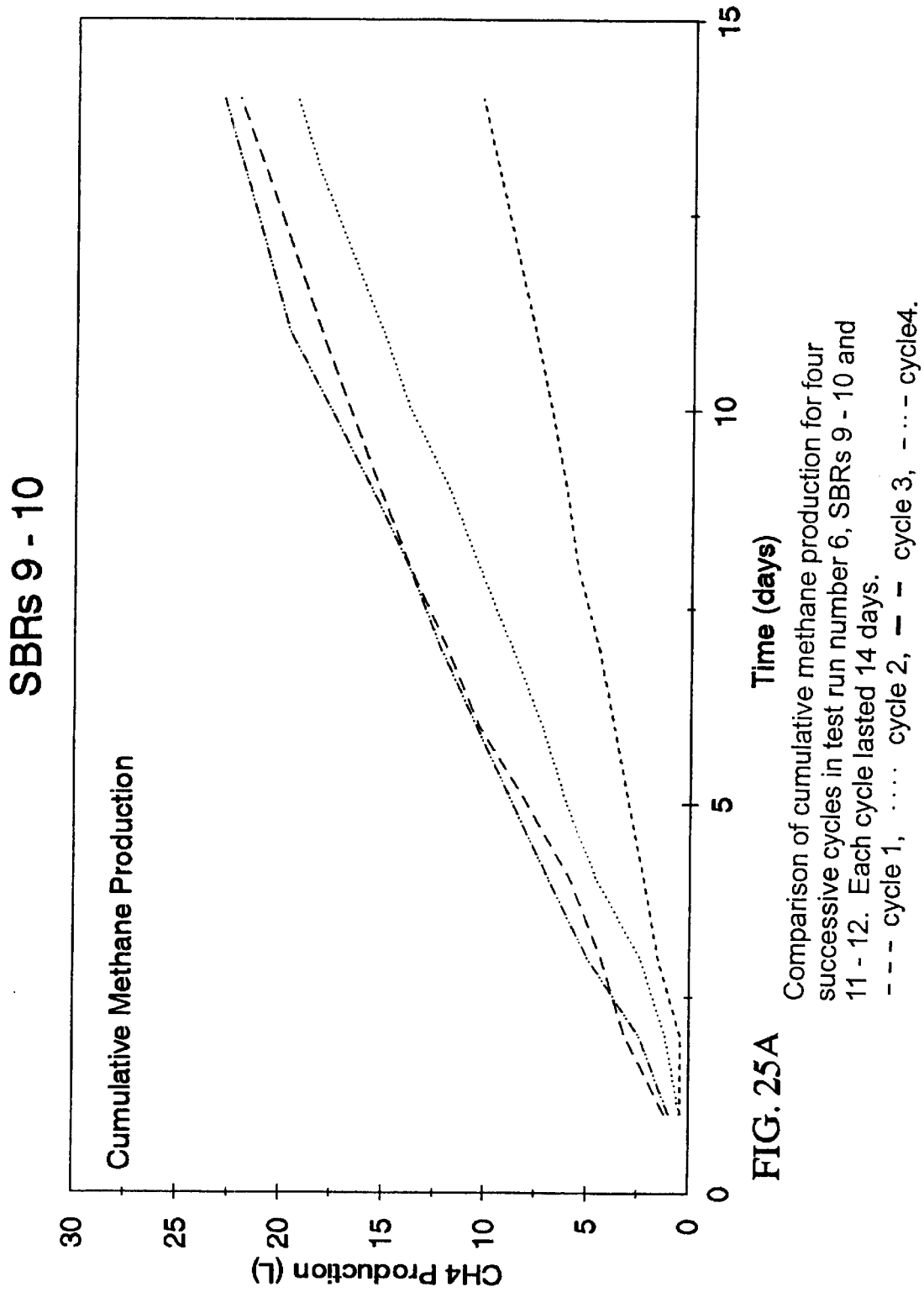

Comparison of cumulative methane production for four successive cycles in test run no. 6, SBRs 9 - 10 and 11 - 12. Each cycle lasted 14 days.  --- cycle 1,  ..... cycle 2, -- cycle 3,  --- cycle 4.

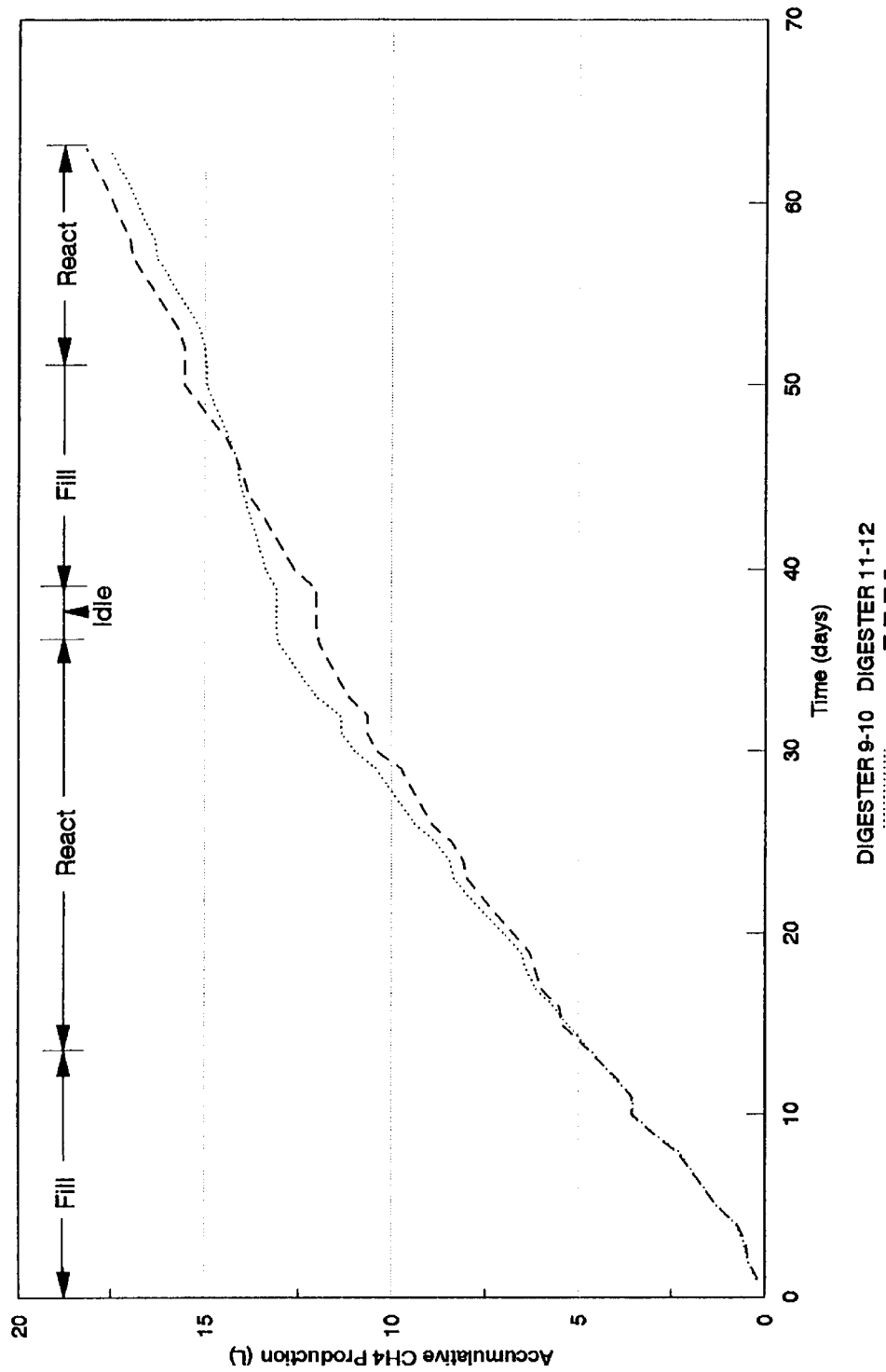
Fig. 26 Accumulative Methane Production as Function of Time (test 3, SBR were operated at 10°C)

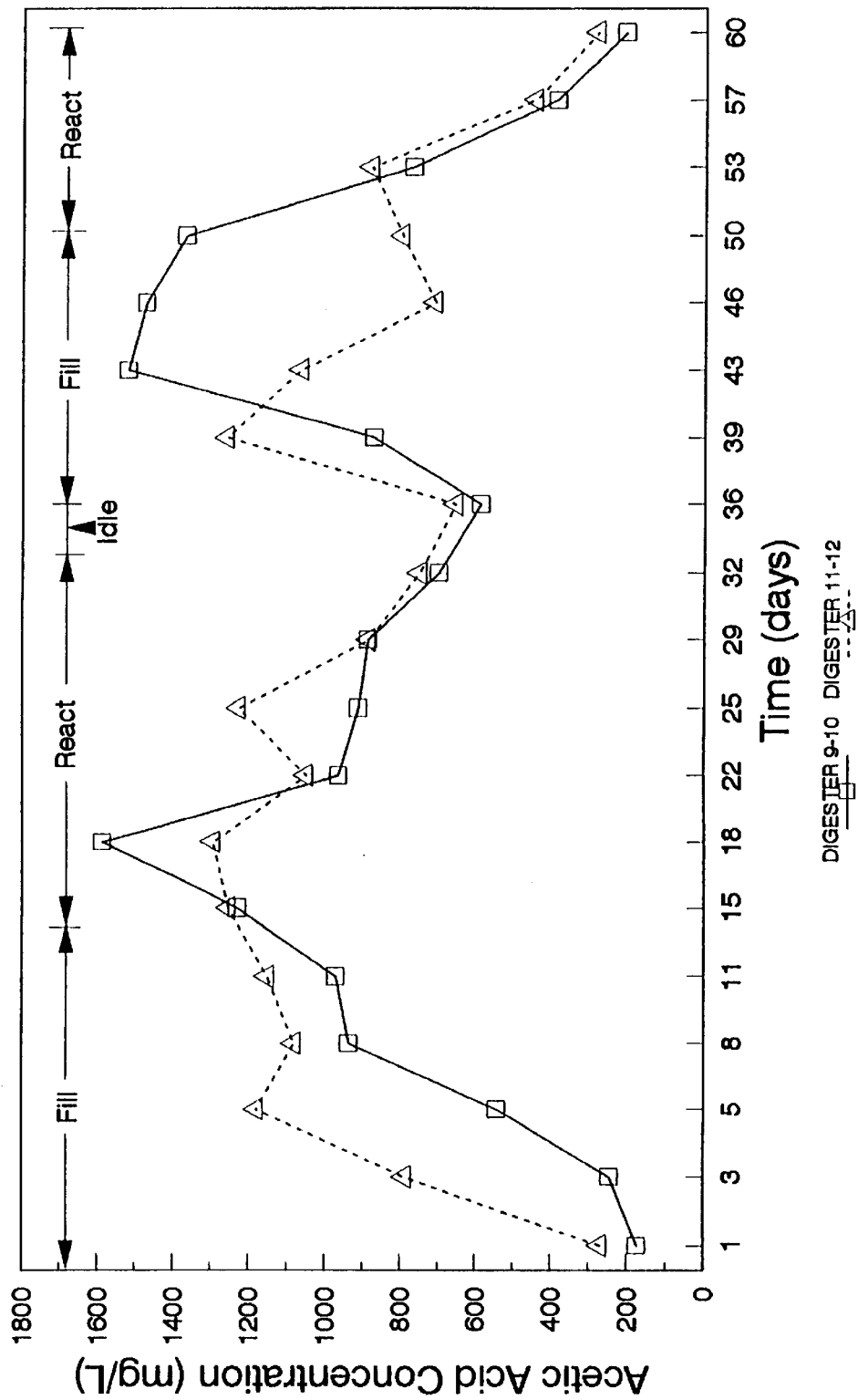
Fig. 27 Acetic Acid Concentrations as Function of Time (test 3, SBRs were operated at 10°C)

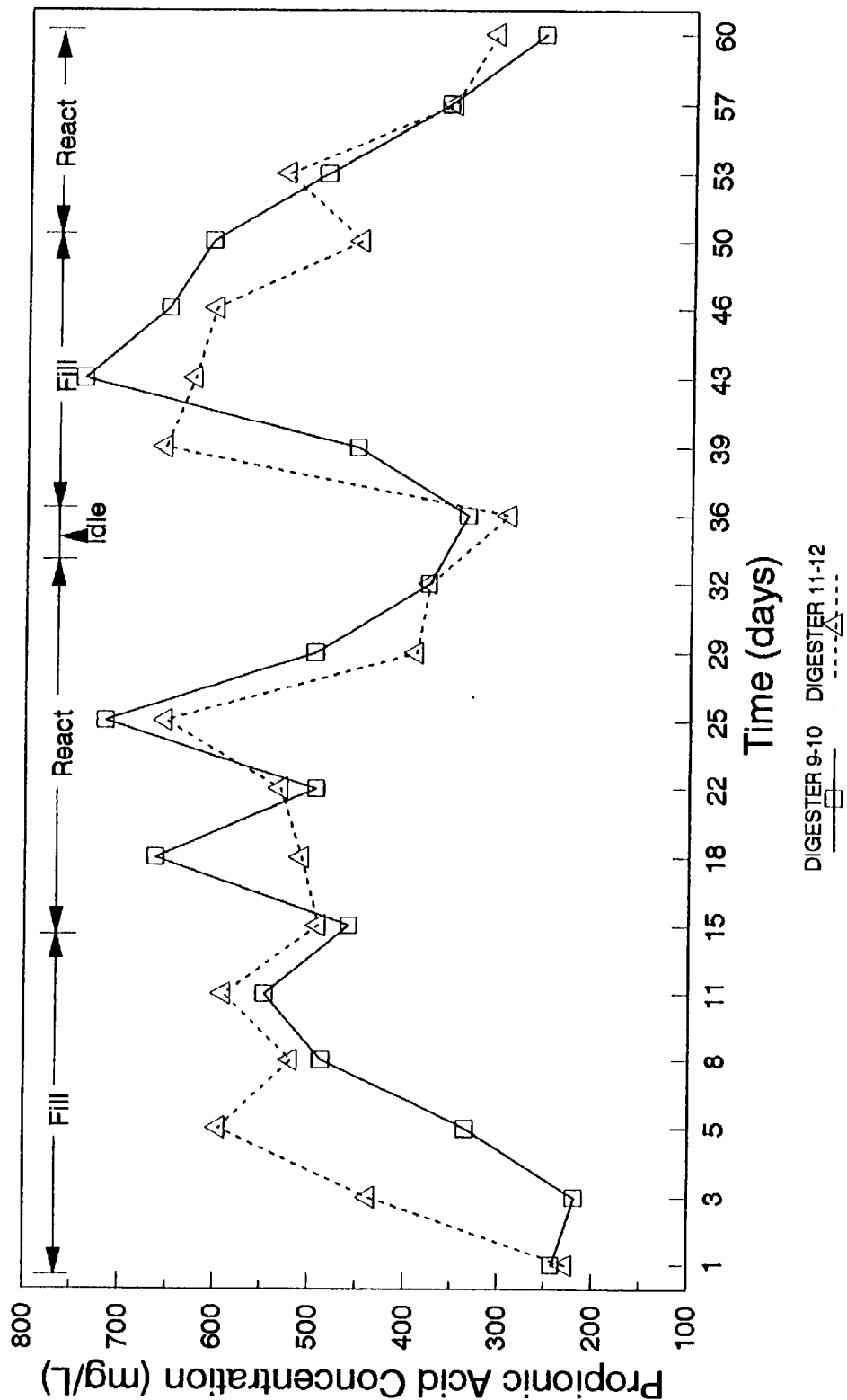
Fig. 28 Propionic Acid Concentrations as Function of Time (test 3, SBRs were operated at 10°C)

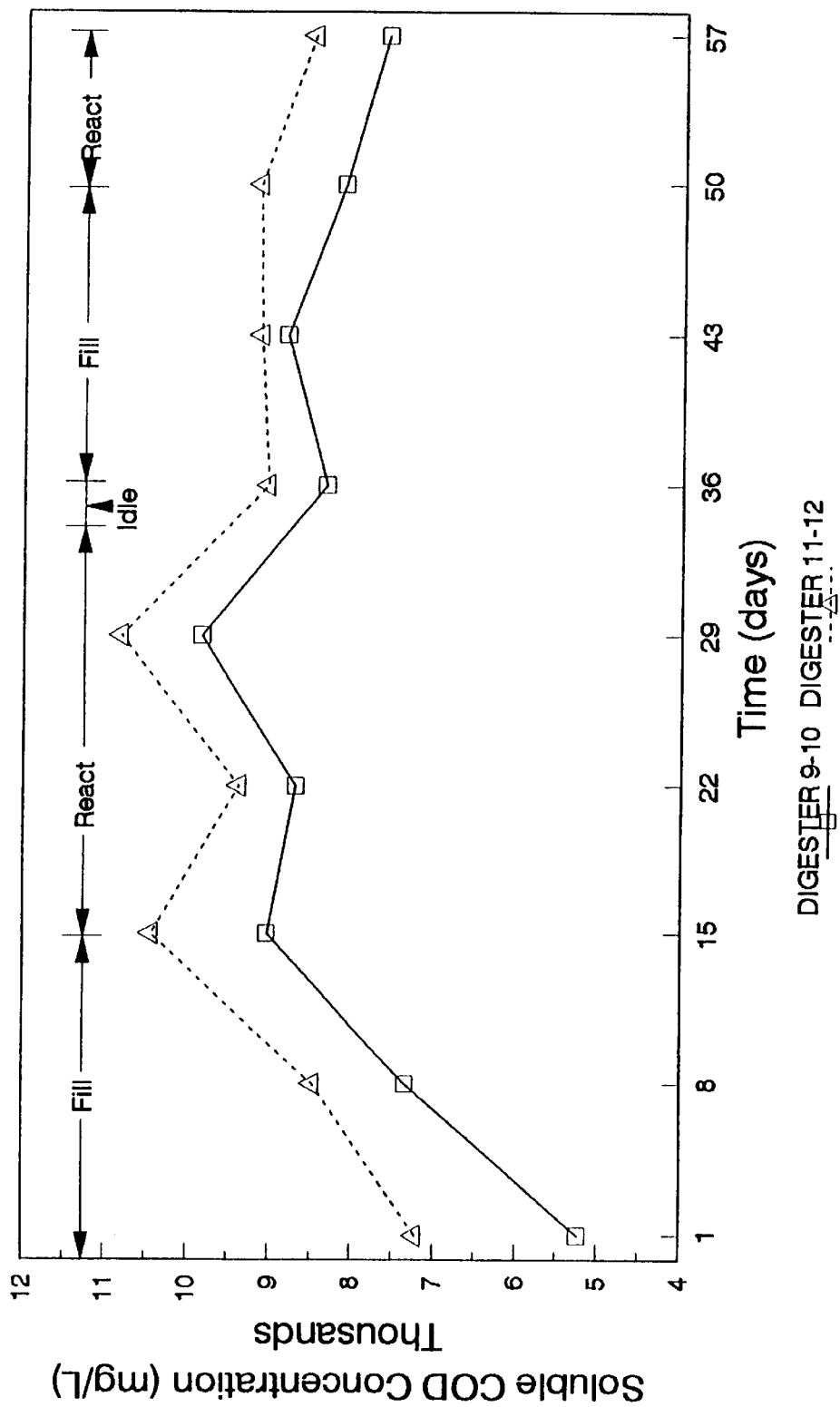
Fig. 29 Soluble COD as Function of Time (test 3, SBRs were operated at 10°C)

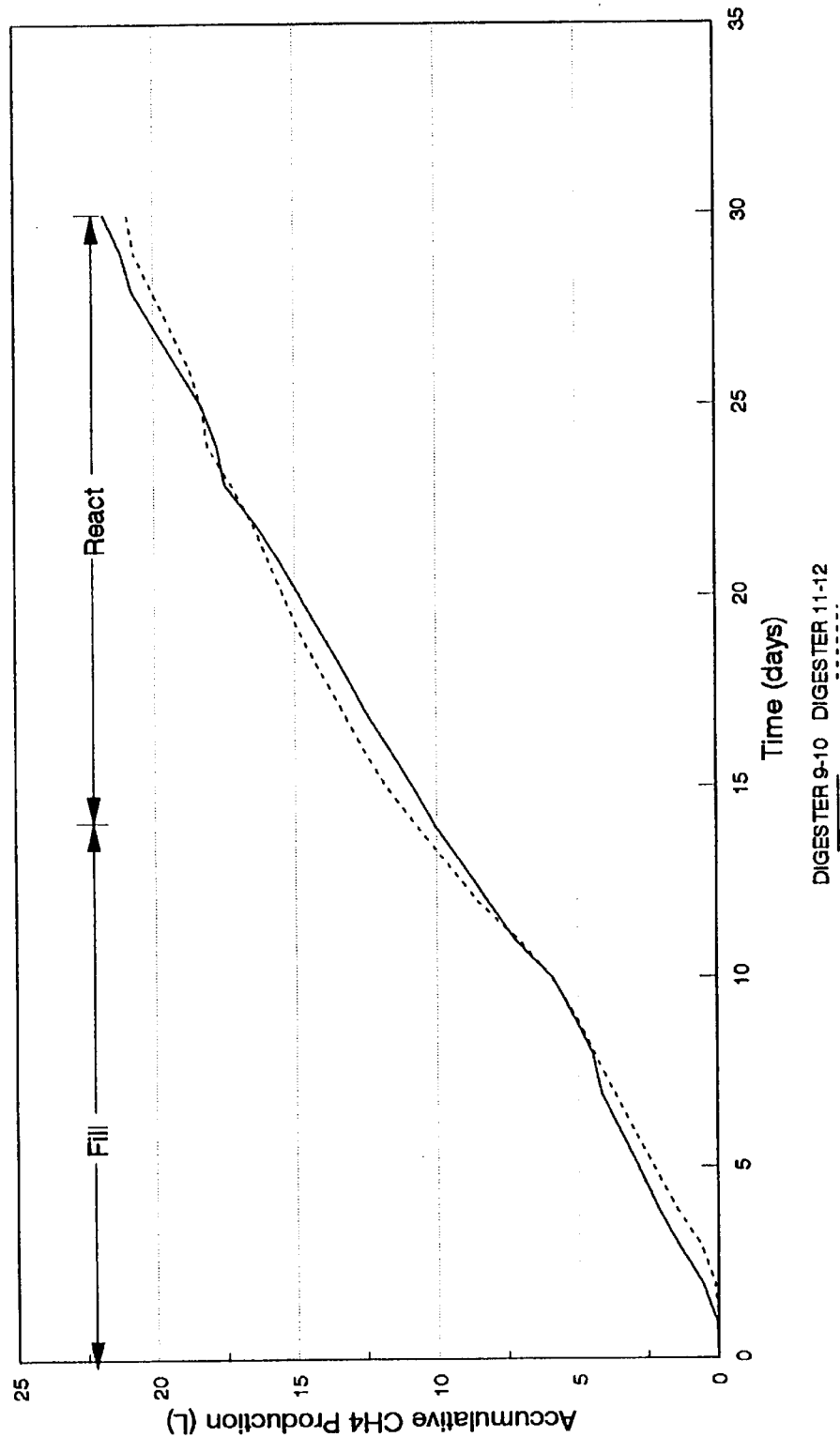
Fig. 30 Accumulative Mathane Production as Function of Time (test 4, SBRs were operated at 15°C)

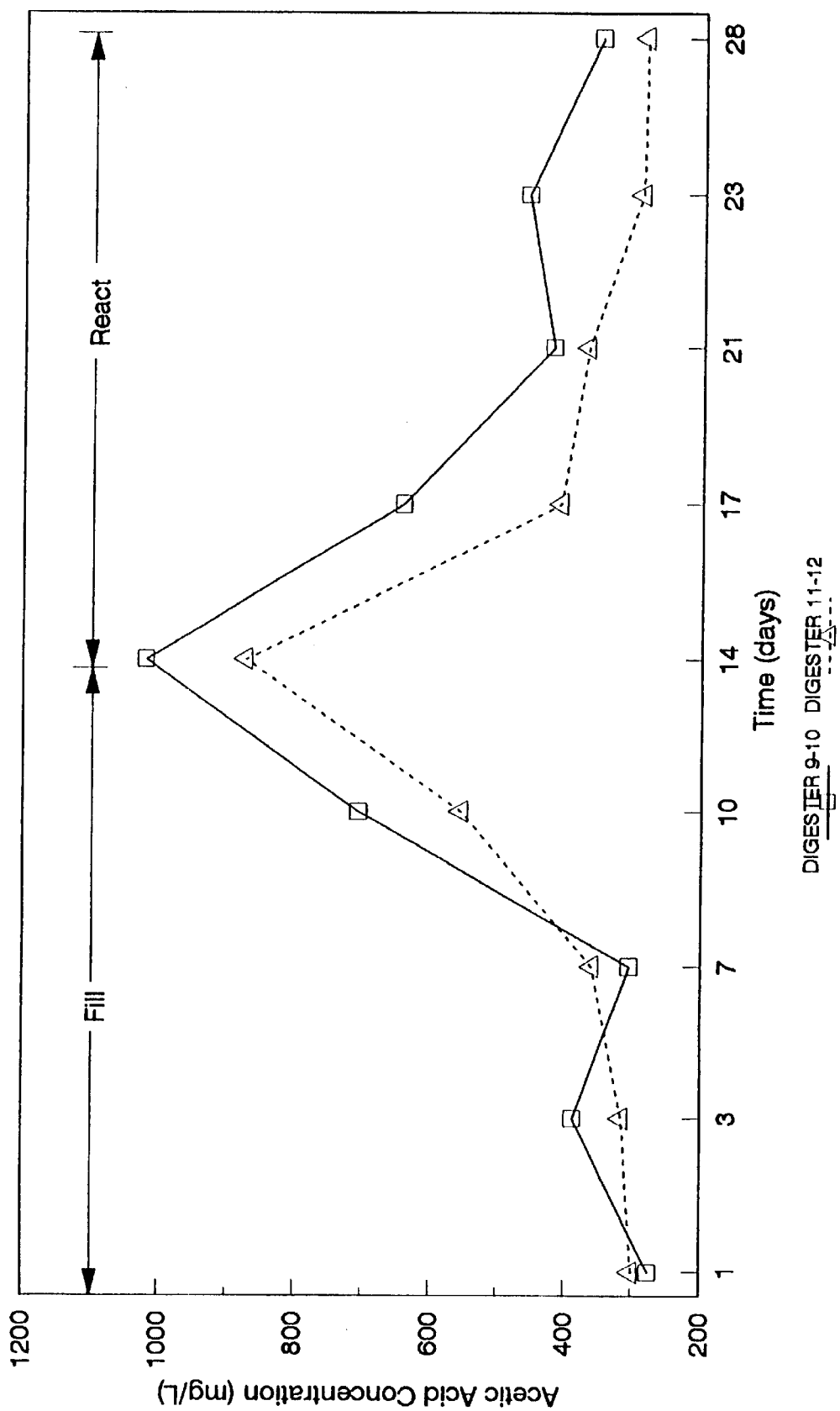
Fig. 31 Acetic Acid Concentrations as Function of Time (test 4, SBRs were operated at 15°C)

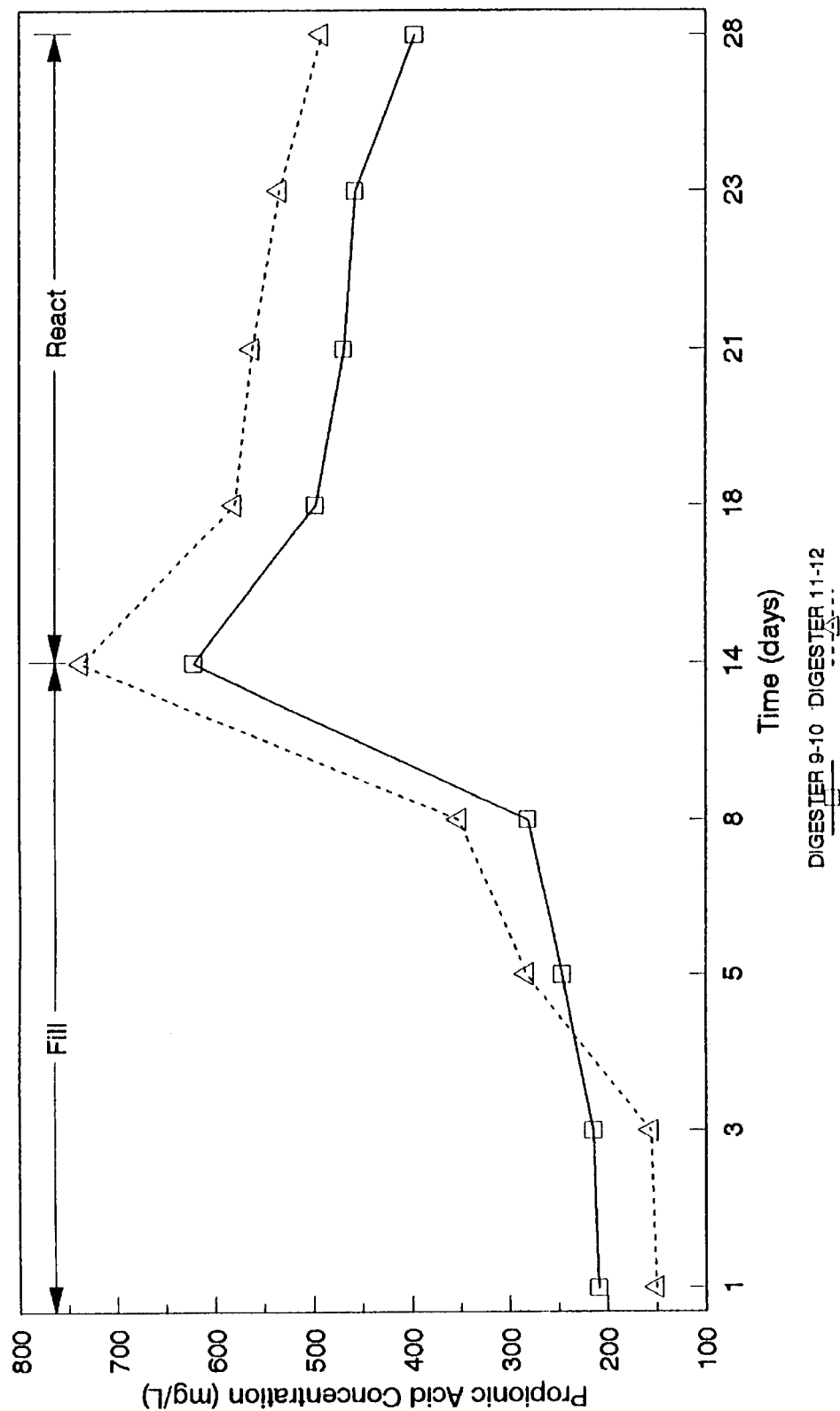
Fig. 32 Propionic Acid Concentrations as Function of Time
(test 4, SBRs were operated at 15°C)

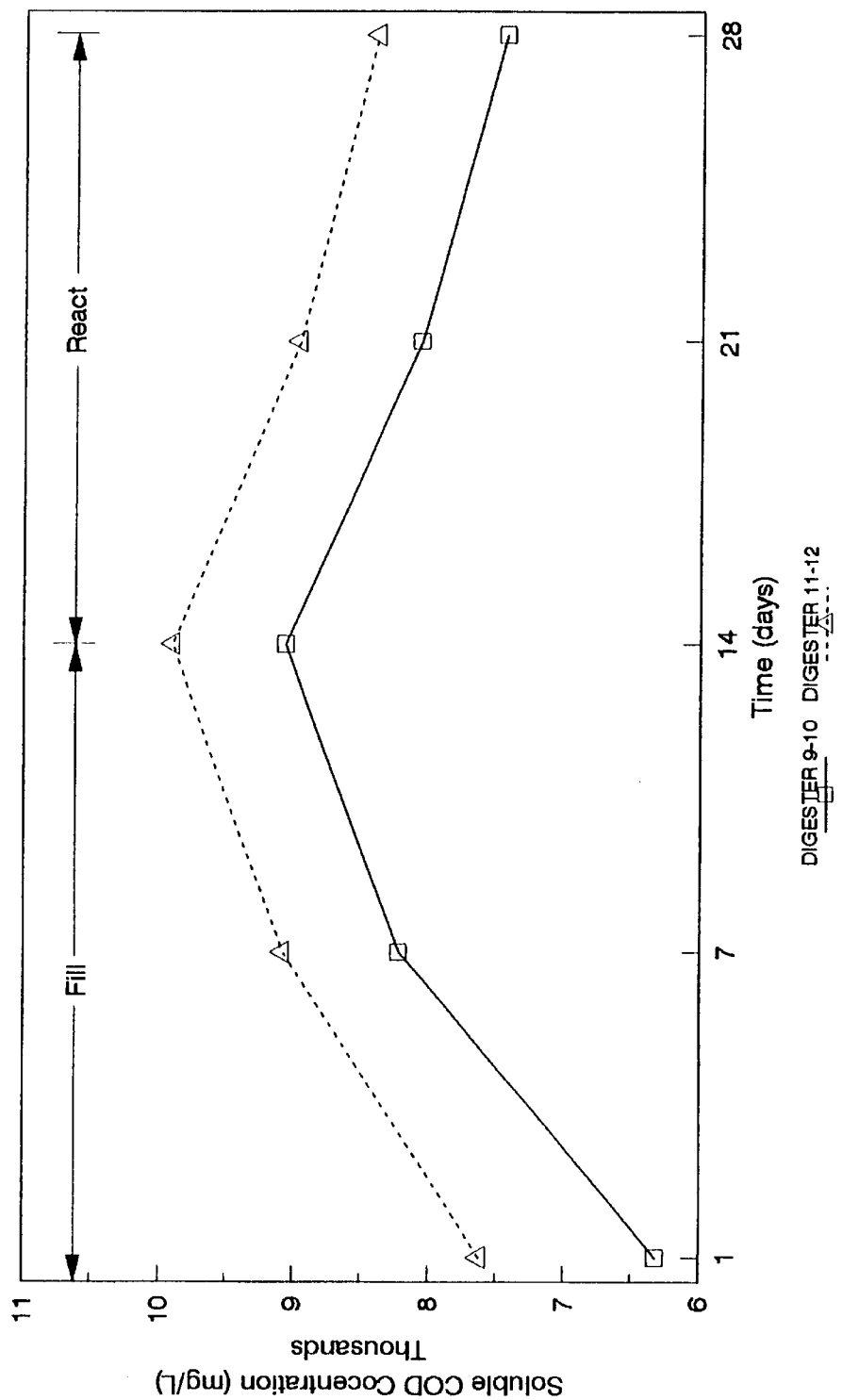
Fig. 33 Soluble COD Concentrations as Function of Time (test 4, SBRs were operated at 15 C)

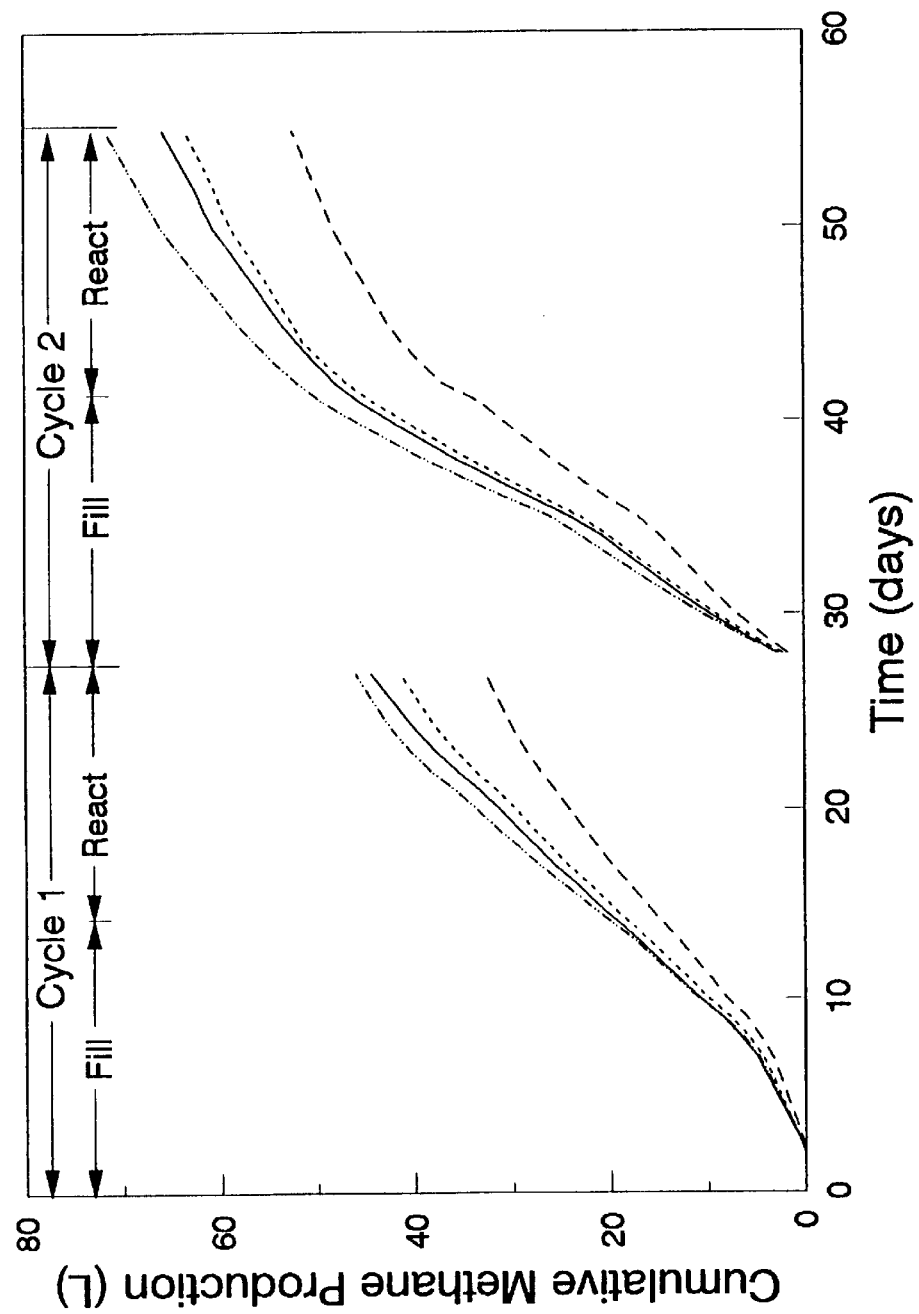
Figure 34. Cumulative Methane Production in Test Run 1.

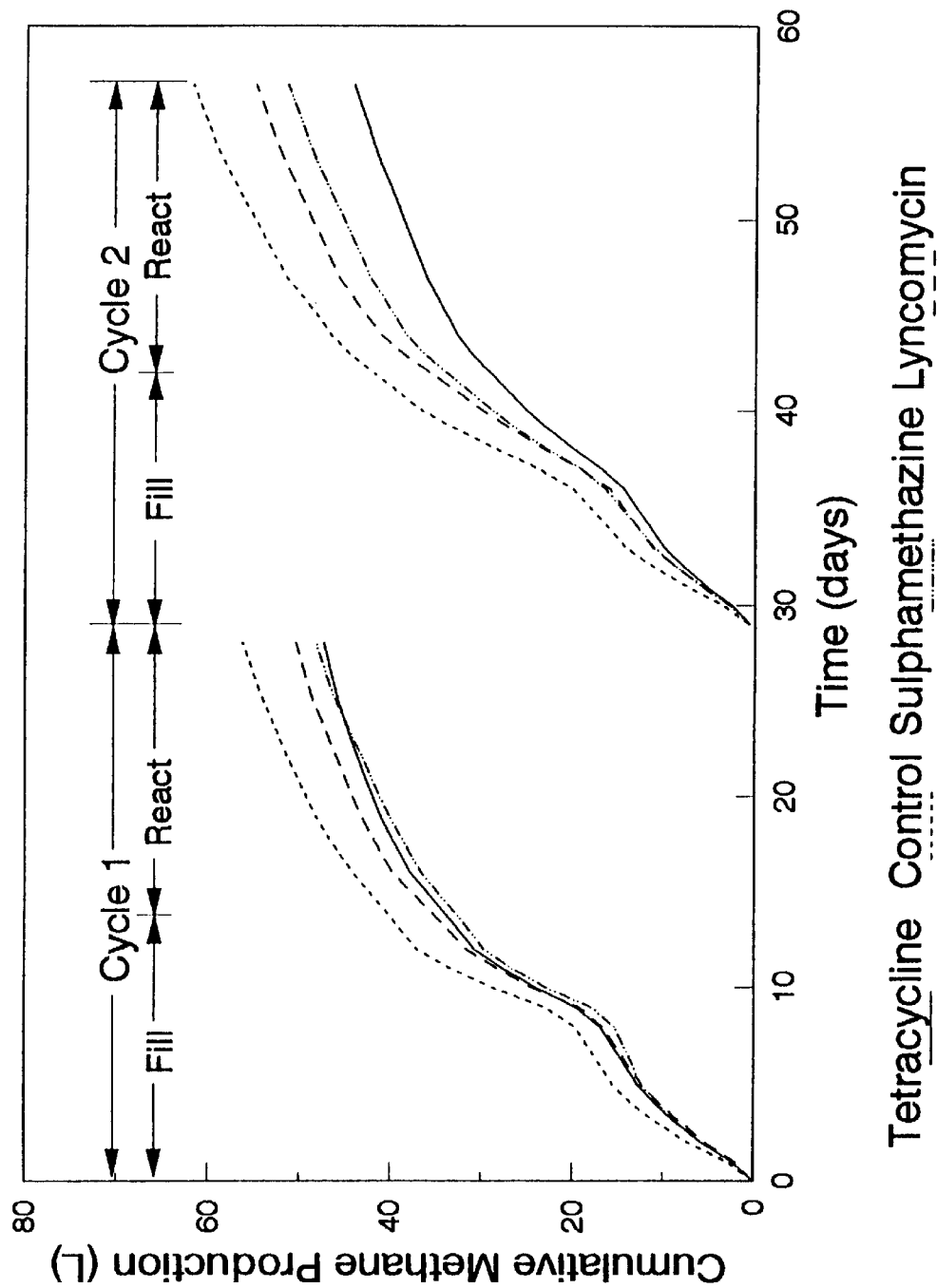
Figure 35. Cumulative Methane Production in Test Run 2.

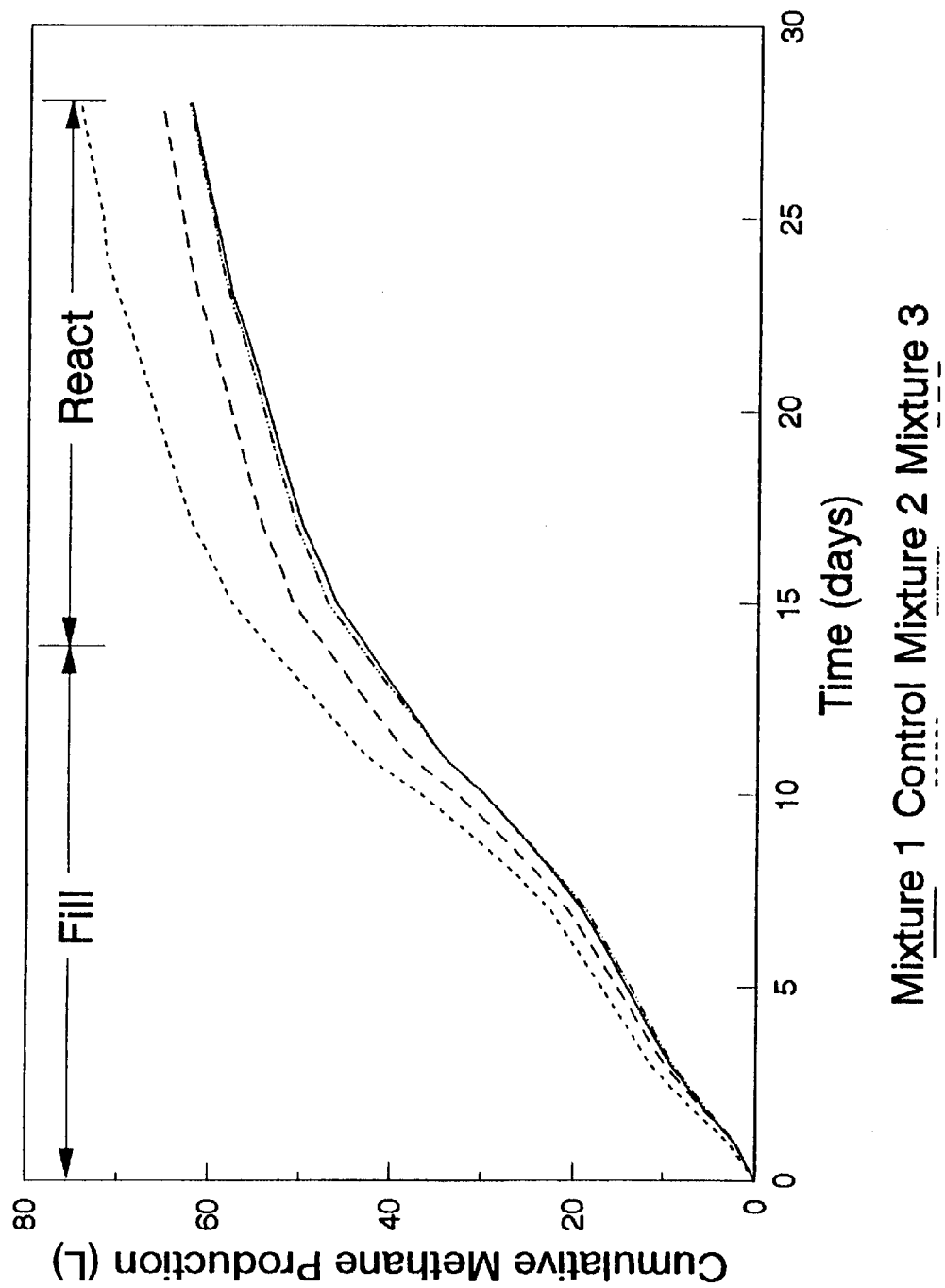
Figure 36. Cumulative Methane Production in Test Run 3

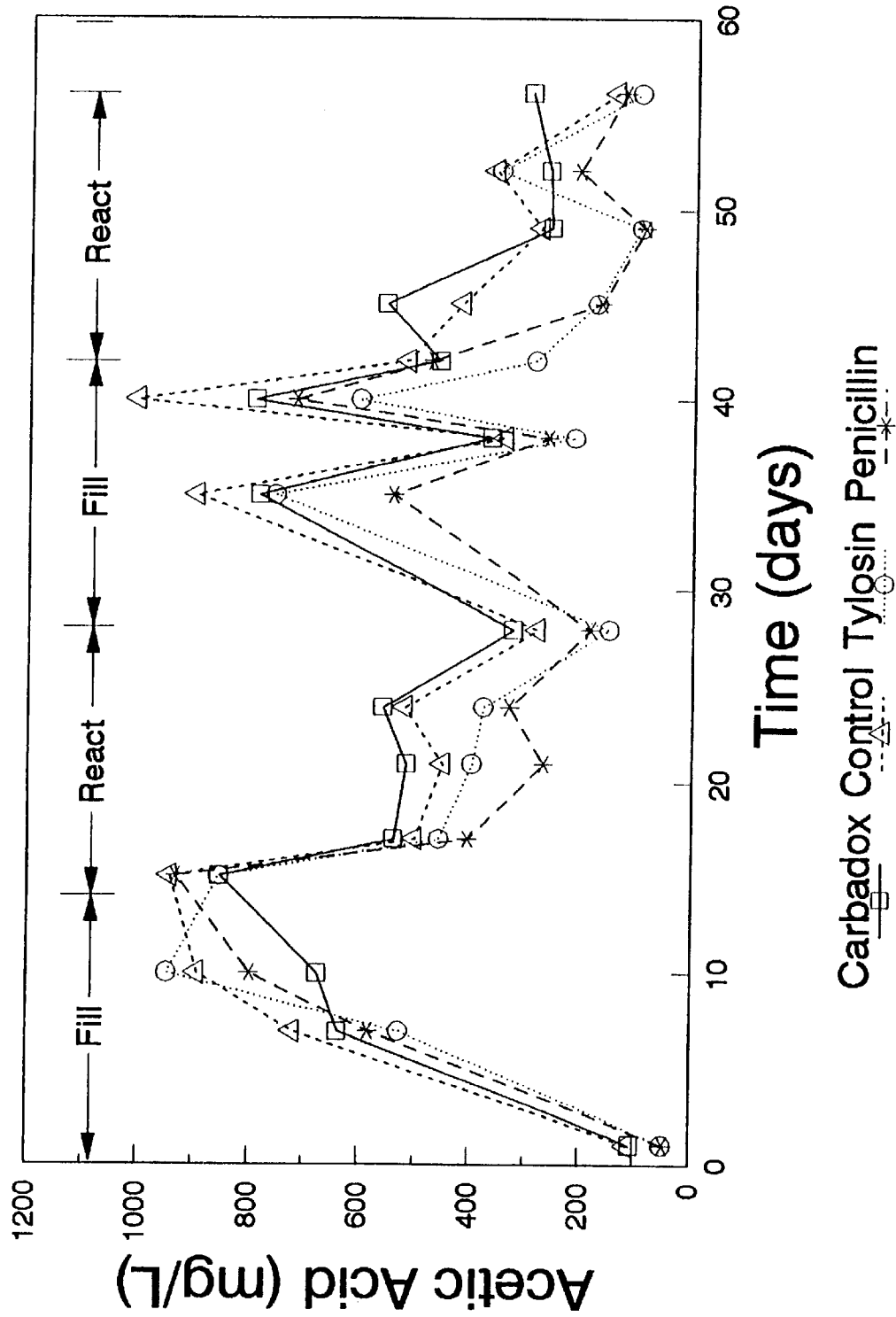
Figure 37. Acetic Acid Accumulation in Test Run 1

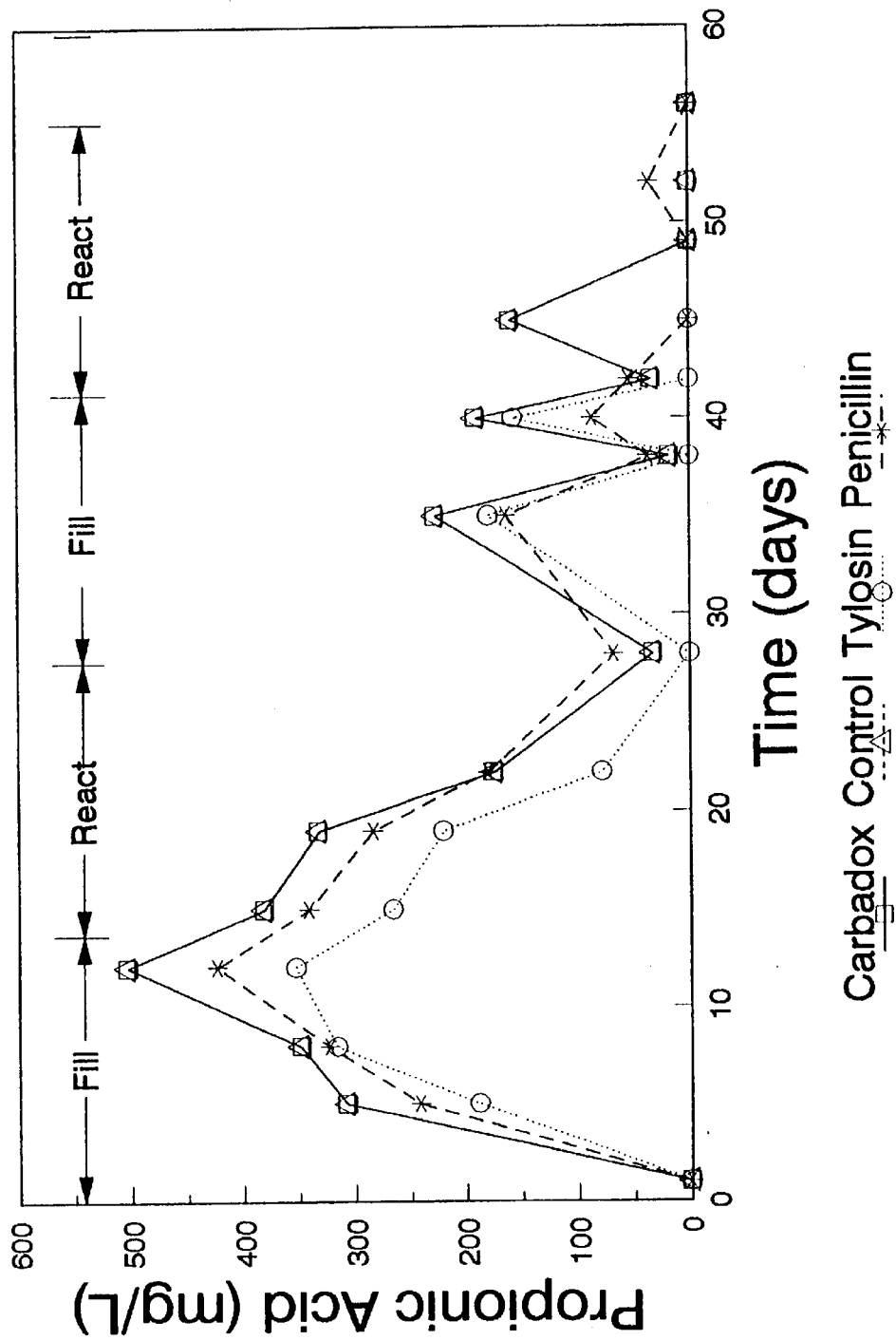
Figure 38. Propionic Acid Accumulation in Test Run 1

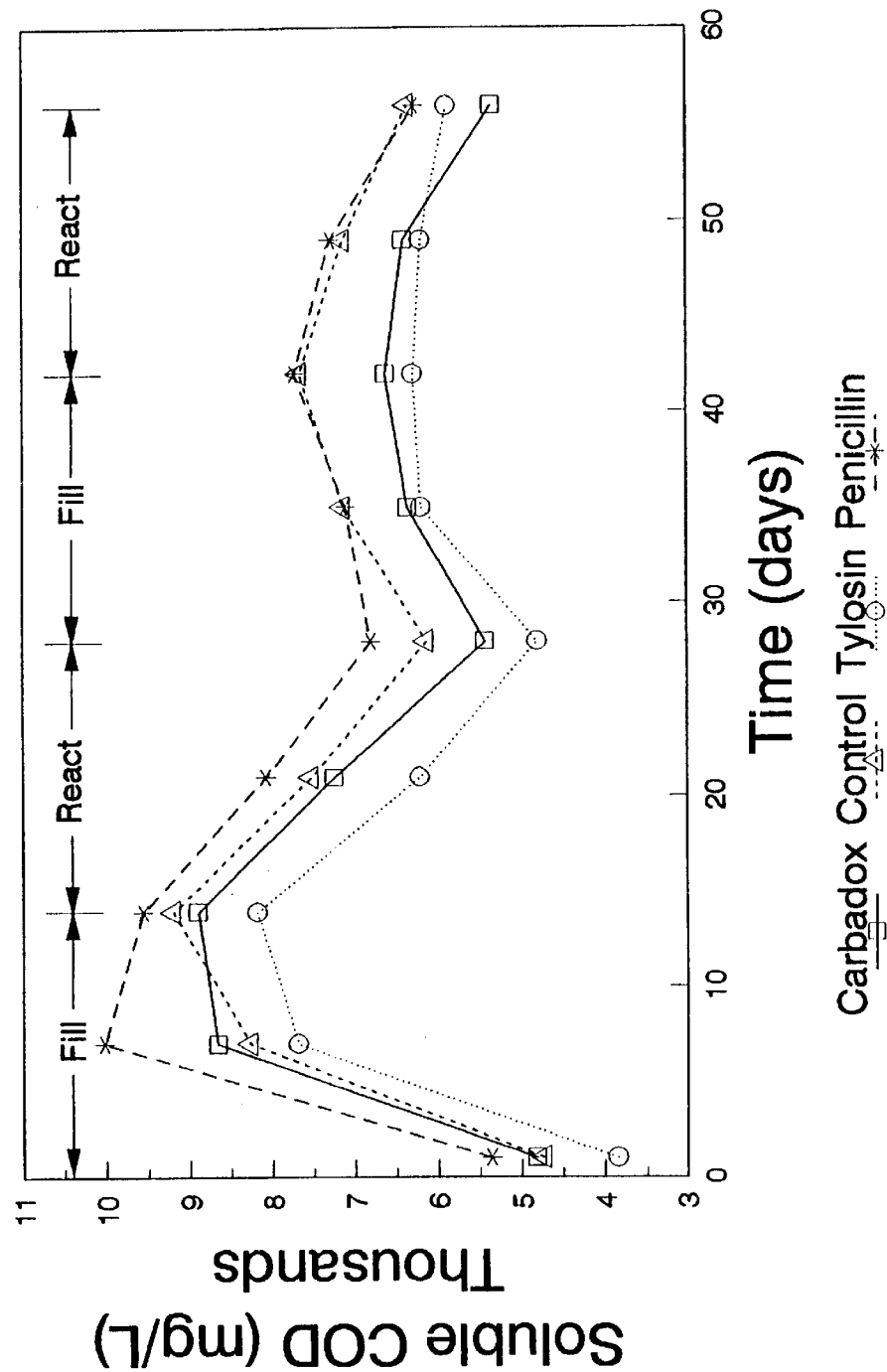
Figure 39. Soluble COD Accumulation in Test Run 1

PSYCHROPHILIC ANAEROBIC TREATMENT OF WASTE IN A SEQUENCING SEMIBATCH/BATCH BIOREACTOR

This application is a continuation-in-part of U.S. Ser. No. 08/358,616 that was filed on Dec. 14, 1994, now abandoned.

FIELD OF THE INVENTION

The present invention relates to a process for treating animal manure on small and large farm operations in order to stabilize, deodorize, recover energy, and add value to the animal manure. In particular, the process involves the psychrophilic anaerobic digestion of animal manure in intermittently fed sequencing semi-batch/batch reactors.

BACKGROUND OF THE INVENTION

Animal manure management practices, principally in regions where there is a surplus of manure are often detrimental to the environment and also represent a potential hazard to human and animal health. Animal manures can produce strong odours, encourage fly breeding, induce weed problems and pollute air, soil and water. For example, in some areas of Canada, the drinking water source is polluted and water bodies cannot be used for recreational purposes due to manure contamination. The affected communities are expecting changes in manure management from the farm industry. The National Workshop on Land Application of Animal Manure, CARC (1991), recommended innovative research that would allow farmers to adopt sustainable and environmentally sound agricultural practices where animal manure is integrated into the overall production systems. It was further recommended that economical processes to stabilize, deodorize, recover energy and add value to animal manure be developed.

Conventional anaerobic digestion of animal manure in farm scale digesters was attempted at several locations across Canada during 1975–1985. It was not successful for several reasons (Van Die, 1987) as follows: 1) The digesters were designed to operate at mesophilic (35° C.) or thermophilic (60° C.) temperatures. Because of prolonged sub-freezing winter temperatures in parts of North America, digesters operating at these temperatures during the winter used not only most of the gas they produced but sometimes required supplementary heating to maintain the digester temperature. For example, in a full scale anaerobic digester for cattle manure in Southern Ontario, more energy was required to run the digester in winter months than the energy generated in the biogas produced. 2) The anaerobic digesters were not cost effective because they were designed to produce electricity which made them even more capital intensive. 3) The digesters were not practical for farm use because their control and maintenance required skilled operators, increased labour input, daily supervision and sometimes changes in farm operational procedures. 4) The digesters were difficult to control and had poor stability because they were pushed to the limit to achieve maximum gas production.

Anaerobic digestion of municipal waste water and animal manures at low (psychrophilic) temperature has been reported in previous studies (O'Rourke, 1968; Stevens and Schulte, 1977; Ke-Xin and Nian-Gua, 1980; Wellinger and Kaufmann, 1982; Chandler et al., 1983; Cullimore et al., 1985; Lo and Liao, 1986; Sutter and Wellinger, 1987; Balsari and Bozza, 1988; and Safley and Westerman, 1992, 1994). Most of these studies were aimed at biogas production while little consideration was given to odour reduction, waste stabilization or increases in fertilizer value or plant nutrient availability. There was a wide variation in the reported experimental results. Some studies were successful in producing methane at temperatures below 20° C. while others were not. The information provided in the above reports is inadequate to provide possible reasons for these discrepancies. In most of these studies the solids were separated from the liquid or the slurry solids content was very low (less than 2%) compared to the typical solids content of manure slurry at Canadian farms. It is unlikely that farmers would dilute manure slurry for anaerobic digestion because it would require larger storage facilities and increase substantially the volume of liquid manure to spread on the land. Furthermore, farmers are not interested in separating the liquid and solid fraction of manure slurry as this necessitates two different types of manure handling equipment, storage and land application equipment, to handle both the liquid and solid fractions.

More recently, Dague in U.S. Pat. No. 5,185,079 demonstrated the potential of using an anaerobic sequencing batch reactor (ASBR) for the treatment of swine manure. Dague indicated that the sequencing batch reactor is highly suitable for anaerobic digestion because: 1) It provides quiescent settling conditions for the anaerobic bacteria; and 2) The high food to microorganism ratio (F/M) at the beginning of the feed period and the low (F/M) at the end of the react period enhances the sludge settling characteristics. Dague's ASBR is run in four separate phases; feed, react, settle and decant. In the feed phase, the reactor is fed with the swine manure until the reactor is full which takes about 15 minutes. The manure is then allowed to react with the microorganisms in the reactor to allow conversion of the organic waste to biogas. Dague's react phase generally lasts 6 hours at 25° C. to 35° C. after which the contents of the reactor are allowed to settle (1.5 hours) before the effluent is decanted. One of the drawbacks of Dague's system is that ammonia levels of greater than 1500 mg/L (in swine manure slurry) are toxic to the anaerobic process. Consequently, the manure must be diluted before it is fed to the ASBR to decrease the ammonia levels. The means that the manure must be both diluted and analyzed before it is fed into the reactor, and the ammonia level monitored throughout. Further, the dilution of the manure, which is generally in the order of a factor of four, means that the manure storage facility must also be enlarged by the same factor and a substantially large volume of water is contaminated. As a result, dilution of swine manure will substantially increase the cost of storage structures and land applications of the manure slurry which is neither economically feasible nor environmentally acceptable.

SUMMARY OF THE INVENTION

In view of the above, there is a need to develop a process to treat animal manure that is low cost, is very stable, simple, easy to operate, requires minimum pre-treatment of the manure and does not interfere with regular farm operations. Anaerobic digestion to treat animal manure under North American conditions is a viable option as it would have a low capital and operational cost if it could: 1) Make use of existing handling equipment and storage facilities at the farm; 2) Operate at relatively low temperature; 3) Require minimum handling; and 4) Does not require daily maintenance and supervision.

The present inventors have developed a process for the anaerobic digestion of animal manure that overcomes the drawbacks of the prior art processes. In particular, the present inventors have determined that psychrophilic anaerobic digestion (PAD) of animal manure in intermittently fed sequencing batch reactors (SBR), sterilized, deodorized, reduced pollution potential, recovered energy, and increased plant nutrient availability from swine manure slurry.

In contrast to the systems of the prior art, the process of the present invention can operate at high concentrations of volatile acids (up to at least 7000 mg/L) and ammonia nitrogen (up to at least 6000 mg/L). This is extremely advantageous as the manure does not have to be diluted in order to reduce the concentration of the volatile acids (VAs) and ammonia. Further, the concentration of these do not have to be monitored throughout the process, as in other systems, to ensure that they are below a critical point.

The present inventors have determined that antibiotics in the manure had no effect on the performance and stability of the process of the present invention. This is an important finding since antibiotics are commonly used for growth promotion and disease control in swine production. Therefore, it is highly desirable to have a method that is not affected by antibiotics in the manure.

In accordance with the present invention, there is provided a process for the psychrophilic anaerobic digestion of organic waste comprising the steps of: intermittently feeding waste to a reactor containing acclimatized sludge until the reactor is filled; allowing the waste to react with the acclimatized sludge under anaerobic conditions at a temperature from about 5° C. to about 25° C.; allowing the waste and acclimatized sludge to settle to form a liquid supernatant and a sludge zone; and removing the liquid supernatant from the reactor. The treated organic waste is present in the supernatant and is therefore easily removed by the present process.

The term "psychrophilic anaerobic digestion" as used herein means the digestion of waste under both anaerobic and psychrophilic (temperature from about 5° C. to about 25° C.) conditions.

The term "intermittently feeding" means feeding the reactor at intervals rather than in a single operation.

The term "acclimatized sludge" means sludge that has previously been adapted to organic waste under anaerobic and psychrophilic conditions. The acclimatized sludge therefore generally contains psychrophilic microorganisms or bacteria. Prior to acclimatization, the sludge is generally obtained from an anaerobic environment (for example a wet land, marsh, waste water treatment plant or anaerobic digester) and contains anaerobic microorganisms.

In a particular embodiment, the organic waste is manure such as swine manure.

Some of the advantages of the process according to the present invention include:

(1) The process works at ambient temperatures ranging between 5° and 25° C. (Previous systems that were tried in Canada worked at temperatures of 25° to 65° C.) As a consequence, the animal manure slurry does not need to be heated before it is fed to the digester.

(2) The process makes use of Sequencing Batch Reactors (SBRs) which were not used previously with low temperature an-aerobic digestion processes.

(3) The process does not require continuous or daily feeding. It can be intermittently fed only 1 to 3 times a week or every two weeks. Because of intermittent feeding this process does not need an expensive calibrated pump. It will make use of existing handling equipment at the farm.

(4) The process does not require mixing, although, it is preferable to provide a minimum level of mixing, i.e. up to 30 minutes per day. Mixing can be provided by biogas recirculation. Because the slurry and digester content does not have to be heated and continuous mixing is not required, all the energy produced will be available for on farm use.

(5) The process works very well with either short or long feeding and reaction periods. Fill and react period lengths of up to two months did not affect the process stability and performance.

(6) The process is very stable when compared to previous systems. It was not affected by high concentration of volatile acids (up to at least 7000 mg/L) and ammonia nitrogen (up to at least 6000 mg/L). Therefore, the process does not require manure dilution or monitoring of the system to ensure the concentration of volatile acids and ammonia nitrogen is kept low.

(7) The process is not affected by antibiotics in the manure.

(8) Because this process works at low temperature, does not require mixing and is not affected by long fill and react periods it can make use of existing manure slurry storage at the farm.

(9) The process does not require regular monitoring because it is very stable and also it does not interfere with regular farm operations. This is because the digester is fed only during normal manure removal operations and the farmer will deal the effluent from the digester once a month or every two months or even less often. Previous systems required daily supervision and farmers had to dispose of the digester's effluent on a daily basis.

(10) The process is the only system that works satisfactorily with swine manure under Canadian climatic conditions.

(11) The process does not require manure slurry dilution and solid/liquid separation. This process works well with manure slurry that has a solids concentration between 1 and 18%.

(12) The process works well at organic loading rates ranging between 0.1 to 6.0 g COD per liter of digester volume per day.

(13) The process very efficiently retains a high concentration of slow growing microorganisms in the system.

(14) The process has low capital and operational costs. Furthermore, if the energy recovered is used at the farm the process will be very cost effective.

BRIEF DESCRIPTION OF THE DRAWINGS

FIG. 2 is a graph illustrating cumulative biogas production as a function of time for digesters with an organic loading rate of 0.72 g COD/L-d.

FIG. 3 is a graph illustrating cumulative biogas production as a function of time for digesters with an organic loading rate of 1.20 g COD/L-d.

FIG. 4 is a graph illustrating methane content in biogas as a function of time for SBRs with a loading rate of 0.72 g COD/L-d.

FIG. 5 is a graph illustrating methane content in biogas as a function of time for SBRs with a loading rate of 1.2 g COD/L-d.

FIG. 6 is a graph illustrating avarage acetic acid concentration as a function of time for SBRs with a loading rate of 0.7 g COD/L-d.

FIG. 7 is a graph illustrating average acetic acid concentration as a function of time for SBRs with a loading rate of 1.2 g COD/L-d.

FIG. 8 is a graph illustrating average propionic acid concentration as a function of time for SBRs with a loading rate of 0.7 g COD/L-d.

FIG. 9 is a graph illustrating average propionic acid concentration as a function of time for SBRs with a loading rate of 1.2 g COD/L-d.

FIG. 10 is a graph illustrating average butyric acid concentration as a function of time for SBRs with a loading rate of 0.7 g COD/L-d.

FIG. 11 is a graph illustrating average butyric acid concentration as a function of time for SBRs with a loading rate of 1.2 g COD/L-d.

FIGS. 12A–D are a graph illustrating total and individual volatile acids concentration as a function of time.

FIGS. 13A–C are a graph illustrating PH, alkalinity (g CaCO3/L) and NH3-N concentration as a function of time for SBRs with a loading rate of 1.2 g COD/L-d.

FIGS. 14A–14D are graphs that illustrate the cumulative methane production, soluble COD production, acetic acid production and propionic acid production, respectively, over time for various sequencing batch reactors at different organic loading rates.

FIGS. 15A–15D are graphs that illustrate the cumulative methane production, soluble COD production, acetic acid production and propionic acid production, respectively, over time for various sequencing batch reactors with an organic loading rate of 1.22 g COD/L-d and at different levels of mixing.

FIGS. 16A–16D are graphs that illustrate the cumulative methane production, soluble COD production, acetic acid production and propionic acid production, respectively, over time for various sequencing batch reactors with an organic loading rate of 1.63 g COD/L-d and at different levels of mixing.

FIGS. 17A–17D are graphs that illustrate the cumulative methane production, soluble COD production, acetic acid production and propionic acid production, respectively, over time for different feeding frequencies at a cycle length of 28 days.

FIGS. 18A–18D are graphs that illustrate the cumulative methane production, soluble COD production, acetic acid production and propionic acid production, respectively, over time for different feeding frequencies at a cycle length of 14 days.

FIGS. 19A–19C are graphs that illustrate the cumulative methane production, soluble COD production and acetic acid production, respectively, over time for different cycle lengths with the sequencing batch reactors fed three times a week.

FIGS. 20A–20C are graphs that illustrate the cumulative methane production, soluble COD production and acetic acid production, respectively, over time for different cycle lengths with the sequencing batch reactors fed once a week.

FIG. 21 is a graph illustrating the effect of cycle length on cumulative methane production.

FIG. 22 is a graph illustrating the effect of cycle length on daily methane production.

FIG. 23 is a graph illustrating total daily methane production from two sequencing batch reactors operated simultaneously.

FIGS. 24A–24D are graphs that illustrate the cumulative methane production, soluble COD production, acetic acid production and propionic acid production, respectively, over time in various sequencing batch reactors for different acclimatization times.

FIG. 25A is a graph illustrating the cumulative methane production over time for four successive cycles in sequencing batch reactors numbers 9–10.

FIG. 26 is a graph illustrating accumulative methane production as function of time for SBRs operated at 10° C.

FIG. 27 is a graph illustrating acetic acid concentrations as function of time for SBRs operated at 10° C.

FIG. 28 is a graph illustrating propionic acid concentrations as function of time for SBRs operated at 10° C.

FIG. 29 is a graph illustrating soluble COD as function of time for SBRs operated at 10° C.

FIG. 30 is a graph illustrating accumulative methane production as function of time for SBRs operated at 15° C.

FIG. 31 is a graph illustrating acetic acid concentrations as function of time for SBRs operated at 15° C.

FIG. 32 is a graph illustrating propionic acid concentrations as function of time for SBRs operated at 15° C.

FIG. 33 is a graph illustrating soluble COD concentrations as function of time for SBRs operated at 15° C.

FIG. 34 is a graph illustrating cumulative methane production in test run 5.

FIG. 35 is a graph illustrating cumulative methane production in test run 6.

FIG. 36 is a graph illustrating cumulative methane production in test run 7.

FIG. 37 is a graph illustrating acetic acid accumulation in test run 5.

FIG. 38 is a graph illustrating propionic acid accumulation in test run 5.

FIG. 39 is a graph illustrating soluble COD accumulation in test run 5.

DETAILED DESCRIPTION OF THE INVENTION

The present inventors have conducted a thorough study into the feasibility of using psychrophilic anaerobic digestion to stabilize and deodorize swine manure and to recover biogas for energy. The inventors conducted several test runs, each test run including eight to twelve sequencing batch reactors. Various parameters of the process were altered such as organic loading rates, fill and react period lengths, mixing intensity, feed frequency, sludge age and operating temperature. The efficiency of the process on manure containing antibiotics was also tested.

COLLECTION OF MANURE

Manure slurry was obtained from gutters under a partially slatted floor in a growing-finishing barn at a commercial swine operation. The manure was generally up to four days old at the time of collection. It was screened to remove particles larger than 3.5 mm to prepare SBR manure samples. These large particles tend to create operational problems with small scale laboratory digesters. The manure samples were stored in a freezer at −15° C. to prevent biological activity. Manure feed samples were heated to the desired digester operating design temperature (for example 5°–25° C.) prior to feeding if necessary.

SEQUENCE BATCH REACTOR

Figure 1:
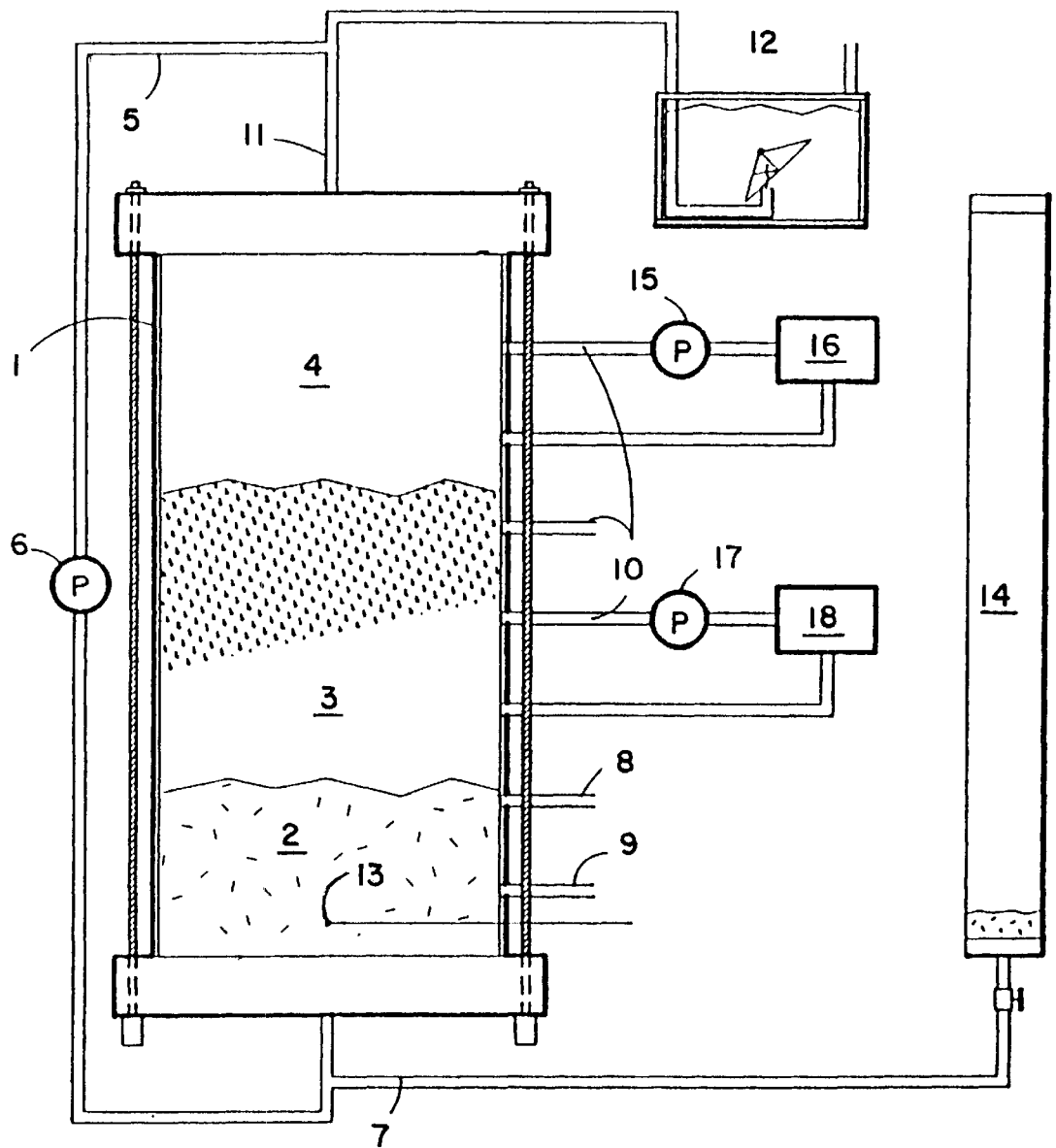
FIG. 1 is a schematic representation of a laboratory scale sequencing batch reactor.
Figure 14A:
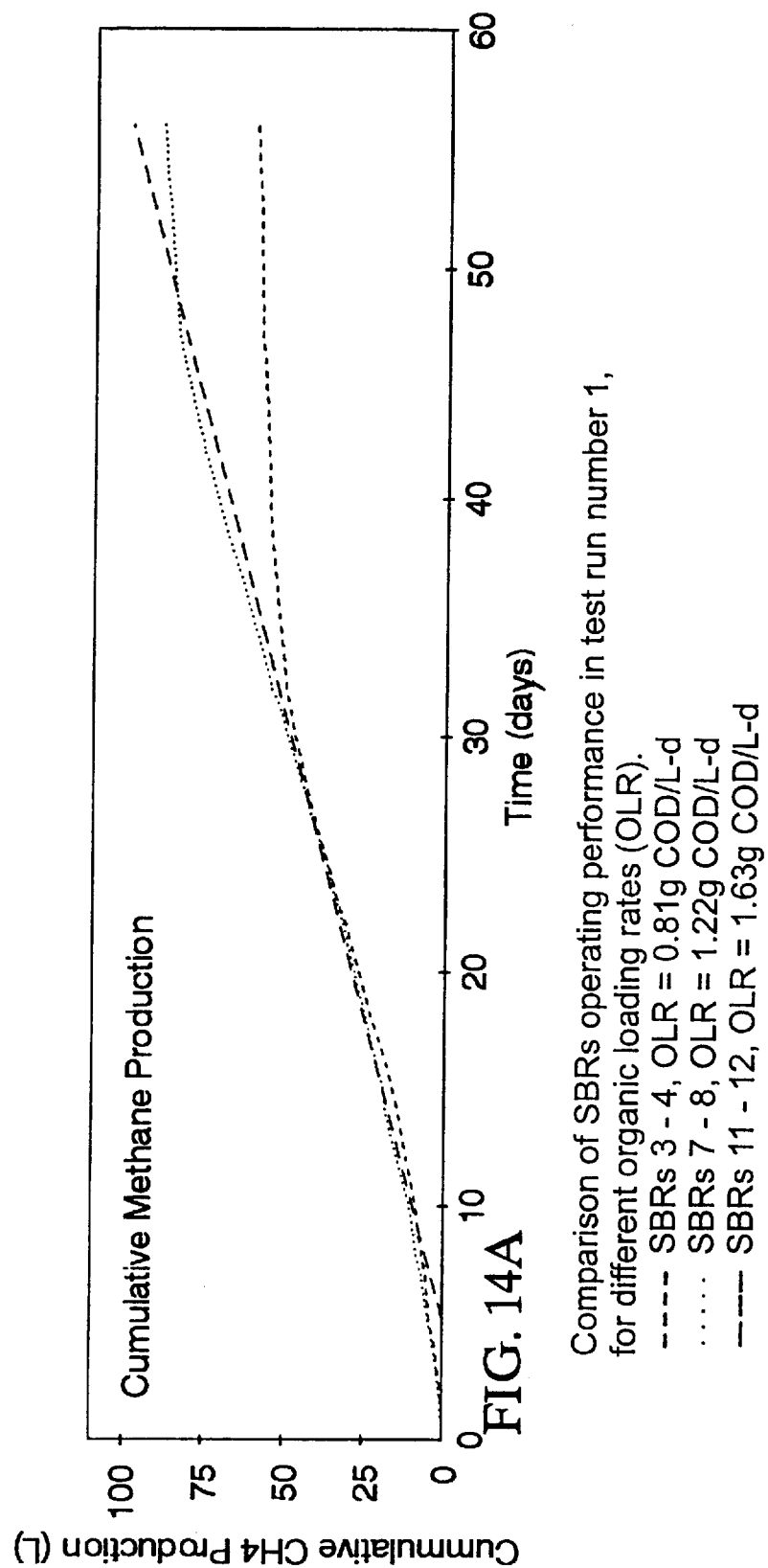

FIG. 1 is a schematic illustration of a laboratory scale sequencing batch reactor according to the present invention. Each of the reference numerals refer to the following:
1. 300 mm diameter plexiglass digester
2. sludge bed zone, 8.0 L
3. variable volume zone, 28.0 L
4. head space zone, 6.0 L
5. gas recirculation line
6. biogas recirculation pump
7. influent line
8. effluent line
9. sludge sample port, also used for sludge wastage
10. mixed liquor or supernatant sampling port
11. gas outlet
12. gas meter
13. thermocouple
14. feeder tube
15. gas pump
16. hydrogen gas monitor
17. liquid pump
18. dissolved hydrogen gas monitor The treatment process of the present invention comprises five consecutive steps: 1) Fill; 2) React; 3) Settle; 4) Draw; and 5) Idle. During the fill period organic waste, such as swine manure, is loaded into the digester (1) through the feeder (14). The digester (1) contains an acclimatized anaerobic sludge (2) that contains psychrophilic bacteria. The contents of the digester may be mixed, if desired, by recirculating the biogas produced in the headspace (4) through the biogas recirculation line (5) using a gas pump (6).

A. START UP OF THE SEQUENCING BATCH REACTORS

Eight sequencing batch reactors, numbered 5–12, were initially inoculated with 7.5 L of anaerobic granular sludge obtained from the Agropur Co-operative Dairy anaerobic wastewater treatment plant at Notre-Dame du Bon Conseil, Quebec, Canada. Digesters 7, 8, 11 and 12 received an additional 2 L of anaerobic non-granulated sludge obtained from the Robert O. Pickard, Environmental Centre, Ottawa, Ontario. The Agropur sludge substrate consisted mainly of fats and proteins. The anaerobic municipal sludge substrate comes from both primary and secondary clarifiers. Use of municipal sludge that is already acclimatized to compounds such as cellulose, hemicellulose and lignin should increase treatment efficiency. Compositions of the Agropur and municipal anaerobic sludge are given in Table 1.

The main characteristics of the Agropur granulated sludge were that it had very high solids, total chemical oxygen demand (TCOD), soluble chemical oxygen demand (SCOD), total kjeldahl nitrogen (TKN) and calcium content. The municipal sludge was less concentrated than the granulated Agropur sludge but it had a higher fibre content on a dry weight basis and also had a lower alkalinity. Both sludges came from digesters operated at 35° C.

The concentration of C, H and N of the organic fraction of Agropur and municipal sludges given in Table 1 yield the following stoichiometric formulations for the volatile solids composition:

Municipal sludge: $C_5$, $H_{11.5}$ $N_{0.66}$ $O_{1.8}$
Agropur sludge: $C_5$, $H_{9.25}$ $N_{0.84}$ $O_{2.7}$

START-UP RUN RESULTS

The anaerobic SBRs were operated at 20° C. for a period of 2.5 months between Jun. 14 and Sep. 1, 1993 without any breakdown or sign of process instability. Operating conditions for the start-up run are given in Table 2. FIGS. 2 and 3 give cumulative biogas production as a function of time, organic loading rate (OLR) and inoculum type. Shapes of cumulative biogas production curves are similar for the four treatments. Rate of gas production was low during the fill period and increased during the react period. The lag phase in biogas production which lasted about 30 days was probably due to acclimatization of microorganisms to the decrease in operating temperature from 35° to 20° C. and to the new substrate (swine manure). During the react period the bias production rate increase exponentially, until the end of the react period when it started to decrease as the availability of substrate became the limiting factor. FIGS. 2 and 3 also show that substantial amounts of bias were produced beyond the react period. This is an indication that the treatment of the manure slurry fed during the startup run was not complete at the end of react period. Therefore during startup the organic loading rate should be reduced or the react period extended beyond the period used here. The react period is completed when the volatile acids and SCOD are completely used. In this start-up run, the react period was extended by 20 days.

Digesters with combined sludge produced the highest amount of bias. Cumulative bias production was 30 to 70% higher in these digesters at organic loading rates (OLR) of 0.72 and 1.20 g COD/L-d, respectively. The higher bias production may have been caused by an increased hydrolysis rate. The combined sludge contained anaerobic sludge from municipal wastewater treatment plants. This sludge is already acclimatized to compounds such as cellulose, hemicellulose and lignin. The Agropur sludge was only acclimatized to proteins and fats which are the major constituents of dairy wastewater. Another possible reason for the higher bias production could be that the activity of the municipal sludge was higher than the activity of the Agropur sludge. Actual sludge activities of the inoculum were not measured in this study.

During the first 60 days, increased in loading rate had no significant effect on bias production for the digesters with the Agropur sludge. However, for the digesters with combined sludge there were an increase in bias production of 40% when the OLR increased from 0.72 to 1.20 g COD/L-d.

FIGS. 4 and 5 give the average (of two replicates) methane concentration in the bias as a function of time. For the four treatments tested, the methane fraction in the bias was not constant. It continuously increased with time. At the start of the fill period the methane concentration ranged from 47 to 63%. At the end of the react period the methane concentration was about the same for all treatments. It ranged from 77 to 80%.

FIGS. 6–11 illustrates the acetic, propionic and butyric acid concentrations as a function of time, respectively. They also indicate the cumulative feeding concentration of each individual VA. FIGS. 6 and 7 indicate that acetic acid accumulated from 0 to 5500 mg/L during the fill period. This accumulation is about five times larger than the amount of acetic acid fed to the digesters. FIGS. 8 and 9 show that propionic acid was accumulating faster in digesters with the Agropur sludge than in digesters with combined sludge during the fill period. Explanations for the increase in propionic acid are given later. For digesters with combined sludge the propionic acid accumulations were equal to the cumulative concentration fed. FIGS. 9 and 10 show that butyric acid was not accumulating during the fill period, but rather was consumed because the concentrations of butyric acid in the digesters were substantially lower than the cumulative concentration fed.

The rapid increase in acetic acid concentration during the fill period indicates that hydrolysis and acidification were occurring. It also indicates that during the fill period the utilization of acetic acid by the methane formers was the rate limiting step. The rapid increase in acetic acid is usually due to the faster growth rate of acid formers or inhibition of methane formers by an increase in concentration of VAs or other compounds. By comparing FIGS. 2 and 3 with FIGS. 6, 7 and 12, it is obvious that methane formers were not inhibited by the increase in VA concentrations. These figures indicate that during the period of increased VA concentration the methane production rate also increased. Therefore the increase in VA is more probably due to the faster growth rate of acid formers. The large increase in VAs did not affect the process stability. This was because: 1) alkalinity in the SBRs was very high 16000 mg $CaCO_3$/L) (the large increase in VAs caused only a small drop in pH); and 2) pH was maintained between 7.5 and 7.8 (unionized VA concentration was always low, $\leq 6$ mg/L). This information is important in kinetic model development. Several existing models assume that growth rate of methane formers is affected by the VAs concentration. Based on preliminary results for this work, this theory does not apply up to concentrations of 6000 mg/L acetic acid in anaerobic digestion of swine manure at 20° C. in SBR. FIGS. 6, 7, 10 and 11 show that during the react period there was rapid utilization of acetic and butyric acids. The decrease in acetic and butyric acid concentrations indicate that hydrolysis and acidification were the rate limiting processes during the react period. FIGS. 6 to 11 show that when the organic loading rate increased from 0.72 to 1.20 g COD/L-d, the maximum acetic, propionic and butyric acid concentrations in the SBR increased by 25, 13 and 30%, respectively.

Inoculum type did not have much effect on acetic acid concentrations although the SBRs with the combined sludge inoculum had higher $CH_4$ production and lower propionic and butyric acid concentrations at any time. This indicates that SBRs were more stable with combined sludge than with Agropur sludge. Consequently, all subsequent experimental runs were carried out with the combined sludge inoculum.

FIG. 12 shows total and individual VA concentrations as a function of time for each treatment. This figure shows that propionic acid is the only VA that increased during the react period. A mass balance on propionic acid shows that it was being utilized during the fill period, but at a rate lower than the feed and production rate. The increase in propionic acid might be due to an increase in dissolved hydrogen gas concentration (Mosey, 1983). Fukazaki et al., 1990, stated that fermentation of propionic acid to $CH_4$ and $CO_2$ is inhibited by dissolved hydrogen and acetic acid. Results for SBRs 7–8 in FIG. 12 indicate that propionic acid was utilized even when the concentration of acetic acid was high. Therefore the propionic acid accumulation in this study may be attributed to the effect of dissolved hydrogen in the SBRs. Another possibility for the increase in propionic acid is inhibition of hydrogenotrophic methanogens. FIG. 12 also confirmed that the manure slurry was not fully treated at the end of the react period. This figure also indicates that the react period for the startup run must be increased by 20 days for all VAs to be completely used. Therefore the startup run of a full scale SBR the organic loading rate should be reduced by 50% or the react period extended by at least 20 days.

FIG. 13 gives the pH level, alkalinity and ammonia concentrations respectively as a function of time for the SBR with an organic loading rate of 1.2 g COD/L-d. Similar curves were obtained at the lower organic loading rate of 0.7 g COD/L-d. The pH ranged from 7.4 to 7.8. The higher concentration of VAs during the react period did not affect the microorganisms because of the high initial alkalinity in the SBR. The increase in VAs slightly reduced the pH and alkalinity during the fill periods. During the react period both the alkalinity and pH started to increase mainly due to VAs utilization. The contribution of ammonia-N to the pH and alkalinity increase during the react period was negligible because there was no increase of ammonia-N during this period (FIG. 12). The high concentration of ammonia-N did not inhibit methane formers in the SBR, because both the methane production and the ammonia-N concentration increased simultaneously. Kroecker et al. (1979), found that ammonia is inhibitory to the methanogenic bacteria when its concentration exceeds 2000 mg/L. Melbinger and Donnellon (1971), found that ammonia is toxic only when its concentration exceeds the threshold limit of 1700 to 1800 mg/L and is increasing faster than the acclimatization of the methanogenic bacteria. McCarty (1964) indicated that an ammonia-N concentration exceeding 3000 mg/L is toxic to the anaerobic bacteria regardless of pH. Henze and Harremoes (1983), indicated that dissolved ammonia gas is substantially more toxic than ammonium ions to anaerobic bacteria. He indicated that a dissolved ammonia gas concentration ranging between 100 and 200 mg/L should have an inhibitory effect on the anaerobic process. In this test, the total ammonia-N concentration (3700 mg/L) represents the sum of ammonium ions (3550 mg $NH_4^+$N/L) and dissolved ammonia gas (150 mg $NH_3$—N/L). Inhibition by ammonia-N was not observed in the startup run. It is likely that the long hydraulic and solids residence times provided in this test allowed the microorganisms to increase their tolerance to high concentrations of ammonia-N. PAD in SBR appears to be suitable to treat wastewater with high nitrogen content.

METHANE PRODUCTION

Table 3 gives methane production as a function of VS fed to the digester. The $CH_4$ production ranged from 0.30 to 0.66 L/g VS for most of the experimental runs. Methane production obtained in this study was substantially higher than methane production from swine manure obtained by digestion at 35° C. in continuous flow digesters by Kroecker et al. (1979), who reported methane production of 0.45 L $CH_4$/g VS added for a loading rate of 2.5 kg VS/$m^3$-day, and by Hashimoto (1983), who reported 0.42 L $CH_4$/g VS added for a loading rate of 2.5 kg VS/$m^3$-day.

The higher methane production per gram of VS fed to the SBRs obtained in this study could be due to: 1) the lower organic loading rate and longer HRT; 2) the fact that the measured VS in the influent is lower than the actual VS concentration. This inaccuracy is due to the volatilization of some volatile acids and other soluble organics during the VS determination; and 3) the fact that the measured methane flow rate includes the methane produced from microorganism decay. Another possible reason could be that lower operating temperature and the absence of mixing maintain higher concentrations of hydrogen and carbon dioxide in the liquid phase. As a result more carbon dioxide can be converted to methane by the hydrogen utilizing methanogens. Also, with the continuous flow anaerobic processes previously experimented, some $CO_2$, $H_2$ and $CH_4$ were lost in the digester effluent.

A high rate of methane production was not the main objective of this work but it is very useful to assess system performance and stability. Steady production of methane per unit mass of VS fed indicates that PAD of swine manure at 20° C. in the laboratory-scale SBR digesters was a stable process.

Table 3 also gives the average level of removal of TCOD, SCOD and VS of two replicate tests for all runs. Total COD removal range from 58 to 73% and the VS removal ranged from 27 to 74%. Results for VS and total COD were highly variable due to sampling variation caused by rapid settling of heavy particulates. Some samples had less solids than others. This affected VS and TCOD determinations as well as the calculated methane production per gram of VS. The soluble COD test results were consistent. High SCOD removal ranging between 85–96% was achieved during the runs.

B. TEST RUNS

The pre-inoculated digesters 5–12 were used in various test runs of the process of the present invention. Various process parameters were altered such as organic loading rates, fill and react period lengths, mixing intensity, feed frequency, sludge age and temperature. The effects of antibiotics on the process were also studied. The parameters were altered with a view to simulate as closely as possible the actual farm operation. At a typical farm, manure is generally removed from the barn one to three times a week. Therefore the SBR should be intermittently fed one and three times a week. The fill cycle should not be longer than a month in order to limit the volume of the SBR. The settling period should be long enough to provide complete solids/liquid separation. The react period should be long enough to produce almost odourless effluent with reduced pollution potential and increased fertilizer value. For the PAD in SBR to be cost effective, it is very important that the operational cost is kept very low. The operation of SBR at ambient temperatures and the reduction or elimination of mechanical mixing would substantially reduce the energy input and increase the energy efficiency of the SBR because all the energy produced will be available for on farm utilization.

TEST RUNS 1 AND 2

Test run No. 1 and 2 investigated the effect of loading rates, mixing intensity, fill-react period length, feeding frequency and sludge age on the performance of PAD of swine manure slurry in SBR. Table 4 gives the SBRs operating conditions that were used in this study.

Digesters 5 to 12 were inoculated in the set up run described above and therefore contained sludge that had already acclimatized to swine manure at 20° C. Digesters 1 to 4 were first inoculated in test run 1 (therefore not acclimatized) with the same mixture of anaerobic sludges used in the set up run.

A mixed liquor sample was withdrawn (through a sampling port (10) shown in FIG. 1) from each SBR at the beginning of the experiment and once a week during the experimental run. At the end of the test, after the sedimentation period, additional samples were withdrawn from the supernatant (10) and sludge bed zones (2). The samples were analyzed for pH, alkalinity, solids, volatile acids, total Kjeldahl nitrogen (TKN), ammonia nitrogen, total chemical oxygen demand (TCOD) and soluble COD (SCOD). Some of the samples were further analyzed to determine concentration of C, H, N and other elements. The bias production was monitored daily and its composition analyzed weekly. All the analytical tests carried out on the mixed liquor were also performed weekly on samples of swine manure slurry fed to the SBRs.

Soluble COD was determined by analyzing the supernatant of centrifuged slurry. The pH, alkalinity, and solids were determined using standard methods (Alpha, 1992). TKN and ammonia nitrogen were determined using an auto-analyzer. Volatile acids and bias composition were determined by gas chromatography. Metal concentrations (K, Ca, Mg, Cu, Zn, Na, Hg) were determined by the inductively coupled plasma (ICP) methods (Alpha, 1992).

Table 5 gives compositions of the swine manure and inoculum sludges used in the experimental runs. The total solids content of the manure slurry was high. It was around 4.1% (weight basis). The fresh slurry had a neutral pH and very high concentrations of TCOD, SCOD, TKN, $NH_3$—N and volatile acids and alkalinity. The concentration of inorganic elements such as calcium, magnesium, potassium, sodium, zinc and copper were also quite high.

The main characteristics of the Agropur granulated sludge was that it had a very high TS, TCOD, SCOD, TKN and calcium content. The municipal sludge is less concentrated than the granulated Agropur sludge but it has a higher fibre content on a dry weight basis and also has a lower alkalinity than dairy sludge. Both of these sludges came from digester operated at 35° C.

All the SBRs maintained an alkalinity around 12000 mg($CaCO_3$)/L and a pH between 7.5 and 8.0 during experimental runs 1 and 2. Both the pH and alkalinity decreased slightly during the feed period due to volatile acids (VA) accumulation and they both increased slightly during the react period due to the VA utilization.

FIGS. 14A–14D shows the typical response of the SBR fed with different organic loading rates. During the four-week fill period the cumulative bias production was identical for the three organic loading rate. The reason for this might be that the three set of digesters had about the same population of methane formers at the start of the test and the methane production rate was not limited by the substrate availability but was rather controlled by the growth rate of methane formers. During the subsequent four-week react period the digesters with the lowest organic loading rate (0.81 g COD/l-d) stopped producing methane. This was because most of the soluble COD and volatile acids were consumed during the fill period. The digesters with the intermediate organic loading rate (1.22 g COD/l-d) stopped to produce gas midway through the react period for the same reasons.

FIGS. 14A–14D also illustrates the soluble COD, acetic and propionic acids concentrations as a function of time. As expected, the concentration of volatile acids and SCOD in the SBR increased with an increase in organic loading rate. This increased in volatile acids indicates that hydrolysis and acidification were occurring and that utilization of acetic acid by the acetoclastic methane formers was the rate limiting step. This accumulation in volatile acids and SCOD was typical of all experimental run.

For the lowest loading rate (0.81 g COD/l-d) there was no propionic acid accumulation in the SBR while acetic acid concentration stayed below 500 mg/L. For the SBRs with the highest loading rate (1.63 g COD/L-d) acetic and propionic acids were both present and their respective concentrations reached maximum values of 3000 and 900 mg/L at the end of the fill period. For each loading rate the volatile acids were completely utilized at the end of the react period. From these results it can be concluded that the SBRs were very stable at these loading rates. The lowest loading rate would not be recommended because no treatment occurs during the react period. A loading rate of 1.63 g COD/L-d should be recommended. As shown in FIG. 14 at this loading rate the react period is utilized to its maximum. Complete utilization of both volatile acids and soluble COD occurred at the end of this period.

Figure 15C:
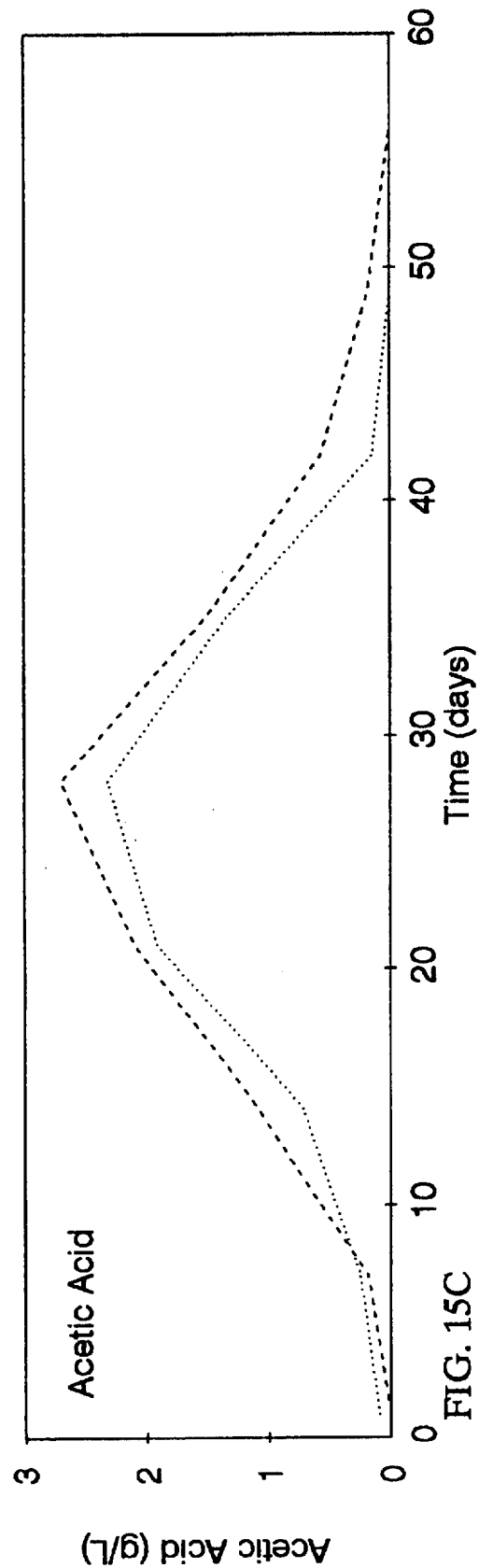
Figure 16C:
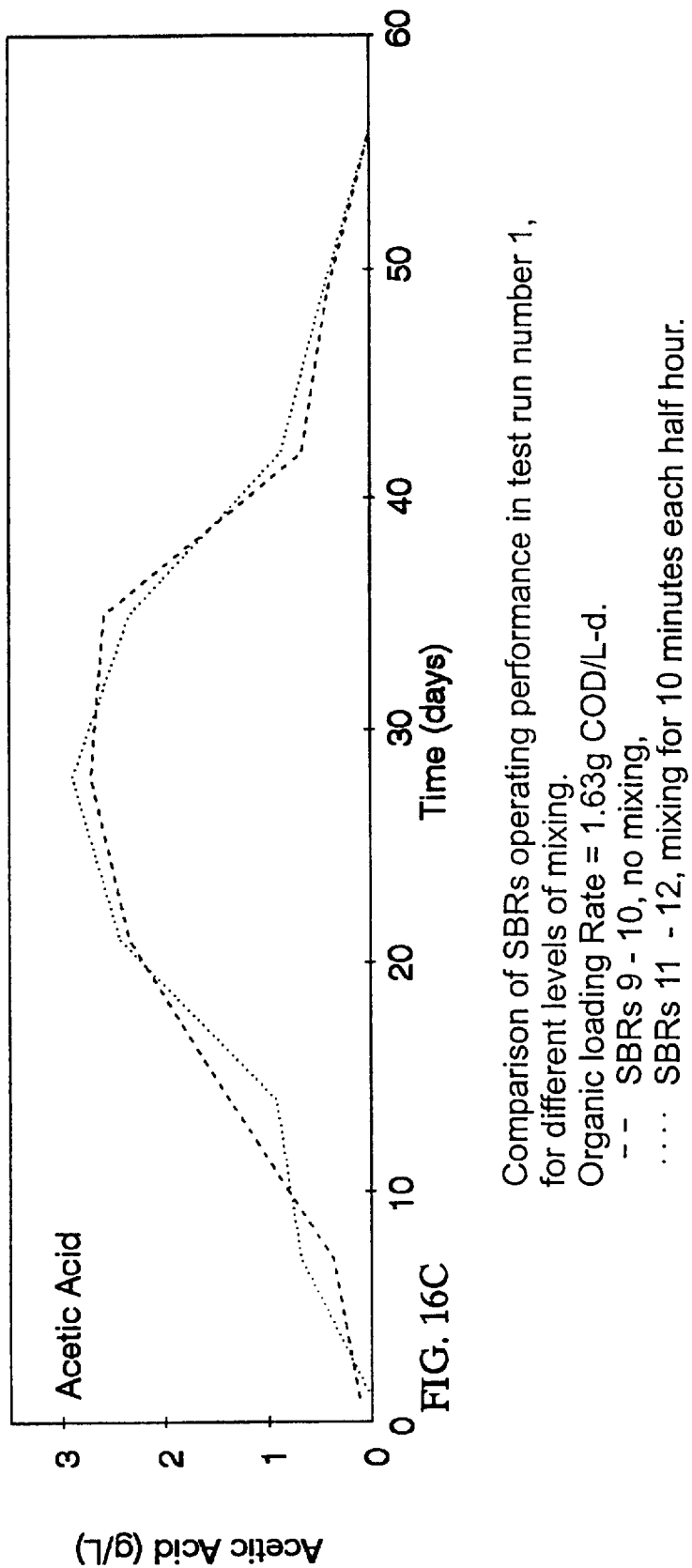
Figure 19B:
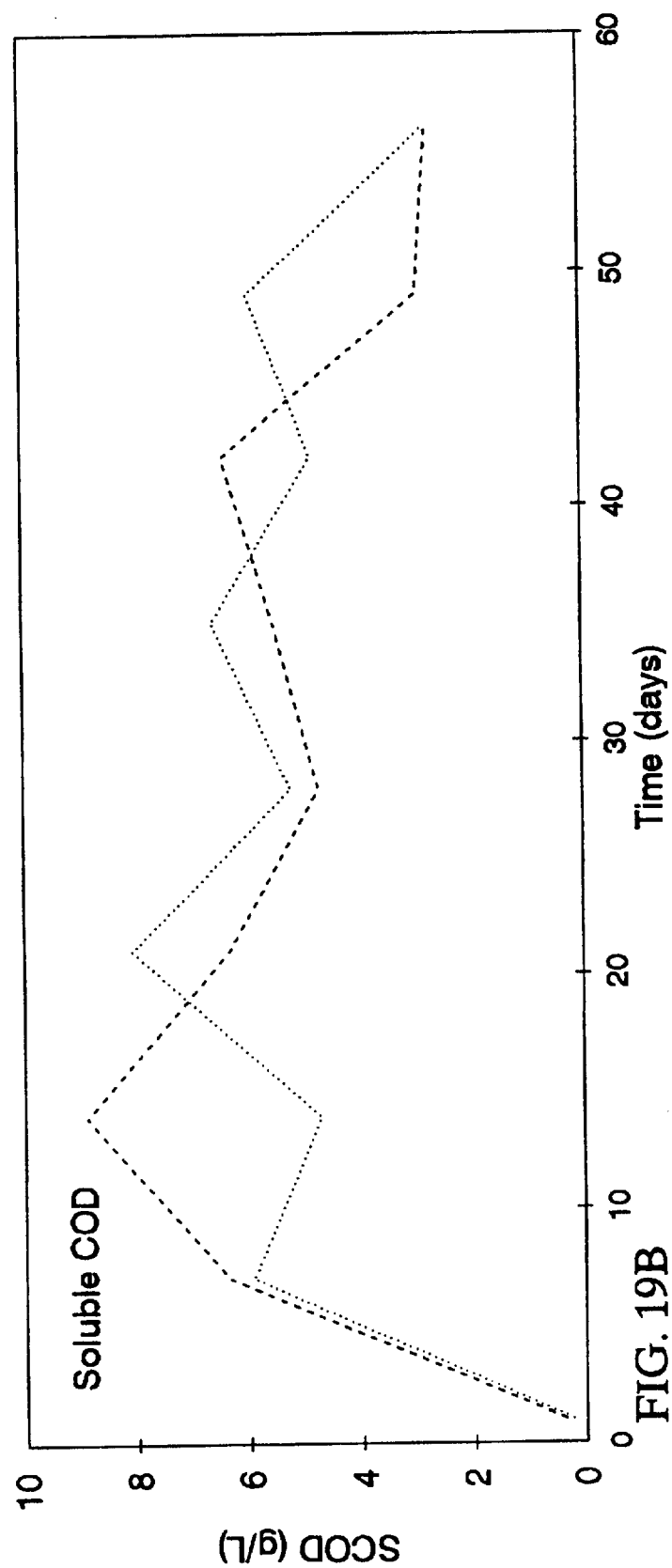

FIGS. 15 and 16 compare the SBR performance for different intensity of mixing at loading rates of 1.22 and 1.63 gCOD/L-d, respectively. FIGS. 15A–15D shows that intermittent mixing slightly increased the production rate of methane and the utilization rate of volatile acids, but did not have an effect on soluble COD. Because the SCOD and VA concentration were the same at the beginning and end of the cycle for the intermittently mixed and non-mixed SBRs, the methane production and VA utilization should have been the same. These differences in methane production and VA utilization could be due to a slightly different organic loading rate.

FIGS. 16A–16D shows that for digesters fed a higher organic loading rate (1.63 g COD/L-d) there was no difference in process performance between the intermittently mixed and non-mixed digesters. Mixing of a full scale digester consumes large amounts of energy, and based on these experimental results, SBR mixing may not be necessary for full-scale farm digesters. This would simplify the operation of the SBR, reduce maintenance cost as well as possible mechanical problems.

FIGS. 17 and 18 compare the typical response of SBR to feeding frequency of 1 to 3 times a week with the same total weekly organic loading for all digesters. FIGS. 17A–17D shows that frequency of feeding had no significant effect on SBRs with a feed-react cycle length of 28 days. The SBRs fed once a week produced 13% more gas and had about the same effluent soluble COD concentration as reactors fed 3 times/week. These results indicate that the SBRs fed once a week were also very stable and treated the swine manure slurry adequately.

For the SBRs with a cycle length of 14 days the feeding frequency had no effect on SCOD, acetic and propionic acids accumulation. Only the cumulative methane production was 14% higher. These experimental results indicate that both one and three times a week feeding frequency may be acceptable for farm scale SBRS.

Cycle length is an important parameter in the design of SBR because it controls the size of the digester, the treatment efficiency as well as the frequency that the farmer has to deal with SBR effluent removal.

FIGS. 19A–19C and 20A–20C show that the cycle length has only a small effect on the distribution of SCOD and acetic acid concentrations. The SBR with the shorter feed-react period had twice the number of cycles compared to the longer feed react period over the 56 days of operation. As a result, there was more fluctuation in the SCOD and acetic acid concentration. FIGS. 19 and 20 also show that the cycle length has no effect on process performance. Final concentration of SCOD and acetic acid were the same after 56 days of SBR operation using either the two-week or four-week cycle.

FIGS. 21 and 22 show the effect of cycle length on cumulative and daily methane production. For both cycle lengths the maximum daily methane production occurred at the end of the fill period and the minimum at the end of the react period (FIG. 22). As expected the SBRs with the shorter cycle length (14 days) showed more variation in weekly methane production. FIG. 21 shows that the total cumulative methane production after 56 days was the same for both cycle lengths. Therefore the total amount of energy recovered by PAD in SBR was not affected by the cycle length investigated in this study.

At the farm a steady and constant production of methane gas would be preferable in order to develop an adequate bias utilization strategy. A minimum of two SBRs would be required to process the swine manure slurry at a farm. FIG. 23 shows the total daily methane production from two SBRs operated simultaneously at fill/react cycle lengths of 14 and 28 days. By comparing FIG. 23 with FIG. 22, it is obvious that a pair of SBRs provides a more constant supply of methane than a single SBR. FIG. 23 also shows that with a pair of SBRs the cycle length did not have a significant effect on the total daily methane production. Therefore at the farm, SBRs with cycle length of either 14 or 28 days would be acceptable.

FIG. 24 compares the SBRs response to sludge age. Anaerobic sludge in digesters 7 and 8 in the start-up run were exposed to swine manure slurry and low temperature for the first time. During this run there was a long lag phase in the bias production during the feeding period. In test run number one, the same sludge that had already been exposed to swine manure slurry and low temperature for a period of three months. Both were fed about the same organic loading rate. The SBRs with an older acclimatized sludge had: 1) a shorter lag phase and a substantially higher methane production rate; and 2) substantially lower concentration of soluble COD, acetic and propionic acids at the end of the react period. These experimental results indicate that sludge age has a significant influence on the process response.

Figure 25B:
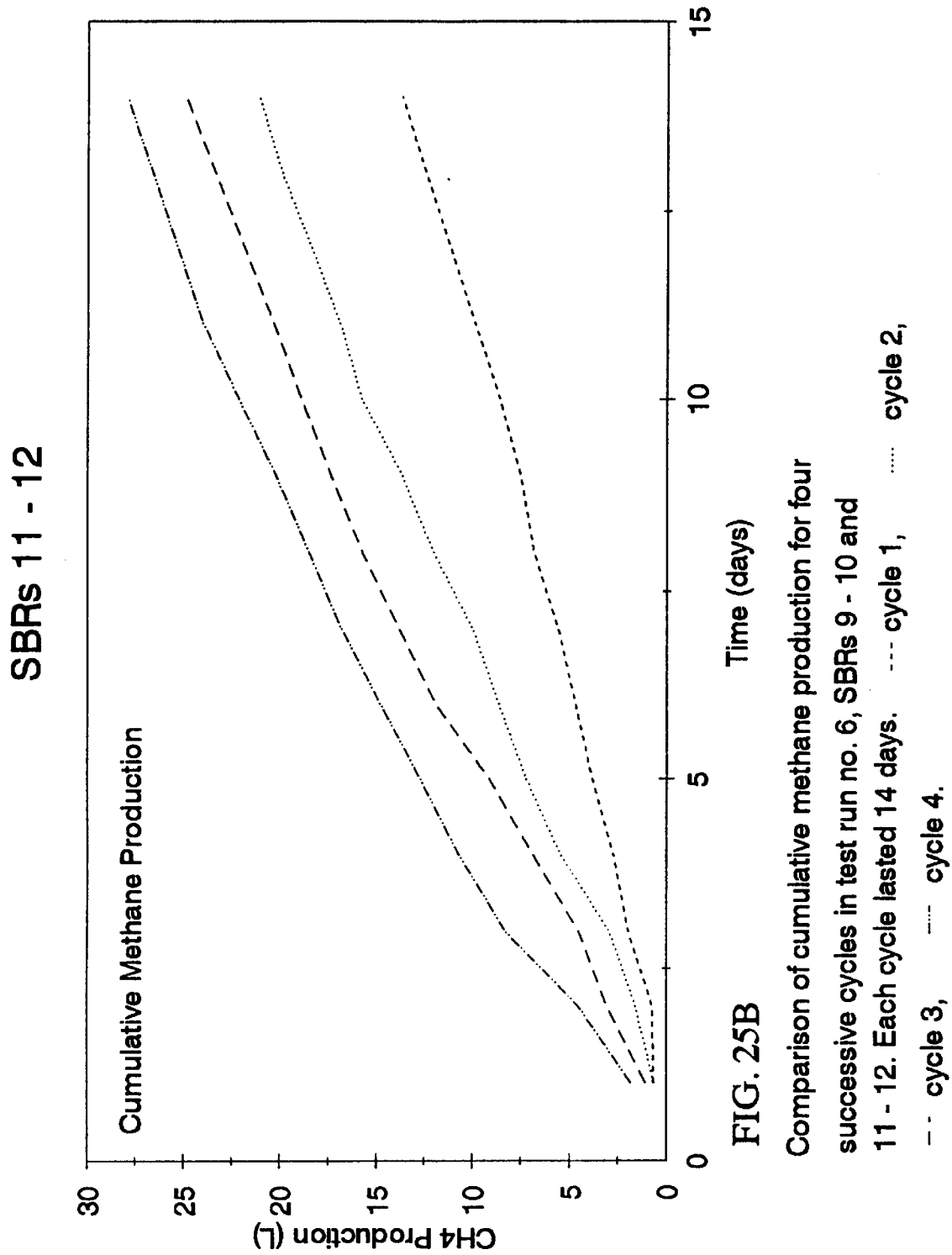
FIG. 25B is a graph illustrating the cumulative methane production over time for four successive cycles in sequencing batch reactors numbers 11–12.

FIG. 25 compares the cumulative methane production for each consecutive cycle during test run number two. These figures clearly indicate that the initial methane production rate and the total cumulative methane production for each cycle increased after each successive cycle and the lag phase at the beginning of the cycle decreased as the test progressed. These results clearly indicate that micro-organisms' acclimatization to low temperatures and swine manure slurry was taking place.

The bias produced in test runs one and two was of high quality with a methane concentration between 75 and 80%. Table 6 gives the methane production as a function of unit mass of volatile solids fed to the digester. The $CH_4$ production ranged from 0.48 to 0.66 L/g VS for most of the experimental run. As reported in the start-up run, methane productions obtained in this study were substantially higher than methane production from swine manure obtained by digestion at 35° C. in continuous flow digesters by Kroecker et al. (1979). A high rate of methane production was not the main objective of this work but it is very useful to asses the system performance and stability. The steady production of methane per unit mass of volatile solids fed indicates that anaerobic digestion of swine manure at 20° C. in the laboratory-scale SBR digesters was a stable process.

Table 6 also gives the level of removal of TCOD, SCOD and volatile solids for all runs. The total COD removal ranged from 41 to 83% and the volatile solids removal ranged from 46 to 84%. Results for volatile solids and total COD were highly variable due to sampling variation caused by rapid settling of heavy particulates. Some samples had less solids than others. This affected the VS and TCOD determination as well as the calculated methane production per gram of VS.

The soluble COD test results were consistent. High SCOD removal was achieved during most of the experimental runs. Its removal ranged from 79% to 93% except in a few runs discussed below. Experimental runs that achieved 70 to 93% SCOD removal and complete utilization of VA's, produced treated manure that was relatively odourless compared to the raw manure.

SBRs 1, 2, 3 and 4 in test run No. 2 had very low energy recovery and reduction in SCOD. These SBRs were started-up in test run 1 and their organic loading rate was doubled in test run 2. This rapid increase in organic loading rate caused their failure.

The anaerobic sludge had excellent settling characteristics. In the SBR that were not mixed, there was a clear interface between the liquid and sludge bed zones. A thick layer of sludge was observable at the bottom of the digester. At the end of the react period where the bias production was very low, the demarcation between the liquid and solids was even more evident. In the SBRs that were mixed there were no distinguishable supernatant and sludge zones. For these SBRs, when mixing was stopped at the end of react period, It would take about 2 to 6 hours for a zone settling or liquid/solids interface to form and another 24 to 48 hrs for the sludge blanket to completely settle at the bottom of the SBR. Therefore the SBR provides excellent settling conditions to retain the slow growing microorganisms when enough time is allowed for the settling period.

Another very important feature of a SBR is that it does not require continuous feeding. Therefore, in farm applications, PAD in SBR will not interfere with regular farm operations as previous systems did. It could be loaded during normal manure removal operations and the farmer would not have to deal daily with the digester effluent. At the farm the SBR effluent will need to be handled once every one or two months, depending on the operating conditions. Because of intermittent feeding the SBR could make use of existing manure handling equipment at the farm and also because SBR will not interfere with farm operation, it will increase substantially the interest in anaerobic digestion to treat animal manure on small and large farm operations.

TEST RUNS 3 AND 4

These runs were performed in order to determine the effects of low temperature on the process of the present invention. Digesters 5–12 were used in these runs. The operating conditions for these runs are shown in Table 7.

Table 8 gives the composition of the swine manure used in the experimental runs. FIGS. 26 to 29 and 30 to 33 show the typical response of SBRs operated at temperatures of 10° and 15° C., respectively. FIGS. 26 and 30 shows that there was no lag phase in gas production for both pairs of SBRs operated at temperatures of 10° and 15° C., respectively. Therefore, the microorganisms' acclimatization to low temperatures and swine manure slurry took place. FIGS. 26 and 29 also show that the methane production rate doubled when the temperature increased from 10° to 15° C. Table 9 shows that the methane production per gram of SCOD fed also doubled when the temperature increased from 10° to 15° C.

FIGS. 27 and 31 show the accumulation of acetic acid in the SBRs. For each operating temperature the acetic acid accumulated during the feed period and was completely utilized at the end of the react period. FIGS. 28 and 32 show the propionic acid accumulation and FIGS. 29 and 33 show the SCOD accumulation. The propionic acid and SCOD accumulation increased during the feed period and decreased during the react period. These experimental results indicated that the operating temperature has a significant influence on the process response. These results also indicate that the SBRs operated at temperatures of 10° and 15° C. were also very stable.

Temperature is an important parameter in the design of SBRs because it controls the size or hydraulic residence time (HRT) of the digester. Based on the above results, an SBR operated at 10° C. can still function but it would required a volume or an HRT that is 100% greater than for a SBR operated at 15° C. to achieve the same level of treatment.

TEST RUNS 5–7

Test runs 5–7 were conducted in order to determine if antibiotics in the pigs' diet would have any effect on the process of the present invention.

1) Diet Preparation

One diet without antibiotics (control) and six medicated diets, each containing one of the antibiotics listed in Table 10, were prepared. The control and medicated diets were made up of 50% ground corn, 25% ground barley, 17% soybean meal, 1.3% limestone, 1.8% dicalcium phosphate, 1.25% lignosol, 0.4% iodized salt, 0.5% Ottawa Swine Premix, 0.5% Ottawa Swine Vitamin P., 0.1% hydrochloride and 2% stabilized fat. The diets containing an antibiotic had all the above listed ingredients. The antibiotic doses were based on the recommendation of the Compendium of Medicating Ingredients Brochures (Agriculture Canada, 1990). The recommended doses are given in the Table 10.

2) Slurry Collection

Sixteen growing-finishing barrows or gilts weighing about 30 kg were used to supply manure. Pairs of pigs placed in individual pens were fed one of the listed diet for a period of two weeks. Feces and urine collected every day during the second week were mixed thoroughly at the end of the week, then placed in 3.5 L polypropylene containers and stored in a freezer. Samples were taken during the mixing operation and analyzed for chemical and physical properties. The containers were removed from the freezer and thawed at room temperature and diluted with tap water at a ratio of 2:1 (slurry:water). The purpose of the dilution was to adjust the characteristics of the manure slurry to a level that is more representative of swine manure characteristics in commercial swine operations.

3) Laboratory Setup

The eight SBRs (5–12) that had been used for the treatment of swine manure for more than a year (start-up run and test runs 1–4) were used for the antibiotic tests. The SBRs were located in a controlled temperature room maintained at 20° C. The SBR had a volume of 40 L and initial sludge volume of 9 L. The bias production was monitored with wet tip gas meters. Mixing of sludge was provided every morning for five minutes by re-circulating the bias. Mixing was to avoid sludge compaction. Duplicate SBRs were used for the control and each antibiotic.

4) Experimental Design

The experiment was divided into three runs numbered 5–7 (see Table 11). In runs 5 and 6, individual antibiotic and a control were simultaneously fed to four pairs of digesters. In run 7, manure slurries used in test run 5 and 6 were mixed and the effect of the mixtures were evaluated. The digesters were fed once a week at loading rate presented in Table 14. The SBR operating cycle included two weeks of feeding and 2 weeks of reaction. The settling and idling periods were part of the end of the react period. The first two runs were repeated for two cycles. The third run only had one cycle.

5) Analytical Procedure

A 100 mL sample of mixed liquor was taken from each SBR every week. In order to get fairly uniform samples, the SBRs were mixed for ten minutes before samples were taken. At the end of the treatment cycle mixing was not provided; samples were taken from both supernatant and settled sludge layers. Samples were analyzed weekly for pH and soluble chemical oxygen demand (SCOD). Total chemical oxygen demand (TCOD), alkalinity, total solid (TS), volatile solids (VS), total suspended solid (TSS), volatile suspended solids (VSS), ammonia ($NH_3$—N) and total Kjeldahl nitrogen (TKN) were analyzed only at the beginning and end of the cycle. Gas composition was analyzed weekly. VFA were analyzed at the beginning and the middle of each week. The analytical methods used were the same as by Massé (1995).

Characteristics of Swine Manure Slurries

Table 12 gives the composition of the swine manure used in test runs 5 and 6. Table 13 gives the composition of the swine manure for test run 7. The swine manure slurries had a high pollutant content. The solid content ranged between 9 to 14.50 and the TCOD ranged between 129,000 to 205,000 mg/L. The VFAs ranged between 8000 to 14000 mg/L. The concentration of ammonia and total nitrogen were also high. Ammonia concentrations ranged between 4600 and 5200 mg/L and TKN ranged between 5900 and 9200 mg/L. The large variations in manure slurry characteristics might be due to variation in pig metabolisms (see variations for controls in Table 12 and 13) and presence of antibiotics. It was not possible to quantify the individual contributions of the antibiotics.

Biopas Production

FIGS. 34, 35 and 36 show the cumulative methane production of PAD in intermittently fed SBR operated at 20° C. The bioreactors were fed with a control (no antibiotic) and swine manure slurries containing a single or mixture of antibiotics. The cumulative bias production curves were corrected to take into account the difference in TCOD content of the swine manure slurries fed to the pairs of SBRs. The methane production was higher in cycle 2 than in cycle 1. This is probably due to the microorganisms acclimation to the high strength and solids content swine manure slurries.

Table 14 gives the methane production per gram of TCOD fed to the bioreactors. FIGS. 34 to 36 and Table 14 show that the bioreactor fed with swine manure slurry containing antibiotics except for carbadox and tylosin experienced a decrease in methane production for both cycle 1 and 2. At the end of the second operating cycle methane reductions of 20% for penicillin, 30% for tetracycline, 20% for sulphamethazine and 14% for Lyncomycin were observed with reference to the control. The bioreactors fed with a mixture of antibiotics also experienced a decrease in methane production. Decreases of 16% for mixture 1 (tylosin, carbadox and sulphamethazines) and 16% for mixture 2 (tetracycline, penicillin and lyncomycin) were observed compared to the control. The mixtures of antibiotics had less effect on bias production than the individual antibiotics. One possible explanation for this is that the concentration of each antibiotic was reduced by dilution when the swine manure slurries containing a single antibiotic were mixed together. The bioreactors fed with tylosin had a higher methane production than the control. The microorganisms were previously exposed to tylosin when the bioreactors were fed with manure slurry collected at a commercial farm for a period of two years. The pig diet used at the commercial farm contained a low concentration of tylosin (22 mg/kg). The presence of tylosin in previous tests may have acclimatized the microorganism to it.

Process Stability

FIGS. 37, 38 and 39 show the pattern of acetic and propionic acid concentrations as well as soluble COD in bioreactors during test run no. 5. Similar concentrations patterns were obtained during test runs no. 6 and 7. The soluble COD, acetic and propionic acid concentrations increased rapidly during the fill period and decreased rapidly during the react period. The acetic and propionic acids were almost completely used at the end of the react period. Butyric acid and detected at concentrations below 200 mg/L in most of the experimental runs but it was not detectable at the end of the treatment cycle. The utilization of manure slurries from pigs fed a diet containing an antibiotic did not have a significant effect on the SCOD and acetic and propionic acid concentration in the bioreactors with reference to the control. The SCOD concentrations at the end of the treatment cycle was always very low compared to the SCOD in the raw swine manure slurries.

Table 14 gives the concentration of methane in the biogas. The bioreactors fed with manure slurries containing antibiotic had about the same concentration of methane in their biogas as the bioreactor fed with the control manure slurry.

Table 15 gives the pH and ammonia concentration in the SBRs. The pH in the bioreactors fed with antibiotics and control bioreactors were very close. The antibiotics did not seem to have an effect on pH. Table 15 also gives the concentration of ammonia nitrogen, ($N_3$—N) and TKN in the SBRs at the end of the react period. The $N_3$—N and TKN concentrations were very similar in all the SBRs. The $N_3$—N concentration ranged between 4300 and 4700 mg/L and TKN ranged between 5900 and 6300 mg/L. The bioreactors performed well under these very high concentration of $N_3$—N and TKN.

The fact that (a) the SBRs were not affected by high concentration of ammonia nitrogen, (b) did not experience accumulation of VFAs at the end of the react period, (c) had a high concentration of methane, and (d) maintained an adequate pH, indicates that the bioreactor fed manure slurry containing antibiotics remained very stable. Therefore, the degree of inhibition of methane production observed in this study should not be critical for the stability and operation of farm scale bioreactors.

Treatment Efficiency

Table 16 gives the treatment efficiency of the bioreactors in test runs 5, 6 and 7. The presence of antibiotics in the pig diet did not seem to have any negative consequences on the treatment efficiency. The TCOD, SCOD, TS and VS removal are very similar for the bioreactors fed with the control and manure slurries containing antibiotics. The TCOD, SCOD, TS and VS removal exceeded 62, 76, 65 and 75% respectively. Even if the methane production was 20 to 30% lower in some digesters the treatment efficiency was not affected. One possible explanation for this is that the manure slurry fed to the bioreactors had very high TCOD and solids content. SBR systems provides quiescent settling conditions which allow the removal of a large fraction of TCOD and solids. As a result, the biological removal of TCOD and VS might be small compared to the physical removal. The reduction in methane production did not have an effect on SCOD removal. Therefore the reduction in methane production could be due to a reduction in hydrolysis rate caused by the antibiotics.

In summary, test runs 5–7 examined the effect of carbadox, tylosin, penicillin, tetracycline, sulphamethazine and lyncomycin on the PAD of swine manure slurry in intermittently fed SBR. All the above antibiotics except carbadox and tylosin had an inhibitory effect on methane production when applied at the maximum allowable dose in feed. The observed degree of inhibition should not be critical for the operation of farm scale bioreactors.

The results of this study also indicate that the antibiotics did not have any observable negative effect on the process stability and treatment efficiency. The process was not affected by high concentrations of ammonia nitrogen. The pH stayed within the optimal range. The bias was of good quality and TCOD, SCOD, TS and VS removal exceeded 62, 76, 65 and 75%, respectively.

It will be appreciated to one skilled in the art that various modifications can be made to the above described system without departing from the scope and spirit of the invention. For example, the size of the SBR and the fill and react periods will depend largely on the size of the farm as well as the personal choice of the operator. The process can also be used to treat other types of organic waste such as slaughter house waste water, food processing plant waste water and high strength waste water produced by other types of industries. Sources of sludge, other than the Agropur and municipal sludges described here, can also be used. For example, anaerobic sludges may be obtained from wet lands or marshes or from other anaerobic digesters fed with other types of organic wastes. Depending on the source and bioactivity of the sludge, the start-up procedures may have to be varied. The less bioactive the sludge the longer the acclimatization period. This will require a lower organic loading rate or a longer react period during the start-up period.

TABLE 1

Sludge Characteristics

| Constituent | Agropur Sludge | Municipal Sludge |
|---|---|---|
| Total Solids, % | 11.0 | 2.6 |
| Total Suspended Solids, % | 10.7 | 2.3 |
| Volatile Solids, % | 5.6 | 1.3 |
| Volatile Suspended Solids, % | 5.4 | 1.2 |
| Carbon, % VS | 48.41 | 55.9 |
| Nitrogen, % VS | 9.64 | 8.4 |
| Hydrogen, % VS | 7.54 | 10.6 |
| Oxygen, % VS | 34.41* | 25.1* |
| Soluble COD, g/L | 10.0 | 3.0 |
| Total COD, g/L | 73.0 | 8.2 |
| NH4-N, g/L | 1.3 | 1.0 |
| TKN, g/L | 7.9 | 1.8 |
| Cellulose, % TS | 0.70 | 0.84 |
| Hemicellulose, % TS | 0.73 | 3.98 |
| Lignin, % TS | 1.56 | 2.9 |
| pH | 7.6 | 7.3 |
| Alkalinity, gCaCO$_3$/L | 16.0 | 6.0 |
| Operating Temp., °C. | 35.0 | 35.0 |
| Sludge Residence Time, week | 26.0 | 2.0 |

*% Oxygen = 100% − (% Carbon + % Nitrogen + % Hydrogen)

TABLE 2

SBR Operating Conditions

| SBR NO. | Loading Rate (g COD*/L-d) | Fill Period (week) | React Period (week) | Sludge** Type |
|---|---|---|---|---|
| 5–6 | 0.72 | 4 | 4 | A |
| 7–8 | 0.72 | 4 | 4 | B |
| 9–10 | 1.20 | 4 | 4 | A |
| 11–12 | 1.20 | 4 | 4 | B |

*Equivalent loading rate if the swine manure would have been fed continuously.
**A - Agropur Sludge
B - Mixture (79% Agropur and 21% Municipal Sludge)

TABLE 3

Average Methane Production per Unit of VS Fed to the SBR and Reduction in Total COD, soluble COD and VS.

| SBR No. | Loading Rate g COD/Feed | Loading Rate g COD/L-d | Sludge* Type | CH$_4$ Production L CH4/g VS after 56 days | Removal, % after 56 days TCOD | SCOD | VS |
|---|---|---|---|---|---|---|---|
| 5–6 | 12.6 | 0.72 | A | 0.50 | 60.0 | 90.0 | 29.0 |
| 7–8 | 12.6 | 0.72 | B | 0.66 | 70.0 | 96.0 | 74.0 |
| 9–10 | 21.0 | 1.20 | A | 0.30 | 58.0 | 85.0 | 27.0 |
| 11–12 | 21.0 | 1.20 | B | 0.52 | 73.0 | 91.0 | 56.0 |

*Inoculum Type
A - 100% Agropur Sludge
B - Combined Sludge (79% Agropur & 21% Municipal)

TABLE 4

SBR Operating Conditions

| RUN NO. | DIGESTER NO. | LOADING RATE g COD/feed | LOADING RATE g COD*/L-d | FEEDING FREQUENCY (per week) | MIXING** | FILL PERIOD (WEEK) | REACT PERIOD (WEEK) | NO. of CYCLE |
|---|---|---|---|---|---|---|---|---|
| 1 | 1-2 | 14.25 | 0.81 | 3 | N | 4 | 4 | 1 |
|   | 3-4 | 14.25 | 0.81 | 3 | Y | 4 | 4 | 1 |
|   | 5-6 | 21.40 | 1.22 | 3 | N | 4 | 4 | 1 |
|   | 7-8 | 21.40 | 1.22 | 3 | Y | 4 | 4 | 1 |
|   | 9-10 | 28.50 | 1.63 | 3 | N | 4 | 4 | 1 |
|   | 11-12 | 28.50 | 1.63 | 3 | Y | 4 | 4 | 1 |
| 2 | 1-2 | 28.50 | 1.63 | 3 | N | 4 | 4 | 1 |
|   | 3-4 | 85.50 | 1.63 | 1 | N | 4 | 4 | 1 |
|   | 5-6 | 28.50 | 1.63 | 3 | N | 2 | 2 | 2 |
|   | 7-8 | 85.50 | 1.63 | 1 | N | 2 | 2 | 2 |
|   | 9-10 | 28.50 | 1.63 | 3 | N | 1 | 1 | 4 |
|   | 11-12 | 85.50 | 1.63 | 1 | N | 1 | 1 | 4 |

*Equivalent loading rate if the swine manure would have been fed continuously.
**SBR was intermittently mixed by biogas recirculation. Mixing lasted 10 minutes every thirty minutes.

TABLE 5

Composition of Swine Manure Slurry (Substrate) and Inoculum Anaerobic Sludges

| CONSTITUENT | SWINE MANURE | AGROPUR SLUDGE | MUNICIPAL SLUDGE |
|---|---|---|---|
| Total Solids (TS), % | 4.1 | 11 | 2.6 |
| Volatile Solids (VS), % | 2.7 | 5.6 | 1.26 |
| Soluble COD (SCOD) g/L | 28 | 10 | 3 |
| Total COD (TCOD), g/L | 57 | 73 | 8.2 |
| TKN, g/L | 6.8 | 7.9 | 1.8 |
| NH4-N, g/L | 5.0 | 1.3 | 1.0 |
| pH | 7.3 | 7.6 | 7.3 |
| Alkalinity, g CaCO$_3$/L | 13.5 | 16 | 6 |
| Acetic Acid, g/L | 5.3 | 0.0 | 0.0 |
| Propionic Acid, g/L | 1.7 | 0.0 | 0.0 |
| Butyric Acid, g/L | 2.2 | 0.0 | 0.0 |
| Cellulose, % TS | 2.43 | 0.70 | 0.84 |
| Hemicellulose, % TS | 4.15 | 0.73 | 3.98 |
| Lignin, % TS | 1.31 | 1.56 | 2.88 |
| Total Carbon, % VS | 38.18 | 48.4 | 55.9 |
| Total Nitrogen, % VS | 4.69 | 9.64 | 10.6 |
| Hydrogen, % VS | 6.10 | 7.54 | 8.48 |
| Calcium, mg/kg TS | 54800 | 84720 | 46800 |
| Copper, mg/kg TS | 960 | 80 | 630 |
| Magnesium, mg/kg TS | 8600 | 1770 | 2600 |
| Mercury, mg/kg TS | NA | NA | 2420 |
| Potassium, mg/kg TS | 42800 | 6160 | 10000 |
| Sodium, mg/kg TS | 13900 | 7060 | 400 |
| Zinc, mg/kg TS | 4500 | 1240 | 600 |

TABLE 6

Average methane production per unit of volatile solids fed to the digesters and reduction in total COD, soluble COD and volatile solids.

| RUN NO. | DIGESTER NO. | LOADING RATE g COD/Feed | LOADING RATE g COD/L-d | FEEDING FREQUENCY | MIXING | FILL PERIOD | REACT PERIOD | NO. CYCLE | CH$_4$ PRODUCTION LCH4/g VS after 56 days | REMOVAL TCOD | REMOVAL SCOD Days | REMOVAL VS |
|---|---|---|---|---|---|---|---|---|---|---|---|---|
| 1 | 1-2 | 14.25 | 0.81 | 3 | N | 4 | 4 | 1 | 0.66 | 54 | 90 | 46 |
|   | 3-4 | 14.25 | 0.81 | 3 | Y | 4 | 4 | 1 | 0.75 | 62.5 | 93 | 84 |
|   | 5-6 | 21.40 | 1.22 | 3 | N | 4 | 4 | 1 | 0.62 | 41.0 | 88 | 64 |
|   | 7-8 | 21.40 | 1.22 | 3 | Y | 4 | 4 | 1 | 0.75 | 51.5 | 87 | 77 |
|   | 9-10 | 28.50 | 1.63 | 3 | N | 4 | 4 | 1 | 0.61 | 50.1 | 86 | 68 |
|   | 11-12 | 28.50 | 1.63 | 3 | Y | 4 | 4 | 1 | 0.62 | 50.2 | 87 | 77 |
| 2 | 1-2 | 28.50 | 1.63 | 3 | N | 4 | 4 | 1 | 0.17 | 58.5 | 22.5 | 64.3 |
|   | 3-4 | 85.50 | 1.63 | 1 | N | 4 | 4 | 1 | 0.12 | 69.9 | 21.6 | 73.1 |
|   | 5-6 | 28.50 | 1.63 | 3 | N | 2 | 2 | 2 | 0.48 | 67.1 | 86.1 | — |
|   | 7-8 | 28.50 | 1.63 | 1 | N | 2 | 2 | 2 | 0.53 | 73.9 | 85.1 | — |
|   | 9-10 | 28.50 | 1.63 | 3 | N | 1 | 1 | 4 | 0.51 | 70.9 | 64.2 | — |
|   | 11-12 | 85.50 | 1.63 | 1 | N | 1 | 1 | 4 | 0.60 | 82.9 | 64.8 | — |

TABLE 7

SBR Operating Conditions

| Run No. | Temperature | Digester No. | Loading Rate (g COD/L-g) | Feeding Frequency (#/week) | Fill Period (weeks) | React Period (weeks) | No. Of Cycle |
|---|---|---|---|---|---|---|---|
| 3 | 10° C. | 5–6 | 1.10 | 3 | 1 | 1 | 3 |
|  |  | 7–8 | 1.10 | 1 | 1 | 1 | 3 |
|  |  | 9–10 | 1.10 | 3 | 2 | 2 | 2 |
|  |  | 11–12 | 1.10 | 1 | 2 | 2 | 2 |
| 4 | 15° C. | 5–6 | 1.00 | 3 | 1 | 1 | 2 |
|  |  | 7–8 | 1.12 | 1 | 1 | 1 | 2 |
|  |  | 9–10 | 1.12 | 3 | 2 | 2 | 1 |
|  |  | 11–12 | 1.12 | 1 | 2 | 2 | 1 |

TABLE 8

Raw Manure Characteristics

| Parameters | |
|---|---|
| TCOD (mg/L) | 65274 |
| SCOD (mg/L) | 30772 |
| Acetic Acid (mg/L) | 7253 |
| Propionic Acid (mg/L) | 2038 |
| Butyric Acid (mg/L) | 1489 |
| Alkalinity | 13336 |
| pH | 7.76 |
| Ammonia (mg/L) | 4392 |
| TKN (mg/L) | 5532 |
| TS (mg/L) | 31444 |
| VS (mg/L) | 19291 |

TABLE 9

SBR's Performance

| Test Run No. | Digester | Methane Production (L CH4/g SCOD Fed) |
|---|---|---|
| Test 3 | 5–6 | 0.21 |
|  | 7–8 | 0.23 |
|  | 9–10 | 0.19 |
|  | 11–12 | 0.2 |
| Test 4 | 5–6 | 0.46 |
|  | 7–8 | 0.48 |
|  | 9–10 | 0.58 |
|  | 11–12 | 0.57 |

*SCOD removal is based on equivalent methane production.

TABLE 10

Antibiotics used in pig diets (administered in feed)

| Antibiotic used | Concentration in Diet (dry matter basis) (mg/kg) |
|---|---|
| Carbadox | 55 |
| Tylosin | 110 |
| Penicillin | 16 |
| Tetracyclines | 550 |
| Sulphamethazine | 110 |
| Lyncomycin | 220 |

TABLE 11

Experimental design

| Test Run # | Digesters | Antibiotics Tested | Number of Cycles |
|---|---|---|---|
| 5 | 5–6 | Carbadox | 2 |
|  | 7–8 | Control 1 | 2 |
|  | 9–10 | Tylosin | 2 |
|  | 11–12 | Penicillin | 2 |
| 6 | 5–6 | Tetracyclines | 2 |
|  | 7–8 | Control 1 | 2 |
|  | 9–10 | Sulphamethazine | 2 |
|  | 11–12 | Lyncomycin | 2 |
| 7 | 5–6 | Mixture 1 | 1 |
|  | 7–8 | Control 2 | 1 |
|  | 9–10 | Mixture 2 | 1 |
|  | 11–12 | Mixture 3 | 1 |

Mixture 1: Tylosin + Carbadox + Sulphamethazine

Mixture 2: Tetracyclines + Penicillin + Lyncomycin

Mixture 3: All six antibiotics

Control 1 & 2: were collected from different pair of pigs

TABLE 12

Characteristics of raw swine manures used in test runs 5 and 6

| Parameter | Control | Carbadox | Tylosin | Sulphamethazine | Tetracycline | Penicillin | Lyncomycin |
|---|---|---|---|---|---|---|---|
| TCOD | 139181 | 142611 | 129092 | 196807 | 206274 | 177735 | 194045 |
| SCOD | 38235 | 41893 | 37678 | 52834 | 48422 | 40556 | 48337 |
| Acetic | 9106.1 | 8082.0 | 8056.6 | 10783.7 | 8112.9 | 6030.5 | 5179.4 |
| Propionic | 2505.5 | 3791.1 | 2424.7 | 1960.8 | 2109.1 | 2102.7 | 1651.5 |
| Butyric | 3080.7 | 1676.9 | 2489.6 | 2428.8 | 3057.1 | 1700.9 | 1451.5 |
| ALK | 16837 | 15392 | 14114 | 14725 | 15225 | 16448 | 15448 |
| pH | 7.16 | 6.70 | 6.90 | 6.64 | 6.68 | 6.77 | 6.73 |
| Ts0 | 93784 | 97273 | 94154 | 126091 | 127783 | 121875 | 144340 |
| VS | 74118 | 75014 | 75482 | 101330 | 103620 | 97175 | 116602 |
| TSS | 80772 | 86955 | 82883 | 107898 | 105899 | 105695 | 127116 |
| VSS | 67909 | 73977 | 70146 | 89832 | 88801 | 87627 | 106496 |
| TKN | 7762 | 5936 | 6160 | 7791 | 7701 | 8025 | 9172 |
| NH3—N | 4945 | 4636 | 3988 | 4950 | 4639 | 4783 | 5200 |

TABLE 13

Characteristics of mixed antibiotics manure used in test run 7.

| Parameter | Control | Mixture 1 | Mixture 2 | Mixture 3 |
|---|---|---|---|---|
| TCOD | 159323 | 166187 | 183170 | 146687 |
| SCOD | 46129 | 54434 | 57954 | 50664 |
| Acetic | 6907 | 8492 | 9912 | 9036 |
| Propionic | 2050 | 2634 | 2898 | 2692 |
| Butyric | 5636 | 3473 | 3001 | 2964 |
| ALK | 13920 | 17253 | 18462 | 16712 |
| pH | 6.47 | 6.59 | 6.48 | 6.57 |
| TS | 111062 | 105839 | 131333 | 118586 |
| VS | 90767 | 83942 | 105799 | 94871 |
| TKN | 7258 | 7472 | 8527 | 7566 |
| NH3-N | 4353 | 4886 | 5254 | 4934 |

TABLE 15

PH and ammonia concentration in SBRs

| Antibiotics Applied | pH | Max. Ammonia Concentration (mg/L) | Max. TKN Concentration (mg/L) |
|---|---|---|---|
| Control | 7.75 | 4748 | 6304 |
| Carbadox | 7.75 | 4341 | 5900 |
| Tylosin | 7.72 | 4354 | 5647 |
| Penicillin | 7.77 | 4726 | 6229 |
| Tetracycline | 7.66 | 4467 | 6153 |
| Sulphamethazine | 7.67 | 4454 | 6045 |
| Lyncomycin | 7.69 | 4693 | 6304 |

TABLE 14

Organic loading rate and methane production

| | | Organic loading rate | Methane Production | | | |
|---|---|---|---|---|---|---|
| | | | L CH4/g TCOD fed | | L CH4/g VS fed | |
| Test run # | Treatment | g COD/L.d | Cycle 1 | Cycle 2 | Cycle 1 | Cycle 2 |
| 5 | Control | 2.34 | 0.134 | 0.217 | 0.252 | 0.407 |
| | Carbadox | 2.40 | 0.144 | 0.226 | 0.273 | 0.429 |
| | Tylosin | 2.17 | 0.150 | 0.244 | 0.256 | 0.417 |
| | Penicillin | 2.99 | 0.106 | 0.173 | 0.195 | 0.317 |
| 6 | Control | 2.34 | 0.188 | 0.215 | 0.354 | 0.404 |
| | Tetracycline | 3.45 | 0.159 | 0.148 | 0.314 | 0.293 |
| | Sulphamethazine | 3.31 | 0.161 | 0.173 | 0.314 | 0.335 |
| | Lyncomycin | 3.26 | 0.169 | 0.184 | 0.281 | 0.306 |
| 7 | Control | 2.52 | 0.231 | | 0.405 | |
| | Mixture 1 | 2.62 | 0.193 | | 0.382 | |
| | Mixture 2 | 3.23 | 0.194 | | 0.335 | |
| | Mixture 3 | 2.93 | 0.204 | | 0.315 | |

TABLE 16

Treatment efficiency of the SBRs

| Test Run # | Treatment | TCOD Removal (%) Cycle 1 | Cycle 2 | SCOD Removal (%) Cycle 1 | Cycle 2 | TS Removal (%) Cycle 1 | Cycle 2 | VS Removal (%) Cycle 1 | Cycle 2 |
|---|---|---|---|---|---|---|---|---|---|
| 5 | Control | 88.9 | 60.2 | 83.3 | 82.3 | 82.3 | 65.8 | 88.7 | 75.6 |
|   | Carbadox | 87.1 | 84.2 | 84.7 | 85.9 | 84.8 | 69.1 | 89.9 | 77.1 |
|   | Tylosin | 91.4 | 79.2 | 86.2 | 83.0 | 85.7 | 68.7 | 91.3 | 78.4 |
|   | Penicillin | 81.0 | 82.1 | 84.0 | 82.3 | 73.7 | 70.4 | 82.7 | 79.2 |
| 6 | Control | 77.0 | 76.8 | 83.1 | 82.7 | 65.5 | 67.3 | 75.2 | 76.1 |
|   | Tetracycline | 82.2 | 80.7 | 67.0 | 8S.1 | 70.8 | 71.3 | 79.1 | 79.2 |
|   | Sulphamethazine | 60.9 | 78.5 | 88.0 | 87.1 | 69.3 | 69.2 | 78.2 | 77.5 |
|   | Lyncomycin | 80.2 | 76.6 | 84.7 | 82.7 | 74.2 | 72.9 | 61.7 | 80.4 |
| 7 | Control | 63.2 | 81.1 | 71.4 | 79.5 |   |   |   |   |
|   | Mixture 1 | 62.4 | 80.0 | 67.5 | 75.7 |   |   |   |   |
|   | Mixture 2 | 66.7 | 83.0 | 72.0 | 79.6 |   |   |   |   |
|   | Mixture 3 | 66.7 | 76.1 | 70.3 | 78.2 |   |   |   |   |

REFERENCES

Agriculture Canada. (1990). Compendium of medicating ingredients brochures, 6th edition, prepared by Feed and Fertilizer Division, Canada Department of Agriculture, Ottawa.

Alpha, (1992). Standard Method for the Examination of Water and Wastewater, 18th. ed. American Public Health Association, Washington, D.C.

Balsari, P. Band E. Bozza, (1988). Fertilizers and Biogas Recovery Installation in a Slurry Lagoon. In Agricultural Waste Management and Environmental Protection. Proceedings of the 4th International Symposium of CIEC, ed. E. White and I. Szabolcs, 71–80.

CARC, 1991. Proceedings of the National Workshop on Land Application of Animal Manure. Eds. Leger, D. A., Patni, N. K., and Ho, S. K., Canadian Agricultur al Research Council, Agriculture Canada, Ottawa, ON, 176 pp.

Chandler, J. A., S. K. Hermes, and K. D. Smith, (1983). A Low Cost 75 kW Covered Lagoon Biogas System. Presented at Energy from Biomass and Waste VII, Lake Buena Vista, Fla. 23 pp.

Cullimore, R. R., A. Maule, and N. Mansui, (1985). Ambient Temperature Methanogenesis from Pig Manure Waste Lagoons. Thermal Gradient Incubator Studies, Agricultural Waste, 12:147–157.

Dague, R. R., C. E. Habben, and S. R. Pidaparti, (1992). Initial Studies on the Anaerobic Sequencing Batch Reactor, Water Science and Technology, 26: No. 9–11, 2429–2432

Hashimoto, A. G. (1983), Thermophilic and Mesophilic Anaerobic Fermentation of Swine Manure, Agricultural Wastes, Vol. 6, 175–191.

Henze, M. Band Harremoes, P., 1983. Anaerobic Treatment of Wastewater in Fixed Film Reactors—A Literature Review. Water Science Technology, 15, pp. 1–101.

Fukazaki, S., N., Nishio, M., Shobayashi, and S. Nagai, 1990. Inhibition of the fermentation of propionate to methane by hydrogen, acetate, and propionate. Applied Environmental Microbiology, 719–723.

Ke-Xin, I. Band L. Nian-Guo, (1980). Fermentation Technology for Rural Digesters in China. Proceedings Bioenergy 80, BioEnergy Council, New York, 440–442.

Kroeker, E. J., D. D., Schulte, A. B., Sparling and H. M. Lapp, (1979), Anaerobic Treatment Process Stability. Journal Water Pollution Control Federation, Vol. 51, 718–27.

Lo, K. V. Band P. H., Liao, (1986), Psychrophilic Anaerobic Digestion of Screened Dairy Manure. Energy in Agriculture, 5:339–345

Massé, D. I., R. L. Droste, K. Kennedy and N. K. Patni, (1993). Psychrophilic Anaerobic Treatment of Swine Manure in Intermittently Fed Sequencing Batch Reactors. Presented at the 1993 International Winter Meeting of the American Society of Agricultural Engineers, ASAE Paper No. 93-4569, St-Joseph, Mich., 49085-9659.

Massé, D. I. (1995). Psychrophilic anaerobic digestion of swine manure slurry in intermittently fed sequencing batch reactor. PhD thesis, University of Ottawa, Canada, 259 pp.

McCarty, P. L., (1964), Anaerobic Waste Treatment Fundamentals, Part Three, Toxic Material and Their Control, Process Design, Public Work, pp. 91–94.

Melbinger, N. R. Band Donnellon, J., (1971). Toxic effect of ammonia nitrogen in high rate digestion. Journal Water Pollution Control Federation, Vol. 43, No. 8, pp. 1658–1670.

Mosey, F. E., (1983). Mathematical modelling of the anaerobic digestion process: regulatory mechanism for the formation of short-chain volatile acids from glucose. Wat. Sci. Tech., Vol. 15, pp. 209–232.

O'Rourke, J. T. (1968), Kinetics of Anaerobic Waste Treatment at Reduced Temperature. Ph.D. Thesis, Stanford University, California, U.S.

Safley, L. M., and P. W. Westerman, (1992). Performance of a Dairy Manure Anaerobic Lagoon, Bioresource Technology, 42:43–52

Safley, L. M., and P. W. Westerman, (1994). Low Temperature Digestion of Dairy and Swine Manure Bioresource Technology, 47:165–171

Stevens, M. A., and D. D. Schulte, (1977). Low Temperature Anaerobic Digestion of Swine Manure. American Society Agricultural Engineers, Paper 77–1013, St-Joseph, Mich. 19 pp.

Sutter, K., and A., Wellinger, (1987). ACF-System: A New Low Temperature Bias Digester. In Proceedings of the 4th International Symposium of CIEF, 11–14 March 1987, Braunschweig-Volkenrode, Germany.

Van Die, P. (1987). An Assessment of Agriculture Canada's Anaerobic Digestion Program. Engineering and Statistical Research Centre. Contribution No. I-933, Agriculture and Agri-Food Canada, Ottawa, Ontario, K1A 0C6.

Wellinger, A., and R., Kaufmann, (1982). Psychrophilic Methane Production from Pig Manure. Process Biochemistry, 17:26–30

What we claim as our invention:

1. A process for the psychrophilic anaerobic digestion of organic waste comprising the steps of:
   (a) intermittently feeding waste having an ammonia level greater than 1500 m/L to a reactor containing acclimatized sludge until the reactor is filled;
   (b) reacting said waste with the acclimatized sludge under anaerobic conditions at a temperature from about 5° C. to about 25° C.;
   (c) allowing said waste and acclimatized sludge to settle to form a liquid supernatant and a sludge zone; and
   (d) removing the liquid supernatant from the reactor.

2. A process according to claim 1 wherein said waste is fed to the reactor at a rate from about 0.1 to about 4.0 g COD per liter of reactor volume per day.

3. A process according to claim 1 wherein said waste is fed to the reactor at a rate from about 0.7 to about 1.7 g COD per liter of reactor volume per day.

4. A process according to claim 1 wherein said waste is fed to said reactor at a rate from of about 1.2 to about 1.7 g COD per liter of reactor volume per day.

5. A process according to claim 1 further comprising intermittently mixing said waste and said sludge.

6. A process according to claim 5 wherein said mixing is carried out for approximately thirty minutes daily.

7. A process according to claim 5 wherein the waste and the sludge are allowed to settle after mixing for a period of time between 4 hours and 2 days.

8. A process according to claim 1 wherein the waste is reacted with the sludge in step (b) for a react period of time that is approximately equal to a feed period of time that the waste is fed to the reactor in step (a) in order to fill the reactor.

9. A process according to claim 8 wherein said react period and said feed period are each approximately one month.

10. A process according to claim 8 wherein said react period and said feed period are each approximately two weeks.

11. A process according to claim 8 wherein said react period and said feed period are each approximately one week.

12. A process according to claim 1 wherein said reactor is fed from 1 time to 3 times per week.

13. A process according to claim 1 wherein said temperature in step (b) is about 15° C. to about 25° C.

14. A process according to claim 1 wherein said reaction in step (b) occurs at a temperature of about 20° C.

15. A process according to claim 1 wherein said waste is animal manure.

16. A process according to claim 15 wherein said manure is fed to the reactor in a form containing between 0.1% and 14.5% solids.

17. A process according to claim 15 wherein the ratio of anaerobic sludge to manure in the reactor is approximately 0.5 to 1.0.

18. A process according to claim 1 wherein said waste contains volatile acids in a concentration of up to 14,000 mg/L and ammonia nitrogen in a concentration of up to 6,000 mg/L.

19. A process according to claim 1 wherein said waste contains antibiotics.

20. A process according to claim 1 wherein said acclimatized sludge has been previously reacted with organic waste under anaerobic and psychrophilic conditions.

* * * * *